US011790107B1

(12) United States Patent
Jain et al.

(10) Patent No.: US 11,790,107 B1
(45) Date of Patent: Oct. 17, 2023

(54) DATA SHARING PLATFORM FOR RESEARCHERS CONDUCTING CLINICAL TRIALS

(71) Applicant: VigNet Incorporated, Fairfax, VA (US)

(72) Inventors: Praduman Jain, Fairfax, VA (US); Josh Schilling, Salem, OR (US); Dave Klein, Oakton, VA (US); Aditya Krishnamurthy Naik, Ashburn, VA (US); Kent John Lockhart, Round Hill, VA (US)

(73) Assignee: VigNet Incorporated, Fairfax, VA (US)

( * ) Notice: Subject to any disclaimer, the term of this patent is extended or adjusted under 35 U.S.C. 154(b) by 0 days.

(21) Appl. No.: 17/980,312

(22) Filed: Nov. 3, 2022

(51) Int. Cl.
*H04L 9/40* (2022.01)
*G06F 21/62* (2013.01)

(52) U.S. Cl.
CPC ........ *G06F 21/6227* (2013.01); *H04L 63/102* (2013.01); *G06F 2221/2141* (2013.01)

(58) Field of Classification Search
CPC ......... G06F 21/6227; G06F 2221/2141; H04L 63/102
See application file for complete search history.

(56) References Cited

U.S. PATENT DOCUMENTS

| | | | |
|---|---|---|---|
| 6,006,242 | A | 12/1999 | Poole et al. |
| 6,209,005 | B1 | 3/2001 | Harker et al. |
| 6,584,479 | B2 | 6/2003 | Chang et al. |
| 7,617,393 | B2 | 11/2009 | Betz et al. |
| 7,630,965 | B1 | 12/2009 | Erickson et al. |
| 7,673,282 | B2 | 3/2010 | Amaru et al. |
| 7,747,648 | B1 | 6/2010 | Kraft et al. |
| 7,805,377 | B2 | 9/2010 | Felsher |
| 7,827,527 | B1 | 11/2010 | Chiluvuri |
| 8,413,045 | B2 | 4/2013 | Lemonik et al. |

(Continued)

FOREIGN PATENT DOCUMENTS

GB 2354851 4/2001

OTHER PUBLICATIONS

U.S. Appl. No. 16/800,952, filed Feb. 25, 2020, Jain et al.

(Continued)

*Primary Examiner* — Khoi V Le
(74) *Attorney, Agent, or Firm* — Fish & Richardson P.C.

(57) ABSTRACT

Methods, systems, and apparatus, including computer programs encoded on computer-storage media, for platforms for managing database content distribution. In some implementations, a system stores a data set comprising monitoring data collected from remote devices. The system receives a data sharing request, and in response to the data sharing request generates a data sharing record that specifies a data sharing recipient, a portion of the data set to be shared, and a limited set of operations that can be performed using the shared portion of the data set. The system configures a customized portal for the data sharing recipient based on the data sharing record, wherein the customized portal is configured to provide access limited to the shared portion of the data set with functionality limited to the limited set of operations. The system provides the data sharing recipient access to the customized portal.

20 Claims, 18 Drawing Sheets

(56) References Cited

U.S. PATENT DOCUMENTS

| | | |
|---|---|---|
| 8,539,336 B2 | 9/2013 | Griffiths et al. |
| 8,543,566 B2 | 9/2013 | Weissman et al. |
| 8,620,083 B2 | 12/2013 | King et al. |
| 8,782,552 B2 | 7/2014 | Batman et al. |
| 8,868,637 B2 | 10/2014 | Rosenstein et al. |
| 8,880,487 B1 | 11/2014 | Clinton et al. |
| 9,165,406 B1 | 10/2015 | Gray et al. |
| 9,215,142 B1 | 12/2015 | Herold |
| 9,317,492 B2 | 4/2016 | Ye et al. |
| 9,412,208 B2 | 8/2016 | Greenberg et al. |
| 9,582,154 B2 | 2/2017 | Greenberg et al. |
| 9,582,913 B1 | 2/2017 | Kraft et al. |
| 9,710,123 B1 | 7/2017 | Gray |
| 9,734,169 B2 | 8/2017 | Redlich et al. |
| 9,753,618 B1 | 9/2017 | Jain et al. |
| 9,757,065 B1 | 9/2017 | Suri |
| 9,848,061 B1 | 12/2017 | Jain et al. |
| 9,858,063 B2 | 1/2018 | Jain et al. |
| 9,928,230 B1 | 3/2018 | Jain et al. |
| 9,983,775 B2 | 5/2018 | Jain et al. |
| 10,051,107 B1 | 8/2018 | Prasad et al. |
| 10,069,934 B2 | 9/2018 | Jain et al. |
| 10,095,688 B1 | 10/2018 | Jain et al. |
| 10,104,011 B2 | 10/2018 | Sahoo et al. |
| 10,122,763 B2 | 11/2018 | Lawson et al. |
| 10,165,015 B2 | 12/2018 | Lawson et al. |
| 10,230,772 B2 | 3/2019 | Lawson et al. |
| 10,313,346 B1 | 6/2019 | O'Neill et al. |
| 10,318,995 B2 | 6/2019 | King et al. |
| 10,395,772 B1 | 8/2019 | Lucas et al. |
| 10,503,821 B2 | 12/2019 | Brunswig et al. |
| 10,521,557 B2 | 12/2019 | Jain et al. |
| 10,554,590 B2 | 2/2020 | Cabrera-Cordon et al. |
| 10,560,495 B2 | 2/2020 | Lawson et al. |
| 10,565,894 B1 | 2/2020 | Jain et al. |
| 10,610,111 B1 | 4/2020 | Tran |
| 10,756,957 B2 | 8/2020 | Jain et al. |
| 10,762,990 B1 | 9/2020 | Jain et al. |
| 10,775,974 B2 | 9/2020 | Schilling et al. |
| 10,848,482 B1 | 11/2020 | Eisen et al. |
| 10,915,455 B2 | 2/2021 | Jayaraman et al. |
| 10,938,651 B2 | 3/2021 | Jain et al. |
| 11,003,323 B1 | 4/2021 | Fan et al. |
| 11,056,242 B1 | 7/2021 | Jain et al. |
| 11,061,798 B1 | 7/2021 | Jain et al. |
| 11,082,487 B1 | 8/2021 | Jain et al. |
| 11,102,304 B1 | 8/2021 | Jain et al. |
| 11,120,057 B1 | 9/2021 | McNabney et al. |
| 11,127,506 B1 | 9/2021 | Jain et al. |
| 11,138,518 B1 | 10/2021 | Yu et al. |
| 11,151,462 B2 | 10/2021 | Jain et al. |
| 11,153,156 B2 | 10/2021 | Jain et al. |
| 11,157,823 B2 | 10/2021 | Jain et al. |
| 11,158,423 B2 | 10/2021 | Jain et al. |
| 11,176,139 B2 | 11/2021 | Li et al. |
| 11,194,717 B2 | 12/2021 | Soini et al. |
| 11,196,656 B1 | 12/2021 | Jain et al. |
| 11,238,210 B2 | 2/2022 | Ziraknejad et al. |
| 11,240,329 B1 | 2/2022 | Jain et al. |
| 11,281,553 B1 | 3/2022 | Jain et al. |
| 11,288,637 B2 | 3/2022 | Pena et al. |
| 11,296,971 B1 | 4/2022 | Jain et al. |
| 11,315,041 B1 | 4/2022 | Jain et al. |
| 11,316,941 B1 | 4/2022 | Jain et al. |
| 11,328,796 B1 | 5/2022 | Jain et al. |
| 11,342,051 B1 | 5/2022 | Jain et al. |
| 11,361,846 B1 | 6/2022 | Jain et al. |
| 11,417,418 B1 | 8/2022 | Jain et al. |
| 11,456,080 B1 | 9/2022 | Jain et al. |
| 11,460,976 B2 | 10/2022 | Fan et al. |
| 11,461,216 B1 | 10/2022 | Jain et al. |
| 11,494,372 B2 | 11/2022 | Rigney et al. |
| 11,500,655 B2 | 11/2022 | Ziraknejad et al. |
| 11,501,736 B2 | 11/2022 | Notani et al. |
| 11,504,011 B1 | 11/2022 | Jain et al. |
| 11,521,714 B1 | 12/2022 | Jain et al. |
| 11,522,703 B1 | 12/2022 | Jain et al. |
| 2002/0052861 A1 | 5/2002 | Gustman |
| 2002/0143563 A1 | 10/2002 | Hufford et al. |
| 2002/0160805 A1 | 10/2002 | Laitinen et al. |
| 2004/0168171 A1 | 8/2004 | Comparato et al. |
| 2004/0172616 A1 | 9/2004 | Rothschiller et al. |
| 2004/0230447 A1 | 11/2004 | Schwerin-Wenzel et al. |
| 2004/0249659 A1 | 12/2004 | Schwerin-Wenzel et al. |
| 2006/0047646 A1 | 3/2006 | Maluf et al. |
| 2006/0065707 A1 | 3/2006 | Kanatani et al. |
| 2006/0293904 A1 | 12/2006 | Ramanathan et al. |
| 2007/0040813 A1 | 2/2007 | Kushler et al. |
| 2007/0057037 A1 | 3/2007 | Woronec |
| 2007/0143148 A1 | 6/2007 | Koi et al. |
| 2007/0157076 A1 | 7/2007 | Lin et al. |
| 2007/0174350 A1 | 7/2007 | Pell et al. |
| 2007/0174761 A1 | 7/2007 | Lin et al. |
| 2007/0180377 A1 | 8/2007 | Gittelman et al. |
| 2007/0271376 A1 | 11/2007 | Yach |
| 2007/0280179 A1 | 12/2007 | Van Belle et al. |
| 2008/0005659 A1 | 1/2008 | Fujimaki |
| 2008/0021287 A1 | 1/2008 | Woellenstein et al. |
| 2008/0086455 A1 | 4/2008 | Meisels et al. |
| 2008/0086700 A1 | 4/2008 | Rodriguez et al. |
| 2008/0104052 A1 | 5/2008 | Ryan et al. |
| 2008/0104501 A1 | 5/2008 | Sattler et al. |
| 2008/0195659 A1 | 8/2008 | Rawle |
| 2008/0209329 A1 | 8/2008 | DeFranco et al. |
| 2008/0243834 A1 | 10/2008 | Rieman et al. |
| 2008/0244184 A1 | 10/2008 | Lewis et al. |
| 2008/0258881 A1 | 10/2008 | Manson et al. |
| 2008/0294624 A1 | 11/2008 | Kanigsberg et al. |
| 2009/0158200 A1 | 6/2009 | Palahnuk et al. |
| 2009/0164564 A1 | 6/2009 | Willis |
| 2009/0221268 A1 | 9/2009 | Yach |
| 2010/0017478 A1 | 1/2010 | Mejia et al. |
| 2010/0095240 A1 | 4/2010 | Shiplacoff et al. |
| 2010/0138271 A1 | 6/2010 | Henkin et al. |
| 2010/0174998 A1 | 7/2010 | Lazarus et al. |
| 2010/0176194 A1 | 7/2010 | Hodgkinson et al. |
| 2010/0228624 A1 | 9/2010 | Morris et al. |
| 2010/0278453 A1 | 11/2010 | King |
| 2011/0033036 A1 | 2/2011 | Edwards et al. |
| 2011/0055250 A1 | 3/2011 | Nandy et al. |
| 2011/0119165 A1 | 5/2011 | Zee |
| 2011/0125527 A1* | 5/2011 | Nair ............... G16H 50/70 705/3 |
| 2011/0125528 A1* | 5/2011 | Padate ............ G16H 10/60 705/3 |
| 2011/0196851 A1 | 8/2011 | Vadlamani et al. |
| 2011/0246880 A1 | 10/2011 | Horton et al. |
| 2012/0054211 A1 | 3/2012 | Arsenault et al. |
| 2012/0131451 A1 | 5/2012 | Abe |
| 2012/0144286 A1 | 6/2012 | Bank et al. |
| 2012/0203753 A1 | 8/2012 | Biran et al. |
| 2012/0212337 A1 | 8/2012 | Montyne et al. |
| 2012/0231959 A1 | 9/2012 | Elton et al. |
| 2012/0233256 A1 | 9/2012 | Shaham et al. |
| 2012/0254369 A1 | 10/2012 | Gillard et al. |
| 2012/0265779 A1 | 10/2012 | Hsu et al. |
| 2012/0278164 A1 | 11/2012 | Spivack |
| 2012/0278305 A1 | 11/2012 | Wei et al. |
| 2013/0031453 A1 | 1/2013 | Griffiths et al. |
| 2013/0031454 A1 | 1/2013 | Griffiths et al. |
| 2013/0031457 A1 | 1/2013 | Griffiths et al. |
| 2013/0046544 A1 | 2/2013 | Kay et al. |
| 2013/0054617 A1 | 2/2013 | Colman |
| 2013/0117287 A1 | 5/2013 | Jagota et al. |
| 2013/0117653 A1 | 5/2013 | Sukhanov et al. |
| 2013/0159848 A1 | 6/2013 | Banke et al. |
| 2013/0179209 A1 | 7/2013 | Milosevich |
| 2013/0275120 A1 | 10/2013 | DeGross |
| 2013/0283194 A1 | 10/2013 | Kopp et al. |
| 2013/0325839 A1 | 12/2013 | Goddard et al. |
| 2013/0332962 A1 | 12/2013 | Moritz et al. |
| 2013/0344468 A1 | 12/2013 | Lindsay et al. |
| 2014/0033103 A1 | 1/2014 | Boyer et al. |
| 2014/0046976 A1 | 2/2014 | Zhang et al. |

(56) References Cited

U.S. PATENT DOCUMENTS

| | | |
|---|---|---|
| 2014/0115070 A1 | 4/2014 | Virtanen et al. |
| 2014/0115456 A1 | 4/2014 | White et al. |
| 2014/0122289 A1 | 5/2014 | Beck |
| 2014/0143202 A1 | 5/2014 | Rekula et al. |
| 2014/0149896 A1 | 5/2014 | Los et al. |
| 2014/0172418 A1 | 6/2014 | Puppin |
| 2014/0173501 A1 | 6/2014 | Wu |
| 2014/0177819 A1 | 6/2014 | Vymenets et al. |
| 2014/0207918 A1 | 7/2014 | Kowalski |
| 2014/0218385 A1 | 8/2014 | Carmi |
| 2014/0229462 A1 | 8/2014 | Lo |
| 2014/0236978 A1 | 8/2014 | King et al. |
| 2014/0278349 A1 | 9/2014 | Grieves et al. |
| 2014/0278536 A1 | 9/2014 | Zhang et al. |
| 2014/0282181 A1 | 9/2014 | Declerck |
| 2014/0304103 A1 | 10/2014 | Barton et al. |
| 2014/0304365 A1 | 10/2014 | Khanna |
| 2014/0334721 A1 | 11/2014 | Cervin et al. |
| 2014/0365395 A1 | 12/2014 | Arguelles et al. |
| 2014/0365944 A1 | 12/2014 | Moore et al. |
| 2015/0006564 A1 | 1/2015 | Tomkins et al. |
| 2015/0012279 A1 | 1/2015 | Kim et al. |
| 2015/0019221 A1 | 1/2015 | Lee et al. |
| 2015/0074138 A1 | 3/2015 | Nam et al. |
| 2015/0082219 A1 | 3/2015 | Beck et al. |
| 2015/0160806 A1 | 6/2015 | Fey et al. |
| 2015/0180875 A1 | 6/2015 | Kay |
| 2015/0189347 A1 | 7/2015 | Oztaskent et al. |
| 2015/0199490 A1 | 7/2015 | Iancu et al. |
| 2015/0213074 A1 | 7/2015 | Varakin et al. |
| 2015/0331927 A1 | 11/2015 | Venkatesan |
| 2015/0356085 A1 | 12/2015 | Panda et al. |
| 2015/0373098 A1 | 12/2015 | Mordani et al. |
| 2015/0381701 A1 | 12/2015 | Reddy et al. |
| 2016/0012182 A1 | 1/2016 | Golay et al. |
| 2016/0044132 A1 | 2/2016 | Croft |
| 2016/0048698 A1 | 2/2016 | Sahu et al. |
| 2016/0070686 A1 | 3/2016 | Yu et al. |
| 2016/0094650 A1 | 3/2016 | Garcia De Rio |
| 2016/0103883 A1 | 4/2016 | Ramani et al. |
| 2016/0104200 A1 | 4/2016 | Osotio et al. |
| 2016/0117593 A1 | 4/2016 | London |
| 2016/0117782 A1 | 4/2016 | Stibel et al. |
| 2016/0124924 A1 | 5/2016 | Greenberg et al. |
| 2016/0124928 A1 | 5/2016 | Fink et al. |
| 2016/0125171 A1 | 5/2016 | Finken et al. |
| 2016/0156671 A1 | 6/2016 | Cabrera |
| 2016/0170981 A1 | 6/2016 | Morimoto et al. |
| 2016/0196389 A1 | 7/2016 | Moturu et al. |
| 2016/0210427 A1 | 7/2016 | Mynhier et al. |
| 2016/0261658 A1 | 9/2016 | Taylor et al. |
| 2016/0294755 A1 | 10/2016 | Prabhu |
| 2016/0314280 A1 | 10/2016 | Fusari et al. |
| 2016/0350481 A1 | 12/2016 | Wesemann |
| 2016/0352891 A1 | 12/2016 | Niu et al. |
| 2016/0379117 A1 | 12/2016 | Faaborg |
| 2017/0000422 A1 | 1/2017 | Moturu et al. |
| 2017/0039324 A1 | 2/2017 | Francois et al. |
| 2017/0097926 A1 | 4/2017 | Ben-Tzur |
| 2017/0103167 A1 | 4/2017 | Shah |
| 2017/0109334 A1 | 4/2017 | Anglin et al. |
| 2017/0178144 A1 | 6/2017 | Follet et al. |
| 2017/0188213 A1 | 6/2017 | Nirantar et al. |
| 2017/0243132 A1 | 8/2017 | Sainani et al. |
| 2017/0262460 A1 | 9/2017 | Nordstrom et al. |
| 2017/0308291 A1 | 10/2017 | Luipold |
| 2017/0315711 A1 | 11/2017 | Adams |
| 2017/0329466 A1 | 11/2017 | Krenkler et al. |
| 2017/0330195 A1 | 11/2017 | Lange et al. |
| 2017/0366579 A1 | 12/2017 | Aguiar et al. |
| 2018/0020076 A1 | 1/2018 | Porwal |
| 2018/0060302 A1 | 3/2018 | Liang et al. |
| 2018/0092547 A1 | 4/2018 | Tzvieli et al. |
| 2018/0113865 A1 | 4/2018 | Najork et al. |
| 2018/0129941 A1 | 5/2018 | Gustafson et al. |
| 2018/0150523 A1 | 5/2018 | Shiftman et al. |
| 2018/0190274 A1 | 7/2018 | Kirazci et al. |
| 2018/0218042 A1 | 8/2018 | Krishnan et al. |
| 2018/0225341 A1 | 8/2018 | Merg et al. |
| 2018/0227300 A1 | 8/2018 | Nakic et al. |
| 2018/0329878 A1 | 11/2018 | Hirzel et al. |
| 2018/0337967 A1 | 11/2018 | Ritchie et al. |
| 2018/0350144 A1 | 12/2018 | Rathod |
| 2019/0035403 A1 | 1/2019 | Ramasamy et al. |
| 2019/0042601 A1 | 2/2019 | Ashe |
| 2019/0042988 A1 | 2/2019 | Brown et al. |
| 2019/0057165 A1 | 2/2019 | Rosen et al. |
| 2019/0073350 A1 | 3/2019 | Shiotani |
| 2019/0080416 A1 | 3/2019 | Smith et al. |
| 2019/0130468 A1 | 5/2019 | Lerman et al. |
| 2019/0164063 A1 | 5/2019 | Moura et al. |
| 2019/0197246 A1 | 6/2019 | Viswanathan |
| 2019/0197916 A1 | 6/2019 | Park |
| 2019/0220867 A1 | 7/2019 | Karani et al. |
| 2019/0236205 A1 | 8/2019 | Jia et al. |
| 2019/0273778 A1 | 9/2019 | Mordani et al. |
| 2019/0286832 A1 | 9/2019 | Szeto |
| 2019/0297186 A1 | 9/2019 | Karani |
| 2020/0005117 A1 | 1/2020 | Yuan et al. |
| 2020/0028911 A1 | 1/2020 | Sun et al. |
| 2020/0029113 A1 | 1/2020 | Dacus et al. |
| 2020/0034685 A1 | 1/2020 | Kempf |
| 2020/0065122 A1 | 2/2020 | Ziraknejad et al. |
| 2020/0065307 A1 | 2/2020 | Roy et al. |
| 2020/0065342 A1 | 2/2020 | Panuganty |
| 2020/0126540 A1 | 4/2020 | Panchamgam et al. |
| 2020/0131581 A1 | 4/2020 | Jain et al. |
| 2020/0143102 A1 | 5/2020 | Ziraknejad et al. |
| 2020/0160612 A1 | 5/2020 | Bowen |
| 2020/0192965 A1 | 6/2020 | Imtiaz et al. |
| 2020/0203012 A1 | 6/2020 | Kamath et al. |
| 2020/0250587 A1 | 8/2020 | Aerni |
| 2020/0251111 A1 | 8/2020 | Temkin et al. |
| 2020/0327564 A1 | 10/2020 | Simard et al. |
| 2020/0387550 A1 | 12/2020 | Cappetta et al. |
| 2020/0389317 A1 | 12/2020 | Dunjic et al. |
| 2020/0395001 A1 | 12/2020 | Mohanty et al. |
| 2020/0395016 A1 | 12/2020 | Kapila et al. |
| 2020/0401580 A1 | 12/2020 | Fitzpatrick et al. |
| 2020/0401593 A1 | 12/2020 | Panuganty et al. |
| 2021/0081902 A1 | 3/2021 | Pena et al. |
| 2021/0084032 A1 | 3/2021 | Ding et al. |
| 2021/0090694 A1 | 3/2021 | Colley et al. |
| 2021/0133269 A1 | 5/2021 | Shah et al. |
| 2021/0141794 A1 | 5/2021 | Picorel et al. |
| 2021/0142763 A1 | 5/2021 | Notani et al. |
| 2021/0149906 A1 | 5/2021 | Li et al. |
| 2021/0201916 A1 | 7/2021 | Touret et al. |
| 2021/0224345 A1 | 7/2021 | Shah et al. |
| 2021/0240759 A1 | 8/2021 | Hwang et al. |
| 2021/0240773 A1 | 8/2021 | Chen et al. |
| 2021/0248135 A1 | 8/2021 | Rigney et al. |
| 2021/0263916 A1 | 8/2021 | Niu et al. |
| 2021/0271727 A1 | 9/2021 | Fan et al. |
| 2021/0278938 A1 | 9/2021 | Fan et al. |
| 2021/0342338 A1 | 11/2021 | Nocedal et al. |
| 2021/0357378 A1 | 11/2021 | Urdiales et al. |
| 2022/0222418 A1 | 7/2022 | Ziraknejad et al. |
| 2022/0400986 A1* | 12/2022 | Khanal ............... A61B 5/6833 |

OTHER PUBLICATIONS

U.S. Appl. No. 16/876,856, filed May 18, 2020, Jain et al.
U.S. Appl. No. 16/876,962, filed May 18, 2020, Jain et al.
U.S. Appl. No. 16/881,084, filed May 22, 2020, Jain et al.
U.S. Appl. No. 16/927,952, filed Jul. 13, 2020, Jain et al.
U.S. Appl. No. 17/068,898, filed Oct. 13, 2020, Jain et al.
U.S. Appl. No. 17/185,954, filed Feb. 25, 2021, Jain et al.
U.S. Appl. No. 17/224,315, filed Apr. 7, 2021, Jain et al.
U.S. Appl. No. 17/233,103, filed Apr. 16, 2021, Jain et al.
U.S. Appl. No. 17/538,457, filed Nov. 30, 2021, Jain et al.
U.S. Appl. No. 17/538,628, filed Nov. 30, 2021, Jain et al.
U.S. Appl. No. 17/579,180, filed Jan. 19, 2022, Jain et al.

(56) References Cited

OTHER PUBLICATIONS

U.S. Appl. No. 17/592,440, filed Feb. 3, 2022, Jain et al.
U.S. Appl. No. 17/720,134, filed Apr. 13, 2022, Jain et al.
U.S. Appl. No. 17/720,137, filed Apr. 13, 2022, Jain et al.
altexsoft.com [online], "Comparing Machine Learning as a Service: Amazon, Microsoft Azure, Google Cloud AI, IBM Watson," Sep. 27, 2019, retrieved on Dec. 10, 2020, retrieved from URL<https://www.altexsoft.com/blog/datascience/comparing-machine-learning-as-a-service-amazon-microsoft-azure-google-cloud-ai-ibm-watson/ >, 23 pages.
Cdisc.org [online], "CDISC Standards in the Clinical Research Process," Mar. 15, 2016, retrieved on Sep. 13, 2021, retrieved from URL<https://www.cdisc.org/standards>, 3 pages.
Cdisc.org [online], "Data Exchange," Mar. 15, 2016, retrieved on Sep. 20, 2021, retrieved from URL<https://www.cdisc.org/standards/data-exchange>, 2 pages.
cloud.google.com [online], "Multitenancy," available on or before Sep. 21, 2020, retrieved on Dec. 10, 2020, retrieved from URL<https://cloud.google.com/datastore/docs/concepts/multitenancy>, 4 pages.
community.microstrategy.com [online] "Amazon's Alexa: Key Analytics Applications That Deliver Voice-activated Reporting," May 2017, retreived on May 21, 2020, retireved from URL <https://community.microstrategy.com/s/article/Amazon-s-Alexa-Key-Analytics-Applications-That-Deliver-Voice-activated-Reporting?language=en_US>, 4 pages.
community.microstrategy.com [online], "How to Implement Voice-controlled Data Analytics With Amazon's Alexa", May 2017, retrieved on May 21, 2020, retrieved from URL <https://community.microstrategy.com/s/article/How-to-Implement-Voice-controlled-Data-Analytics-With-Amazon-s-Alexa?language=en_US>, 3 pages.
community.microstrategy.com [online], "HyperVoice and HyperVision," Feb. 2019, retreived on May 21, 2020, retrieved from URL <https://community.microstrategy.com/s/question/0D544000073QxyCCAS/hypervoice-and-hypervision?language=en_US>, 2 pages.
community.microstrategy.com [online], "What is MicroStrategy HyperIntelligence?," 2019, retrieved on May 21, 2020, retrieved from URL <https://community.microstrategy.com/s/article/KB442388-What-is-MicroStrategy-HyperIntelligence?language=en_US> 12 pages.
Constellatiom.com [online], "MicroStrategy Embeds Analytics Into Any Web Interface" Feb. 12, 2019, retrieved on Jan. 15, 2020, retrieved from URL <https://www.constellatiom.com/blog-news/microstrategy-embeds-analytics-any-web-interface>, 8 pages.
Css-tricks.com [online], "Extracting Text from Content Using HTML Slot, HTML Template and Shadow DOM," Mar. 6, 2019, retrieved on Jan. 15, 2020, retrieved from URL <https://css-tricks.com/extracting-text-from-content-using-html-slot-html-template-and-shadow-dom/>, 6 pages.
customerthink.com [online], "Top 10 Machine Learning-as-a Service Providers 2020," Feb. 12, 2020, retireved on Dec. 10, 2020, retrieved from URL<https://customerthink.com/top-10-machine-learning-as-a-service-providers-2020/>, 5 pages.
Datascience.cancer.gov [online], "Cancer Data Aggregator—The Engine that Could . . . Drive Data Aggregation in a Whole New Way," May 19, 2020, retrieved on Sep. 20, 2021, retrieved from URL<https://datascience.cancer.gov/news-events/blog/cancer-data-aggregator-engine-could-drive-data-aggregation-whole-new-way>, 6 pages.
Datascience.cancer.gov [online], "Cancer Research Data Commons Repositories," Oct. 20, 2020, retrieved on Sep. 20, 2021, retrieved from URL<https://datascience.cancer.gov/data-commons/repositories>, 4 pages.
Datascience.cancer.gov [online], "Center for Cancer Data Harmonization (CCDH)," Aug. 20, 2020, retrieved on Sep. 20, 2021, retrieved from URL<https://datascience.cancer.gov/data-commons/center-cancer-data-harmonization-ccdh>, 5 pages.
Datascience.cancer.gov [online], "CRDC," May 29, 2020, retrieved on Sep. 20, 2021, retrieved from URL<https://datascience.cancer.gov/sites/default/files/2020-06/CRDCFactSheet-5.29.20.pdf>, 4 pages.
Datascience.cancer.gov [online], "Data Commons Framework," Aug. 20, 2020, retrieved on Sep. 20, 2021, retrieved from URL<https://datascience.cancer.gov/data-commons/data-commons-framework>, 3 pages.
Datascience.cancer.gov [online], "Data Sharing and Public Access Policies," Nov. 3, 2020, retrieved on Sep. 20, 2021, retrieved from URL<https://datascience.cancer.gov/data-sharing/policies>, 6 pages.
Datascience.cancer.gov [online], "NCI Cancer Research Data Commons," Sep. 8, 2017, retrieved on Sep. 20, 2021, retrieved from URL<https://datascience.cancer.gov/data-commons>, 4 pages.
Datascience.cancer.gov [online], "NCI Cloud Resources," Aug. 20, 2020, retrieved on Sep. 20, 2021, retrieved from URL<https://datascience.cancer.gov/data-commons/cloud-resources>, 4 pages.
Datascientistinsights.com [online], "Six types of analyses every data scientiest should know," 2014, retrieved on Dec. 10, 2020, retrieved from URL<https://datascientistinsights.com/2013/01/29/six-types-of-analyses-every-data-scientist-should-know/>, 6 pages.
Developer.mozilla.org [online], "High-level view," Jan. 29, 2018, retrieved on Jan. 15, 2020, retrieved from URL < https://developer.mozilla.org/en-US/docs/Web/Web_Components/Using_shadow_DOM>, 6 pages.
docs.microsoft.com [online], "Machine learning tasks inML.NET," Dec. 23, 2019, retrieved on Dec. 10, 2020, retrieved from URL<https://docs.microsoft.com/en-us/dotnet/machine-learning/resources/tasks#:~:text=A%20machine%20learning%20task%20is,groups%20data%20according%20to%20similarity>, 8 pages.
doughenschen.com [online], "MicroStrategy Embeds Analytics Into Any Web Interface" Feb. 2019, retrieved on May 21, 2020, retireved from UR: <https://doughenschen.com/2019/02/10/microstrategy-embeds-analytics-into-any-web-interface/>, 6 pages.
eweek.com [online], "MicroStrategy Streamlines Analytics With 'Zero Clicks' UI," Jan. 2019, retrieved on May 21, 2020, retrieved from URL<https://www.eweek.com/enterprise-apps/microstrategy-streamlines-analytics-with-zero-clicks-ui>, 5 pages.
Final Office Action in U.S. Appl. No. 17/028,799, dated Apr. 15, 2021, 46 pages.
Forbes.com [online], "These Ex-Israeli Surveillance Agents Hijack Your Browser to Profit From Ads," Jun. 9, 2015, retrieved on Jan. 15, 2020, retrieved from URL <https://www.forbes.com/sites/thomasbrewster/2015/06/09/from-israel-unit-8200-to-ad-men/#3ff26d7926e2>, 10 pages.
Github.com [online], "Non-invasive way of making highlights—maybe with an overlay? #291," Nov. 30, 2013, retrieved on Jan. 15, 2020, retreived from URL <https://github.com/openannotation/annotator/issues/291>, 13 pages.
Github.com [online], "Textus," Oct. 27, 2012, retrieved on Jan. 15, 2020, retrieved from URL <https://github.com/okfn/textus>, 3 pages.
Glazkov [online], "What the Heck is Shadow DOM?," Jan. 14, 2011, retrieved on Mar. 30, 2022, retrieved from URL <https://glazkov.com/2011/01/14/what-the-heck-is-shadow-dom/>, 44 pages.
grants.nih.gov [online], "NIH Data Sharing Policy and Implementation Guidance", available on or before Sep. 21, 2020, retrieved on Dec. 10, 2020, retrieved from URL<https://grants.nih.gov/grants/policy/data_sharing/data_sharing_guidance.html>, 11 pages.
HTML 5 Rocks [online], "Shadow DOM 101," Oct. 3, 2016, retrieved on Mar. 30, 2022, retrieved from URL <https://www.html5rocks.com/en/tutorials/webcomponents/shadowdom/#toc-separation>, 10 pages.
idevnews.com [online], "MicroStrategy 2019 Brings AI/ML & Sematic Technologies to BI, Analytics," Feb. 2019, retrieved on May 21, 2020, retrieved from URL <https://www.idevnews.com/stories/7248/MicroStrategy-2019-Brings-AIML-Sematic-Technologies-to-BI-Analytics>, 3 pages.
Medium.com [online], "Steps to Understanding the Shadow DOM," Feb. 22, 2019, retrieved on Jan. 15, 2020, retrieved from URL <https://medium.com/quick-code/understanding-the-shadow-dom-20e691cc611b>, 13 pages.
Microstrategy.com [online], "HyperIntelligence", available on or before Jan. 15, 2019, retrieved on Jan. 15, 2020, retrieved from URL <https://www.microstrategy.com/us/product/hyperintelligence>, 6 pages.
microstrategy.com [online], "Microstrategy 2019, The Platform for the Intelligent Enterprise" May 2019, retrieved on May 22, 2020,

(56) References Cited

OTHER PUBLICATIONS retrieved from URL <https://www.microstrategy.com/getmedia/4b9fbd76-952b-4da5-8f8d-489278abd59c/MicroStrategy-2019-whitepaper>, 14 pages.
microstrategy.com [online]. "Build and Deploy HyperCards Using Workstation," Feb. 2019, retrieved on May 21, 2020, retrieved from URL <https://www.microstrategy.com/getmedia/8103f59b-3416-4a33-bd6a-2e99c9afd474/Build-and-Deploy-HyperCards-Using-Workstation>, 30 pages.
microstrategy.com, [online], "Whats New in Microstrategy 2019", 2019, retrieved on May 21, 2020, retrieved from URL <https://www.microstrategy.com/getmedia/de71bdb6-6d88-4e62-90d5-0e4a3cf94bb6/whats-new-in-microstrategy-2019>, 138 pages.
ncbi.nlm.nih.gov [online], "Guiding Principles for Sharing Clinical Trial Data," Apr. 20, 2015, retrieved on Sep. 2, 2022, retrieved from URL<https://www.ncbi.nlm.nih.gov/books/NBK285999/>, 14 pages.
ncbi.nlm.nih.gov [online], "The Benefits of Data Sharing," Mar. 29, 2013, retrieved on Sep. 2, 2022, retrieved from URL<https://www.ncbi.nlm.nih.gov/books/NBK137823/>, 5 pages.
Nicolasleroy.fr [online], "TheFind launches price comparison service", Nov. 19, 2009, retrieved on May 14, 2012, retrieved from URL <http://www.nicolasleroy.fr/wp/2009/11/thefind-launches-price-comparison-service/ >, 6 pages.
Non Final Office Action in U.S. Appl. No. 17/028,799, dated Dec. 3, 2020, 34 pages.
Notice of Allowance in U.S. Appl. No. 17/355,222, dated Nov. 9, 2022, 23 pages.
Notice of Allowance in U.S. Appl. No. 16/247,892, dated Jul. 7, 2022, 6 pages.
Notice of Allowance in U.S. Appl. No. 16/247,892, dated Mar. 3, 2022, 6 pages.
Notice of Allowance in U.S. Appl. No. 16/688,065, dated Sep. 30, 2021, 8 pages.
Notice of Allowance in U.S. Appl. No. 17/021,116, dated Jan. 20, 2022, 8 pages.
Notice of Allowance in U.S. Appl. No. 17/028,741, dated Mar. 4, 2021, 8 pages.
Notice of Allowance in U.S. Appl. No. 17/028,799, dated Jan. 12, 2022, 31 pages.
Notice of Allowance in U.S. Appl. No. 17/065,837, dated Jul. 28, 2022, 9 pages.
Notice of Allowance in U.S. Appl. No. 17/172,767, dated Jul. 5, 2022, 9 pages.
Notice of Allowance in U.S. Appl. No. 17/179,479, dated Sep. 27, 2022, 7 pages.
Notice of Allowance in U.S. Appl. No. 17/316,201, dated Jun. 2, 2022, 8 pages.
Office Action in U.S. Appl. No. 16/248,659, dated Feb. 14, 2022, 19 pages.
Office Action in U.S. Appl. No. 16/248,659, dated Jul. 18, 2022, 16 pages.
Office Action in U.S. Appl. No. 16/723,413, dated Jun. 21, 2022, 26 pages.
Office Action in U.S. Appl. No. 16/783,998, dated Feb. 16, 2022, 31 pages.
Office Action in U.S. Appl. No. 16/783,998, dated Sep. 20, 2022, 35 pages.
Office Action in U.S. Appl. No. 16/804,575, dated Feb. 15, 2022, 10 pages.
Office Action in U.S. Appl. No. 16/804,575, dated Jun. 24, 2022, 14 pages.
Office Action in U.S. Appl. No. 16/804,575, dated Oct. 6, 2022, 12 pages.
Office Action in U.S. Appl. No. 16/804,644, dated Apr. 22, 2021, 36 pages.
Office Action in U.S. Appl. No. 16/804,644, dated Mar. 17, 2022, 46 pages.
Office Action in U.S. Appl. No. 16/804,644, dated Oct. 28, 2021, 44 pages.
Office Action in U.S. Appl. No. 16/804,644, dated Sep. 16, 2022, 48 pages.
Office Action in U.S. Appl. No. 17/021,116, dated Sep. 8, 2021, 23 pages.
Office Action in U.S. Appl. No. 17/065,837, dated Feb. 11, 2022, 11 pages.
Office Action in U.S. Appl. No. 17/084,574, dated Aug. 19, 2022, 37 pages.
Office Action in U.S. Appl. No. 17/084,574, dated Jan. 13, 2022, 29 pages.
Office Action in U.S. Appl. No. 17/155,365, dated Mar. 28, 2022, 13 pages.
Office Action in U.S. Appl. No. 17/155,365, dated Sep. 27, 2022, 17 pages.
Office Action in U.S. Appl. No. 17/172,767, dated Jan. 6, 2022, 8 pages.
Office Action in U.S. Appl. No. 17/179,479, dated Apr. 8, 2022, 8 pages.
Office Action in U.S. Appl. No. 17/180,171, dated Apr. 27, 2022, 31 pages.
Office Action in U.S. Appl. No. 17/180,171, dated Jul. 29, 2022, 39 pages.
Office Action in U.S. Appl. No. 17/316,201, dated Feb. 15, 2022, 24 pages.
Polymer Library [online], "Shadow DOM concepts," 2014, retrieved on Mar. 30, 2022, retrieved from URL <https://polymer-library.polymer-project.org/2.0/docs/devguide/shadow-dom>, 12 pages.
prnewswire.com "MicroStrategy 2019, the World's Most Advanced Analytics & Mobility Platform, Powers Decisions for Every Moment of the Day" Jan. 2019, retrieved on May 21, 2020, retrieved from URL <https://www.prnewswire.com/in/news-releases/microstrategy-2019-the-world-s-most-advanced-analytics-amp-mobility-platform-powers-decisions-for-every-moment-of-the-day-867142447.html>, 7 pages.
Robdodson.me [online], "Shadow DOM: JavaScript," Sep. 2, 2013, retrieved Jan. 15, 2020, retrieved from URL <https://robdodson.me/shadow-dom-javascript/>, 11 pages.
Ross, "Clinical research data sharing: what an open science world means for researchers involved in evidence synthesis," Systematic Reviews, 2016, 5:159, 4 pages.
Solutionsreview.com [online], "MicroStrategy 2019 Features New HyperCards and Federated Analytics," Jan. 7, 2019, retrieved on Jan. 15, 2020, retrieved from URL <https://solutionsreview.com/business-intelligence/microstrategy-2019-features-new-hypercards-and-federated-analytics/>, 4 pages.
Solutionsreview.com [online], "MicroStrategy Extends HyperIntelligence with New Platform Update," Jul. 1, 2019, retrieved on Jan. 15, 2020, retrieved from URL <https://solutionsreview.com/business-intelligence/microstrategy-extends-hyperintelligence-with-new-platform-update/>, 4 pages.
U.S. Notice of Allowance in U.S. Appl. No. 16/730,417, dated Sep. 23, 2021, 8 pages.
U.S. Notice of Allowance in U.S. Appl. No. 16/788,530, dated Feb. 22, 2021, 12 pages.
U.S. Office Action in U.S. Appl. No. 17/340,288, dated Oct. 14, 2022, 18 pages.
U.S. Office Action in U.S. Appl. No. 16/247,892 dated Jul. 15, 2021, 24 pages.
U.S. Office Action in U.S. Appl. No. 16/247,892, dated Jan. 13, 2020, 19 pages.
U.S. Office Action in U.S. Appl. No. 16/247,892, dated Jun. 4, 2020, 25 pages.
U.S. Office Action in U.S. Appl. No. 16/247,892, dated Mar. 10, 2021, 28 pages.
U.S. Office Action in U.S. Appl. No. 16/248,659, dated Dec. 17, 2020, 5 pages.
U.S. Office Action in U.S. Appl. No. 16/248,659, dated Feb. 17, 2021, 13 pages.
U.S. Office Action in U.S. Appl. No. 16/248,659, dated Jul. 16, 2021, 16 pages.
U.S. Office Action in U.S. Appl. No. 16/723,413, dated Dec. 29, 2021, 22 pages.

(56) References Cited

OTHER PUBLICATIONS

U.S. Office Action in U.S. Appl. No. 16/730,417, dated Aug. 4, 2020, 12 pages.
U.S. Office Action in U.S. Appl. No. 16/730,417, dated Feb. 11, 2021, 18 pages.
U.S. Office Action in U.S. Appl. No. 16/788,530, dated Jun. 25, 2020, 21 pages.
Vibrantmedia.com [online], "FAQs: Vibrant In-Text Advertising," retrieved on Mar. 31, 2011, retrieved from URL <http://www.vibrantmedia.com/in-text_advertising/faq.asp>, 2 pages.
Vibrantmedia.com [online], "In-Text Demo," retrieved on Mar. 31, 2011, retrieved from URL <http://www.vibrantmedia.com/in-text_advertising/demo.asp>, 2 pages.
whatis.techtarget.com [online], "Multi-tenancy", available on or before Sep. 21, 2020, retrieved on Dec. 10, 2020, retrieved from URL<https://whatis.techtarget.com/definition/multi-tenancy>, 4 pages.
Wikipedia.com [online], "In-text advertising", Mar. 2017, retrieved on Jan. 15, 2020, retrieved from URL <https://en.wikipedia.org/w/index.php?title=In-text_advertising&oldid=770109369>, 2 pages.
Wikipedia.com [online], "Web Components," Dec. 2017, retrieved on Jan. 15, 2020, retrieved from URL <https://en.wikipedia.org/w/index.php?title=Web_Components&oldid=815726999>, 5 pages.
Wikipedia.org [online], "Data analysis," available on or before Sep. 21, 2020, retrieved on Dec. 10, 2020, retrieved from URL<https://en.wikipedia.org/wiki/Data_analysis#Modeling_and_algorithms>, 18 pages.
Wikipedia.org [online], "Multitenancy," Sep. 17, 2020, retrieved on Dec. 10, 2020, retrieved from URL<https://en.wikipedia.org/wiki/Multitenancy>, 5 pages.
zdnet.com [online], "MicroStrategy 2019 introduces "HyperIntelligence" contextual BI," Jan. 2019, retrieved on May 21, 2020, retrieved from URL <https://www.zdnet.com/article/microstrategy-2019-brings-introduces-hyperintelligence-contextual-bi/>, 6 pages.
U.S. Appl. No. 17/980,383, Jain et al.
Notice of Allowance in U.S. Appl. No. 17/355,222, dated Mar. 3, 2023, 10 pages.

\* cited by examiner

DATA SHARING PLATFORM FOR RESEARCHERS CONDUCTING CLINICAL TRIALS

BACKGROUND

In many fields, remote devices can be used to monitor changes in conditions over time. Data from the remote devices can be collected over a communication network so that the information from various remote devices can be aggregated and processed. Monitoring programs have varying levels of efficiency and effectiveness, however, as real-world constraints often limit the accuracy and completeness of data gathered. As a result, many monitoring programs do not achieve all of their objectives, in many cases leading to significant inefficiency as devices consume battery power, processing resources, and network bandwidth for actions or entire monitoring programs that fail to achieve the level of monitoring intended. Even monitoring programs that do achieve their objectives may cause inefficiencies by monitoring more devices than are needed or by carrying out broad monitoring that is not well tailored to detect and characterize the events and conditions that are of interest.

SUMMARY

In some implementations, a computer system provides a platform that facilitates the creation and implementation of monitoring programs that collect data from remote devices over communication networks. One of the benefits of the system is the ability to dynamically evaluate and change the way data collection is performed by remote devices. Many systems use a fixed set of data collection techniques and parameters over the duration of a monitoring program. This provides consistency, but it can jeopardize the effectiveness and efficiency of monitoring. By contrast, the present system provides tools that enable the system to measure and evaluate the effectiveness and efficiency of monitoring performed by remote devices, and take actions to improve performance in the system. This enables the system to dynamically change the parameters used for sensor measurements, user interactions, environmental observations, and other operations that generate the data needed to meet a monitoring program's objectives.

The system can provide tools for administrators to view and adjust the parameters used to perform data collection from remote devices. For example, the system can determine the data collection settings and procedures that are relevant to different user interfaces or even to specific elements within user interfaces. If a user interface shows a chart, graph, or table of a certain type of data in a monitoring program, the system can determine the data collection settings that were used to acquire that type of data and/or which are used to collect that type of data currently or in the future. The system can then provide user interface functionality to display the subset of settings (e.g., specific, selected settings) that are most relevant to a given user interface or user interface element. For example, if an administrator interacts with a data field or a chart in a user interface, the system can cause display of the particular subset of data collection settings that affected collection of the data represented in the data field or chart.

Beyond simply presenting current and/or former data collection settings used, the system can provide interactive controls that enable the administrator to change the data collection settings to be used going forward. For example, when an administrator interacts with a graph of heart rate data, the system can retrieve and provide the settings currently used to collect heart rate measurements from remote devices, as well as provide controls to change the settings for future heart rate measurements. When the administrator makes a change in the interface, the system can automatically implement the change across multiple devices or systems. For example, the system can update server-side processes that initiate interactions and/or propagate the changes to the remote devices involved in the monitoring program, such as by distributing updated software, configuration data, instructions, and so on to the remote devices over a communication network.

Many monitoring programs involve collection of dozens of different types of data, where there are many different parameters that can adjust the procedures for collecting each different type of data. As a result, the ability to automatically infer the settings most relevant for the current context of the user interface and filter the settings accordingly is an important improvement to the efficiency of the interface. The context can include various aspects of the content of the interface (e.g., topics, data tables, records, visualizations, text, etc. in the user interface), as well as the context of the session. For example, the system can use the identity of the user currently logged-in to the system to retrieve the permissions and data access authorizations for the user, and can tailor the set of data shown and the relevant data collection settings and controls for the user. Similarly, the system can use the history of accesses by the user to determine the data types and data collection parameters most relevant to the user, either from previous interactions of the user in the current session of using the user interface or based on interactions of the user in previous sessions. The system can also use the data context of the user's role and authorizations to provide the appropriate scope of access. For example, if the user is a researcher authorized to adjust parameters for a particular set of health research studies (e.g., clinical trials), the system can use that information to tailor the settings presented to that user's areas of access. If the user interface as a whole, or a specific part of the user interface, relates to a specific study or subset of studies, the system can detect this and provide the settings and controls for that specific study or subset of studies.

Among other benefits, the technique can conserve limited display area with a focus on the specific data collection parameters determined to be appropriate for the current user interface context. In addition, the technique can identify and provide the appropriate parameters and adjustment controls with fewer interactions required, reducing the number of user interfaces that need to be generated and reducing the number of network requests that need to be processed. Even without requiring the administrator to navigate any menu or enter search terms or filter criteria, the system can nevertheless identify and present a targeted subset of relevant data collection parameters along with interactive controls for changing those parameters for ongoing or future data collection. The system can includes features to integrate the display and adjustment of data collection into any of various types of interfaces, such as a static or basic interface (e.g., main view of a web page, mobile application, native application, etc.) or in a dynamically presented display element (e.g., pop-up window, context menu, tool-tip menu, dynamically populated frame, etc.).

In addition, the system can analyze the characteristics and results of data collection used in monitoring programs, and then recommend or implement changes to improve performance based on the analysis. For example, the system can calculate and assess measures of performance of a monitoring program for any of various dimensions (e.g., accuracy, precision, power efficiency, network bandwidth efficiency, compliance or adherence rates of participants, participant retention, etc.). The system can track the data collection performance over time and can detect when performance deteriorates or falls below a predetermined threshold, such as a target level of performance for one or more of the performance dimensions assessed. In some implementations, the system can use machine learning and other techniques to evaluate the performance of many different monitoring programs to identify correlations and other relationships between data collection parameters used (e.g., the types of data collection, devices used, sensors used, software used, surveys used, survey length, timing of data collection, frequency of data collection, requirements for participant actions, etc.).

The system can evaluate the tracked performance of monitoring programs in connection with the respective data collection parameters used, in order to determine which data collection techniques and parameters yield the best results for the performance dimensions assessed. The system can then use this information automatically select data collection techniques and parameters for new or ongoing monitoring programs. For example, for a new study being created, if monitoring a user's weight is desired, the system can automatically recommend or populate in a user interface the data collection techniques and parameters that are predicted, based on the evaluation of past monitoring programs, to yield high performance (e.g., high compliance and engagement by participants, high accuracy of collected data, etc.).

In addition, the system can identify and take advantage of opportunities to improve performance for existing monitoring programs that are still ongoing. One way to identify opportunities to improve data collection parameters is to compare the set of data collection techniques or parameters used in an ongoing study with the techniques or parameters identified as providing the high performance. The system can identify differences from the techniques and parameters that the historical data from other studies indicate to provide high performance, and then recommend changes to shift the ongoing study's parameters toward those determined from historical data to result in higher performance. As another example of identifying opportunities to improve data collection parameters for a monitoring program, the system can evaluate the performance achieved in monitoring programs. This may include detecting when performance of a monitoring program is below than a target or goal of the monitoring program, or determining that performance is worse than a reference based on similar or peer monitoring programs (e.g., performance of a program is worse than an average or other aggregate measure of other monitoring programs). As another example, the system can train one or more models, such as machine learning models, to be able to infer when data collection techniques or parameters should be changed. As discussed further below, models can be trained to receive information about a monitoring program (e.g., study parameters, study topics or objectives, types data to be collected, current data collection parameters, current performance achieved, etc.) and generate one of various inferences or prediction outputs in response. For example, the models can be trained based on the examples of prior monitoring programs to predict whether a data collection parameter should change and how it should be changed. In addition, or as an alternative, the system can train machine learning models to predict future performance of the monitoring program, a type of change to make (e.g., an increase or decrease in a parameter), an amount magnitude to change a data collection parameter, an effect on performance that is predicted to result if a certain type of change is made, and so on.

Once an opportunity for adjusting the data collection parameters of a monitoring program is identified, the system can calculate the changes that are most appropriate to improve performance of the monitoring program. For example, the system can use a trained machine learning model to predict the appropriate data parameter values for a monitoring program. As another example, the system can identify data collection parameter values from among those used in similar, peer monitoring programs to find parameter values that meet a set of criteria for performance and/or other factors (e.g., parameter values that provide the highest performance, parameter values that provide at least a minimum level of performance most consistently across the peer monitoring programs, parameter values that on average have yielded results that meet a goal or target for the monitoring program being adjusted, etc.). The system can consider multiple factors, such as balancing a goal to increase data collection accuracy or compliance while limiting or avoiding increasing participant burden (e.g., a level of time commitment or number of interactions required). As a result, the system can select a set of new data collection parameters for a monitoring program, based on the relationships between data collection parameter values used and resulting performance of other monitoring programs. The system can then make changes to server and/or client processes to cause the new data collection parameters to be applied, so that data collection proceeds with the new set of parameters.

In some implementations, the system implements changes to data collection parameters in stages or incrementally over time. After the system selects a target data collection parameter value that is expected to improve performance of a certain type of measurement, the system can plan a trajectory or sequence of adjustments to achieve the target parameter value. For example, a large change can be broken up into a several changes of smaller magnitude that are spaced out over time. By making changes gradually in a series of updates, the system can allow for time periods to monitor the effects of the individual updates on performance. If an unexpected adverse changes occurs, such as decreased participant engagement or reduced compliance with the data collection requests, the system can detect this and slow, terminate, or even reverse changes to the data collection parameters. As a result, the system can be responsive to performance changes so that automatic adjustments intended to optimize performance do not inadvertently diminish performance.

In general, the system can provide an adaptive system for changing monitoring program data collection parameters that is responsive to changes resulting from the adaptations. For example, the system can perform a repeating cycle of changing data collection parameters, measuring changes in performance, and applying additional adjustments to the data collection parameters based on the measured changes. In this manner, the system can provide an ongoing feedback loop to continually monitor performance of a monitoring program and make incremental changes to improve performance. This approach is significantly different from traditional management of many monitoring programs, especially clinical trials and other health research studies that traditionally define strict protocols in advance and typically avoid making changes as the study progresses. In part, this can be due to requirements that study protocols be approved by an independent review board (IRB) or meet other standards, and many types of changes would require approval to implement. In some implementations, the present system can provide adaptive monitoring programs even with these requirements through an initial program definition or study protocol that is defined with certain allowed variation, such as allowing variation of a data collection parameter within a defined range or allowing a range of options for data collection techniques. The system can be configured to make adaptive changes within the approved ranges or scope as allowed in a study protocol and approved by an IRB or other authority. As a result, the system can operate within the scope of an authorization to make various adaptive changes automatically or in response to user input.

The system can also provide tools that enable administrators to selectively share the collected data in monitoring programs with other users and other organizations. The system can provide interfaces, including user interfaces and application programming interfaces (APIs), that provide administrators and other authorized users (e.g., researchers for a health research study) access to the data collected in a monitoring program. These interfaces can include a web-based portal (e.g., a web application, a web page, etc.) to view, edit, organize, visualize, and otherwise manipulate the collected data. The interfaces also provide functionality for users to share collected data and to set customizable controls and policies governing sharing. The system then provides sharing recipients limited access to shared portions of data sets while enforcing the limitations or restrictions set by the user that initiated the data sharing. For example, in response to a user initiating data sharing with a recipient, the system can provide a customized portal for the data sharing recipient based on the data owner's selections specifying the nature of the data sharing arrangement. The customized portal limits the sharing recipient's access to only the specific portions of data that were shared, and the customized portal also limits the set of functions made accessible to the sharing recipient as specified by the data owner. As a result, the administrator (e.g., the data owner, such as a researcher for a clinical trial or other health research study) can initiate sharing of subsets of collected data from a monitoring program and can set any of a wide variety of limitations or restrictions on access and use of the shared data by the recipient.

As an example, a researcher for a health research study may desire to share some data with a colleague in another organization that works in the same field. The researcher may user the interface provided by the system to indicate specific portions of the collected data to be shared, such as data collected over a particular date range from a specific cohort of participants, and that the shared data needs to be de-identified. The researcher can also grant or deny permissions for the sharing recipient to limit the set of actions or functions that the sharing recipient can perform with the shared data. For example, the system may provide the researcher 50 different data analysis functions or tools through the researcher's full-authorization version of the portal for accessing the collected data for his own research study. However, the researcher can limit the sharing recipient to only be able to use subset of those data analysis functions or tools, such as 10 specific functions that the researcher selects or approves. The system then creates a customized portal for the sharing recipient to access the shared data under the constraints or conditions that the researcher specified. For example, as directed by the researcher's selections, the customized portal can enable the sharing recipient to view the shared data, create visualizations of the shared data, and perform statistical analysis on the shared data, but the customized portal can disallow editing, downloading, or further sharing of the data.

The system can provide high versatility and customizability so that each instance of sharing can have a separate policy or set of constraints defined and applied. For each instance of sharing, the system enforces the corresponding set of constraints, including tracking data use and tracking access. The system also adjusts the web-based portal it provides for data access and can reconfigure the portal to provide the limits defined for the data sharing relationship. For example, where a sharing user has disallowed or has not granted authorization for a data analysis tool to be used, the system can configure the portal for the sharing recipient to disable or omit the buttons or other user interface controls that would provide that tool. For example, the portal for a sharing recipient can restrict the menus, buttons, and other features of the portal's user interface to present only the tools or functions that are authorized by the sharing arrangement set by the sharing user.

Each instance of sharing can be customized, so that different sharing recipients receive access to different portions of a monitoring program's data and/or are provided different permissions for using the data that is shared. This provides researchers a highly versatile tool to serve different users within their organization as well as collaborate with people in different organizations. The system enhances privacy and security by enabling each data sharing instance to be limited in scope, duration, and access to achieve its particular purpose. The system stores records of each instance of data sharing (e.g., each data share event or data sharing relationship established) and the corresponding permissions and constraints for the sharing recipient, so all are enforced as specified by the user initiating the sharing.

When a user initiates data sharing with a recipient, the interfaces can enable the user to specify which recipients receive access, which portions of the data are shared, and how the data can be accessed and used by the recipients. Beyond limiting access to and use of shared data, the system can also allow users to specify tracking to be performed to track access to and use of shared data. The system can then track which portions of the data are accessed by the sharing recipient, and provide the data owner a log or report of how the data was used.

In some implementations, the system can enable users to share data with "two-way sharing," so that results that sharing recipients generate using the shared data are saved and made available to the sharing user. For example, when a researcher shares a data set with a recipient, the researcher can specify that visualizations, reports, and search query results generated by the recipient using the shared data should be automatically shared with the researcher. The system notifies the recipient of the data share and the conditions on access to the shared data, including the requirement that results derived from the shared data will be saved and shared with the data owner. The system provides the recipient access to a portal customized to provide the access and constraints that the researcher specified. For example, the system can provide a hyperlink, URL, QR code, or other reference specifying how to access the portal, as well as login information, an access token, a password, or other credential for gaining access. If the recipient agrees with the terms of data sharing that the researcher defined, the recipient can use the information from the system to open the portal in a web browser and begin accessing the data shared by the researcher. As the recipient uses the portal to create visualizations, generate reports, and run queries using the shared data, the system automatically logs these events and saves the results, making them available to the data owner. This provides the data owner visibility into how the shared data is being used and what insights or results are being derived from the data set.

The system can provide other features to facilitate sharing among different users. For example, the system can provide different ways for a user to define the set of data to be shared. The subset of data to be shared can be defined using constraints for various different aspects, such as the type of data, the set of records, the range of time represented, the source of the data (e.g., sharing data from some sources but not others), and so on. These options often define the set of data to be shared as a specific group of data or records, often a subset of data existing at the time the sharing is initiated. However, to facilitate sharing of data for monitoring programs where data collection is ongoing and data sets are growing and changing, the set of data made accessible by a data sharing relationship or transaction can be defined instead based on criteria that enable the shared data to vary. In some cases, this can be as simple as enabling the shared portion of a data set to encompass newly acquired data meeting certain criteria (e.g., for source, type of content, etc.) as the additional is collected or generated. In other cases, the system can define the data set to be shared based on a set of search criteria, filter criteria, or classifications of records, and the portions of records may change as the underlying data set changes. With this feature, the system enables a user to share a dynamic data set, where the portion of the data set varies, potentially expanding and contracting over time automatically as data is added to the data set and the set of records satisfying the criteria for access change.

As an example of sharing a dynamic data set, a user may specify a search query as criteria for defining the data to be shared. As a result, the data shared and made available in the customized portal for the recipient will be the set of results to the specified search query. Rather than share only a static snapshot of the results at the time data sharing is initiated, however, the set of results for the query (and thus the portion of the data set available to the recipient) can be re-determined each time the recipient accesses the shared data. For example, for each session of use of the customized portal for the recipient, the system can run the search query again to determine which set of records or results will be made available in the customized portal. As a result, in one session 72 records may be results that meet the conditions of the query, in another session 84 records may be results for the query, and in yet another session only 61 records may be results for the query. For example, if the query searches for records that have a keyword or a measurement value in a certain range, as the records are edited or supplemented over time the set of records meeting the query criteria may change. Thus, the portion of data made available to the recipient can also change in response as the set of matching records changes.

The system can also enable the data sharing relationships to enhance collaboration among different users and organizations with different data sets. For example, the system can facilitate for users to establish a shared collection, accessible to and including data shared by multiple individuals or organizations. Various different parties can contribute data to a shared collection, using the techniques discussed herein to limit both the portions of collected data made accessible as well as limiting the actions or functions that are available to be applied to the shared data. By combining the shared data and permissions set by each of multiple parties, the system can create a shared collection, with a shared portal customized to permit the actions and data analysis processes permitted by the parties. This can function as a virtual data sharing room, where the customized portal to access the shared data is provided to all parties involved and each party can interact with and manipulate the data according to the permissions granted by the respective data owners. The system can maintain a separate data storage area or partition for the shared data in the collection, so that alterations to the data and new derived data can be collected and maintained for the parties without affecting the source data sets from which the shared data was derived.

In one general aspect, a method performed by one or more computers includes: storing, by the one or more computers, monitoring parameter values for a monitoring program, where the monitoring parameter values specify data collection to perform as part of the monitoring program to obtain monitoring data from devices over a communication network; collecting, by the one or more computers, monitoring data for the monitoring program from remote devices over a communication network, where the monitoring data is collected according to the monitoring parameter values for the monitoring program; and providing, by the one or more computers, user interface data for a user interface that presents or describes at least a portion of the monitoring data collected for the monitoring program, where the user interface is configured to detect interaction with elements of the user interface, and where the user interface is configured to, in response to user interaction with a displayed element of the user interface that represents an item measured in the monitoring program, present (i) one or more of the monitoring parameter values used to measure the item represented by the displayed element interacted with by the user and (ii) one or more interactive user interface elements configured to adjust the one or more monitoring parameter values used to measure the item.

In some implementations, the user interface is presented by a client device. The method further includes: receiving, by the one or more computers, a message sent by the client device over the communication network in response to user interaction with the displayed element of the user interface; in response to receiving the message, determining, by the one or more computers, that a particular monitoring parameter is relevant to the displayed element; retrieving, by the one or more computers, one or more monitoring parameter values for the particular monitoring parameter; and providing, by the one or more computers, the retrieved one or more monitoring parameter values for the particular monitoring parameter to the client device over the network.

In some implementations, the method includes generating the user interface data to include, for each of multiple elements of the user interface, an identifier for at least one of the element, a data source relevant to the element, or a type of data relevant to the element. The message from the client device includes a particular identifier from the user interface data that corresponds to the displayed element, where the particular identifier identifies at least one of the displayed element, a data source relevant to the displayed element, or a type of data relevant to the displayed element. The particular monitoring parameter is determined to relevant to the displayed element based on the particular identifier included in the message.

In some implementations, the user interface data is received by a client device, and the user interface is presented by the client device. The user interface data is configured to cause the client device that presents the user interface to (i) detect one or more predetermined types of interaction with the user interface, (ii) send a message over the network in response to detection of the one or more predetermined types of interaction, and (iii) display, in response to receiving monitoring parameter values over the communication network after sending the message, the received monitoring parameter and corresponding interactive controls for changing the monitoring parameter values in the monitoring program.

In some implementations, the method includes: identifying, for each of multiple user interface elements to be included in the user interface, one or more monitoring parameter values that each set a characteristic of a data collection procedure for acquiring a type of data relevant to the user interface element; and generating the user interface data to specify the monitoring parameter values identified for the respective user interface elements.

In some implementations, generating the user interface to specify the monitoring parameter values identified for the respective user interface elements includes indicating the monitoring parameter values in metadata or in one or more tables that indicate associations of the user interface elements with the corresponding monitoring parameter values.

In some implementations, the user interface data includes data of a web page or web application.

In some implementations, the method includes: receiving interaction data indicating user input to the one or more interactive user interface elements, where the user input specifies a change to the one or more monitoring parameter values used to measure the item; and in response to receiving the interaction data: storing the changed one or more parameter values in program data for the monitoring program; and changing data collection for the item to be performed according to the changed one or more parameter values for multiple remote devices involved in the monitoring program.

In some implementations, the specified change includes change to data collection for the item for at least one of: timing of data collection for the item; frequency of data collection for the item; accuracy or precision of data collection for the item; a device or software item used to measure the item; conditions or triggers causing the item to be measured; or a survey or interactive user interface used to measure the item.

In some implementations, changing the data collection for the item includes changing server actions to cause the server to request measurements for the item from the remote devices according to the changed one or more parameter values.

In some implementations, changing the data collection for the item includes providing, to each of the remote devices, software or configuration data configured to cause the remote device to perform measurements for the item according to the changed one or more parameter values.

In some implementations, the displayed element is a chart, graph, table, or statistical measure and is generated based at least in part on measurements of the item. The method includes: determining that the displayed element was generated based on measurements of the item; and generating the user interface data to cause the user interface to respond to user interaction with the displayed element by presenting the one or more monitoring parameter values for the item and the one or more interactive user interface elements based on determining that the displayed element was generated based on measurements of the item.

In some implementations, the user interface includes multiple displayed elements that each indicate or are generated based on a different item measured in the monitoring program. The user interface is configured to respond to user interaction with the respective displayed elements by presenting (i) a monitoring parameter value used to collect data for the measured item corresponding to the displayed element and (ii) interactive user interface element to change a monitoring parameter value for the measured item corresponding to the displayed element.

In some implementations, the displayed element indicates aggregate measure of results collected for the item for users of the remote devices.

In some implementations, the item measured in the monitoring program includes a physiological measurement, a behavioral measurement, or an environmental measurement.

In some implementations, the item measured in the monitoring program is measured using a sensor of the remote devices or a sensor of devices in communication with the remote devices.

In some implementations, the method includes tracking changes to monitoring parameter values over time, where the one or more computers provide user interface data configured to indicate the respective monitoring parameter values used to collect different instances of monitoring data collected at different times using different monitoring parameter values.

In some implementations, the displayed element presents data of a first type that was collected from the remote devices using a first set of parameter values; the monitoring program is currently configured to collect data of the first type using a second set of parameter values that are different from the first set of parameter values; and the user interface is configured to respond to user interaction with the displayed element of the user interface by indicating the first set of parameters and the second set of parameters.

In another general aspect, a method performed by one or more computers of a server system includes: storing, by the server system, a data set that includes monitoring data collected from remote devices over a communication network; receiving, by the server system, a data sharing request associated with a user, where the data sharing request includes or is associated with information specified by the user including a data sharing recipient and data sharing characteristics including (i) one or more portions of the data set to be shared with the data sharing recipient and (ii) a limited set of operations that the data sharing recipient is authorized to perform using the one or more portions of the data set, where the set of operations is a proper subset of operations that the server system is configured to enable through data access portals; in response to verifying authorization of the user, generating, by the server system, a data sharing record that specifies (i) the one or more portions of the data set to be shared with the data sharing recipient and (ii) the limited set of operations that can be performed; configuring, by the server system, a customized portal for the data sharing recipient based on the data sharing record, where the customized portal is configured to provide (i) limited access to the data set by providing access to the one or more portions of the data set while disallowing access to content of the data set outside the one or more portions, and (ii) limited functionality to perform the limited set of operations while disallowing operations not in the limited set of operations; and providing, by the server system and to a device associated with the data sharing recipient, access to the customized portal that provides the limited access to the data set and the customized subset of functionality.

In some implementations, the method includes: receiving, from a device associated with the data sharing recipient, a message provided over the communication network, where the message requests access to the customized portal; and in response to receiving the message: identifying the data sharing record corresponding to the data sharing recipient; generating user interface data for the customized portal that corresponds to the data sharing record; and providing the generated user interface data to the device over the communication network.

In some implementations, generating the user interface data includes: accessing a template specifying an arrangement of interactive user interface elements configured to initiate different operations on shared data; and generating the user interface data based on the template, including altering the arrangement indicated by the template to omit or disable interactive user interface elements for operations not included in the limited set of operations specified by the data sharing record.

In some implementations, generating the user interface data includes: accessing a template specifying an arrangement of interactive user interface elements configured to initiate different operations on shared data; and generating the user interface data based on the template, including altering the arrangement indicated by the template to omit or disable interactive user interface elements for operations not included in the limited set of operations specified by the data sharing record.

In some implementations, generating the user interface data includes: accessing a template specifying a baseline set of interactive user interface elements to include in data access portals; and generating the user interface data based on the template, including adding interactive user interface elements that are respectively configured to initiate the operations in the limited set of operations specified by the data sharing record.

In some implementations, the customized portal is provided as a web page or web application served by the server system.

In some implementations, the customized portal is a customized view presented by a software application installed on the device associated with the data sharing recipient, where the customized portal restricts interactive user interface functionality of the software application based on the data sharing record so that only a proper subset of the interactive user interface functionality, selected to provide the limited set of operations, is accessible when interacting with the shared one or more portions of the data set using the software application.

In some implementations, the user is an authorized user having permission to share data collected from a monitoring program; and the data set is a set of monitoring data collected for a monitoring program that involves repeated data collection from a distributed group of users. The method includes providing, by the server system, user interface data to a device associated with the authorized user, where the user interface data specifies a user interface having controls that enable the authorized user to (i) define a subset of the monitoring data for the monitoring program to be shared, and (ii) specify, from among the operations that the server system is configured to enable through data access portals, the limited set of operations permitted for the data sharing recipient to perform.

In some implementations, the controls enable the authorized user to define the subset of the monitoring data according to each of multiple different criteria, where the multiple different criteria include at least two of: a time that data was collected; a source of the collected data; a type of data collected; a selection of one or more records; data corresponding to selected individuals or groups of individuals; data for one or more topics or keywords; or one or more classifications of the data.

In some implementations, the server system is configured to enable the user to share different portions of the data set with different recipients and to apply different sets of restrictions on data manipulation operations made available to the different recipients. The server system is configured to store separate data sharing records for each of the different recipients and to provide separate customized portals to the respective recipients, where each of the customized portals (i) provides access to the corresponding portion of the data set specified by the user for the corresponding recipient and (ii) applies the restrictions specified by the user for the recipient so that only the set of data manipulation operations authorized by the user are available through the customized portal.

In some implementation, the data sharing request is a first data sharing request. The method further includes, after generating the data sharing record based on the first data sharing request: receiving, from the user, a second data sharing request to share data with the data sharing recipient, where the second data sharing request includes or is associated with information specifying (i) a second portion of the data set to be shared with the data sharing recipient and (ii) a second set of operations authorized for the data sharing recipient to perform using the second portion of the data set; and in response to receiving the second data sharing request, updating the data sharing record to indicate added access to the second portion of the data set and to indicate the second set of operations authorized to be performed using the second portion of the data set. The customized portal for the data sharing recipient is updated to provide access to both (i) the one or more portions of the data set shared based on the first data sharing request and (ii) the second portion of the data set shared based on the second data sharing request, and the server system configures the customized portal to limit the operations available to be performed, where (i) the limited set of operations authorized based on the first data sharing request are available for the one or more portions of the data set, and (ii) the second set of operations authorized based on the second data sharing request are available for the second portion of the data set.

In some implementations, the data sharing request is a first data sharing request and the customized portal is a first customized portal. The method further includes, after generating the data sharing record based on the first data sharing request: receiving, from the user, a second data sharing request to share data with the data sharing recipient, where the second data sharing request includes or is associated with information specifying (i) a second portion of the data set to be shared with the data sharing recipient and (ii) a second set of operations authorized for the data sharing recipient to perform using the second portion of the data set; and in response to receiving the second data sharing request, configuring a second customized portal for the data sharing recipient, where the second customized portal is configured to provide, separate from the first customized portal providing access to the one or more portions, (i) access to the second portion of the data set while disallowing access to content of the data set outside the second portion, and (ii) limited functionality to perform the second set of operations while disallowing operations not in the second set of operations.

In some implementations, the method includes: identifying multiple data sharing records that each indicate a data sharing relationship that of at least a portion of the data set; and providing, over the communication network and for display by a device associated with the user, a list of the data sharing relationships provided by the identified data sharing records, the list indicating, for each of the data sharing relationships, the data sharing recipient and the portion of the data set shared.

In some implementations, configuring the customized portal for the data sharing recipient includes: storing a copy of the one or more portions of the data set in a data storage area for the customized portal that is separate from the data set, where the server system is configured to maintain persistent storage of the data in the data storage area across multiple sessions of use of the customized portal; and configuring the customized portal to provide access to the copied data in the data storage area and not provide access to the data set.

In some implementations, the server system is configured to: create, for each session of use of the customized portal, a new temporary copy of the one or more portions of the data set to be used during the session; and discard the temporary copy for the session after the session ends.

In some implementations, the one or more portions of the data set are defined based on a set of criteria specified by the user such that the subset of the data set that meets the criteria can vary over time, where the criteria are stored in the data sharing record. The server system is configured to vary the content of the data set accessible through the customized portal based on a determination by the server system, for each session of use of the customized portal, of which portions of the data set currently satisfy the criteria at the time the customized portal is used.

In some implementations, the criteria include search criteria or filter criteria, such that, for each session of use of the customized portal, the customized portal shares the portion of the data set that the server system determines to currently meet the search criteria or filter criteria.

In some implementations, the method includes: receiving, in association with the data sharing request, input specifying for results generated by the recipient using shared data to be provided to the user; including, in the data sharing record, an indication that results generated by the recipient using shared data are to be provided to the user; generating content that is derived from the shared one or more portions of the data set as a result of interaction through the customized portal by the data sharing recipient; and based on the indication in the data sharing record, automatically saving the generated content and automatically making the generated content available to the user.

In another general aspect, a method performed by one or more computers includes: determining, by the one or more computers, first types of data to be collected in a first monitoring program from remote devices over a communication network; obtaining, by the one or more computers, data describing data collection results of multiple other monitoring programs, including data for each of the other monitoring programs that indicates (i) types of data acquired in the monitoring program, (ii) data collection parameter values used for the monitoring programs for the respective types of data acquired, and (iii) performance measures indicating monitoring quality achieved for the monitoring program for the respective types of data acquired; selecting, by the one or more computers, one or more data collection parameter values for collecting one or more of the first types of data in the first monitoring program based on the performance measures for the other monitoring programs and the corresponding data collection parameters used by the other monitoring programs; and adjusting, by the one or more computers, the first monitoring program to apply the selected one or more data collection parameter values, such that the one or more of the first types of data in the first monitoring program are collected from the remote devices according to the selected one or more data collection parameter values.

In some implementations, the performance measures specify a level of at least one of accuracy of collected data, precision of collected data, completeness of collected data, participant retention, or participant compliance.

In some implementations, the method includes: providing, for display in a user interface, an indication of the selected one or more data collection parameters; and receiving data indicating user input that confirms the selected one or more data collection parameters for the first monitoring program. The first monitoring program is adjusted based on receiving the data indicating the user input that confirms the selected one or more data collection parameters.

In some implementations, adjusting the first monitoring program is performed automatically without requiring user input to confirm the adjustment.

In some implementations, selecting the one or more data collection parameter values includes: identifying a current parameter value that is currently used to collect a particular type of data in the first monitoring program; identifying a target parameter value that is predicted, based on the data collection results of the multiple other monitoring programs, to improve monitoring performance for collecting the particular type of data in the first monitoring program; and selecting an intermediate parameter value that is between the current parameter value and the target parameter value. Adjusting the first monitoring program to apply the selected one or more data collection parameter values includes applying the selected intermediate parameter value for collection of the particular type of data in the first monitoring program.

In some implementations, selecting the one or more data collection parameter values includes identifying a target parameter value that is predicted, based on the data collection results of the multiple other monitoring programs, to improve monitoring performance for collecting a particular type of data in the first monitoring program. Adjusting the first monitoring program to apply the selected one or more data collection parameter values includes: applying a series of adjustments to a data collection parameter used to collect the particular type of data in the first monitoring program, where the adjustments progressively move the value of the data collection parameter toward the target parameter value.

In some implementations, the method includes, after each of the adjustments in the series of adjustments to the data collection parameter: collecting data for the particular type of data from the remote devices for a period of time using the adjusted value of the data collection parameter; and evaluating monitoring performance achieved using the adjusted value of the data collection parameter. At least some of the adjustments to the data collection parameter are made based on the evaluation of monitoring performance achieved using the previous adjusted value of the data collection parameter.

In some implementations, the method includes identifying a monitoring performance goal for the first monitoring program. The one or more data collection parameter values are selected based on the monitoring performance goal.

In some implementations, the method includes identifying multiple monitoring performance goals for different aspects of monitoring performance for collecting a particular type of data in the first monitoring program. Selecting the one or more data collection parameter values includes determining one or more data collection parameter values for collecting the particular type of data that are predicted to result in monitoring performance that satisfies each of the multiple monitoring performance goals.

In some implementations, the method includes: determining a performance measure for data collection of a particular type of data in the first monitoring program using a first set of data collection parameter settings; determining a reference performance measure for data collection of the particular type of data based on the data collection results of the multiple other monitoring programs; and determining that the performance measure indicates lower performance than the reference performance measure. The steps of (i) selecting the one or more data collection parameter values and (ii) adjusting the first monitoring program to apply the selected one or more data collection parameter values are performed based on determining that the performance measure indicates lower performance than the reference performance measure.

In some implementations, the method of includes repeatedly performing a cycle that includes: generating performance measures that quantify monitoring performance of the first monitoring program since a most recent adjustment to data collection parameter values for the first monitoring program; comparing the performance measures for the first monitoring program with reference performance measures determined based on the data collection results of the multiple other monitoring programs; and selectively adjusting the data collection parameter values for the first monitoring program based on the comparison.

In some implementations, the method includes: evaluating the monitoring performance for data collection in the first monitoring program; and based on the evaluation, identifying an opportunity to improve monitoring performance for data collection in the first monitoring program, where identifying the opportunity is based on at least one of: detecting a decline in monitoring performance for the first monitoring program; detecting that a measure of monitoring performance is below a predetermined threshold or goal for the first monitoring program; predicting a future decline in monitoring performance for the first monitoring program based on a progression of monitoring performance in one or more other monitoring programs; predicting, based on data collection results for the other monitoring programs, that an increased level of monitoring performance is available for the first monitoring program; or determining that a measure of monitoring performance for the first monitoring program indicates lower performance than a measure of peer monitoring performance, where the measure of peer monitoring performance is an aggregate measure based on data collection results of each of a proper subset of the other monitoring programs, where the proper subset is selected based on similarity with the first monitoring program. Selecting the one or more data collection parameter values and adjusting the first monitoring program to apply the selected one or more data collection parameter values are triggered based on identifying the opportunity.

In some implementations, selecting the one or more data collection parameters includes selecting the one or more data collection parameters based on output of a machine learning model.

In some implementations, the method includes training a machine learning model based on the obtained data for the other monitoring programs, the machine learning model being trained to predict data collection parameters for a monitoring program based on input of characteristics of a the monitoring program.

In some implementations, the first monitoring program is a new monitoring program. Selecting the one or more data collection parameter values for collecting one or more of the first types of data in the first monitoring program includes selecting initial data collection parameter values to apply in the first monitoring program.

In some implementations, the first monitoring program is an existing monitoring program that has collected data over a period of time using a first set of data collection parameter values to collect one or more of the first types of data. Selecting the one or more data collection parameter values for collecting one or more of the first types of data in the first monitoring program includes selecting a second set of data collection parameter values for collecting one or more of the first types of data, where the second set of data collection parameter values is selected based on a level of monitoring performance achieved over the period of time.

In some implementations, the selected one or more data collection parameter values include values for data collection parameters including at least one of frequency of data collection, time of day for data collection, location of data collection, sensor settings, survey content provided, measurement precision, sampling rate, window size, or sensor operation settings.

In some implementations, the first types of data include types of data in one or more categories from among at least behavioral data, physiological data, mental health data, and environmental data.

Other embodiments of these and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
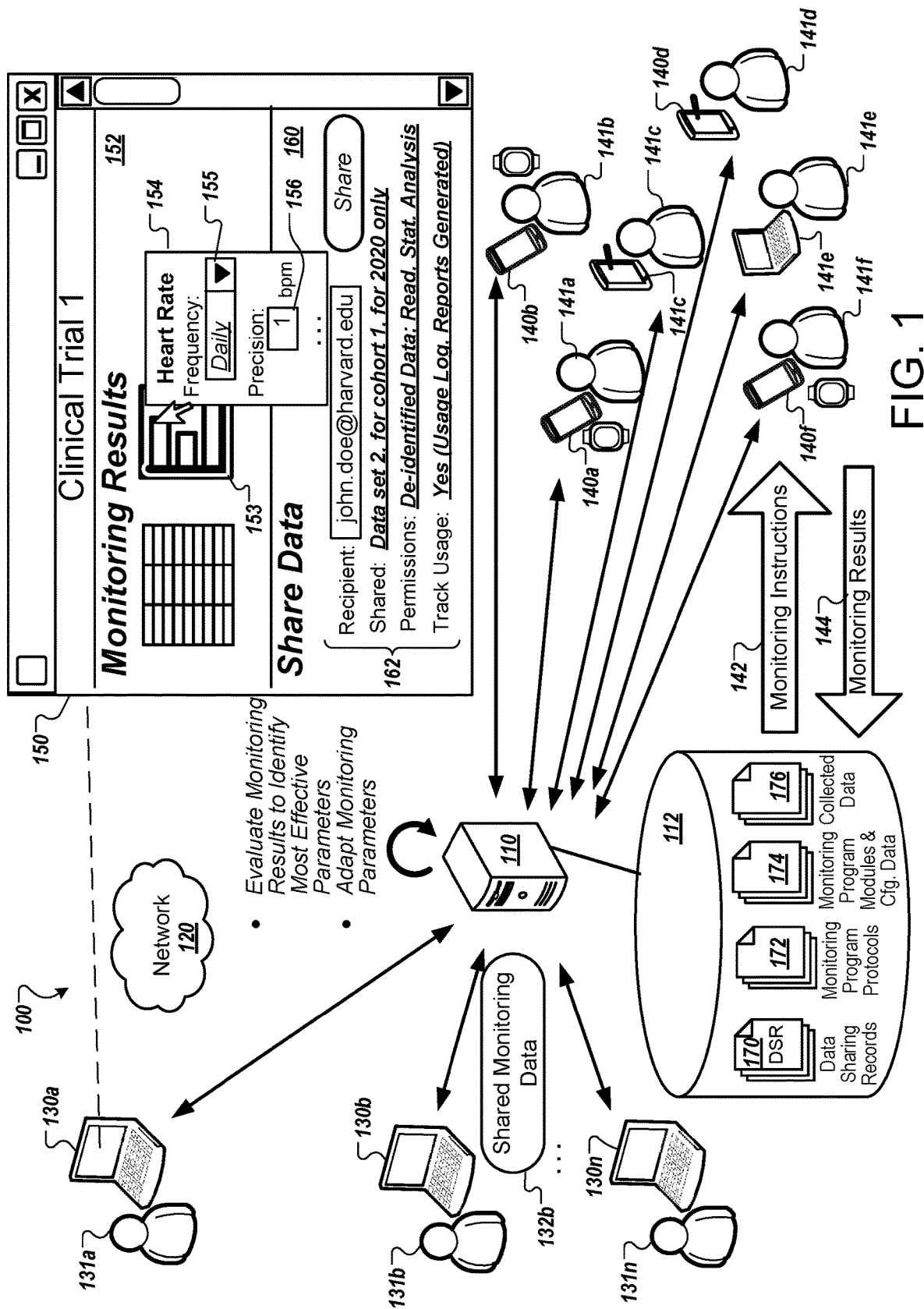
FIG. 1 is a diagram showing an example of a system for managing monitoring programs.

FIG. 1 is a diagram showing an example of a system 100 for managing monitoring programs. The system 100 includes a computer system 110, such as a server system, that accesses data storage 112 to create and create and administer monitoring programs that involve collection of data from remote devices over time. The monitoring programs can have different objectives and use different data collection techniques. The computer system 110 can provide a platform, such as a cloud-computing platform with a multi-tenant architecture, through which many different organizations can run separate monitoring programs that collect different types of data from different sets of remote devices. For example, the computer system 110 can be used to create and administer clinical trials and other health research studies, to collect physiological, behavioral, environmental, and other data from participants in the research studies. The system can coordinate repeated, ongoing data collection from participants from mobile devices, wearable devices, medical monitoring and treatment devices, and so on.

The computer system 110 can interact with client devices 130a-130n of researchers 131a-131n over a communication network 120 to provide various interfaces, including APIs and web-based interfaces for creating and editing monitoring programs, selecting participants, viewing collected data from participants, and sharing data with others. One example is the web-based portal 150 provided to the client device 130a.

The computer system 110 also interacts with client devices 140a-140f of participants 141a-141f in monitoring programs. The participants 141a-141f can be registered or enrolled participants of one or more monitoring programs, such as participants in clinical trials or other health research studies. For example, the computer system 110 can provide monitoring instructions 142 (as well as software, configuration data, and so on) to the client devices 140a-140f over the communication network 120 to adjust how the client devices 140a-140f perform monitoring. The computer system 110 can also receive monitoring results 144 (e.g., sensor data, interaction logs, survey responses, etc.) from the respective client devices 140a-140f over the communication network 120 and store the collected data in the data storage 112.

The computer system 110 can store various types of information in data storage 112 (e.g., a database). The data for each monitoring program can be stored separately and kept confidential to the researchers or others authorized to access it. For each monitoring program, the computer system 110 can store a monitoring program protocol 172 (and potentially other program data defining the program), monitoring program modules and configuration data 174, and collected data 176. In addition to these, the computer system 110 can store many other types of data generated over the course of a monitoring program or through interaction with the collected data, such as logs of events, reports generated, visualizations created, notes created, annotations applied, messages sent between users in the platform, and so on.

A monitoring program protocol 172 can be stored for each monitoring program. The monitoring program protocol 172 can specify how monitoring is to be conducted, such as what items to monitor, which data collection techniques or data sources are used, parameters such as frequency and accuracy of data collection and so on. This information can include a list of data items to be collected and participant actions that need to be performed as part of participation in the monitoring program. The monitoring program protocol 172 can include a study protocol in a clinical trial or other health research study, and the information may be expressed according to a predefined database schema or taxonomy for the computer system 110 to interpret more easily. The monitoring program protocol 172 or other program data can indicate the other characteristics that define the monitoring program, e.g., the researchers involved, the participants involved, profiles for participants, the duration of the program, the targets or goals for the monitoring program, safety requirements, communication preferences for participants, and more.

Each monitoring program can also have monitoring program modules and configuration data 174. These are data packages for distribution to client devices of monitoring program participants, which configure the client devices to perform the monitoring actions needed for the program. The monitoring program modules and configuration data 174 are customized for each monitoring program, to cause the specific data collection and user interactions needed for each monitoring program. The data packages can include software modules, executable or interpretable code, instructions, software settings, hardware settings, program rules, survey content, media, references (e.g., URLs) to content, and other element as needed to convey to the client device the appropriate monitoring behavior needed for a specific monitoring program. Often, participant client devices have an application installed that includes the base set of monitoring functionality and user interaction capabilities. The various modules 174 for different monitoring programs specify which subsets of the features of the application are used, as well as specifying the data collection parameters and rules for collecting data according to the protocol 172 for the monitoring program. Participants can receive the module 174 for their monitoring program over the network 120 when they enroll to participate in the program. Over time, as researchers alter the monitoring program or as data collection parameters or data collection needs change, the computer system 110 can generate and send updated or replacement modules 174 that will adjust how the participant client devices interact with users, collect data, and transmit collected data to the computer system 110. The monitoring program modules and configuration data 174 can be among the content provided in the monitoring instructions 142.

As an example, a monitoring program may involve monitoring diet and exercise of participants. The computer system 110 creates and stores a module 174 for the program, and sends it to client devices of participants that enroll in the program. The module 174 can cause the client devices that install it to present a nutrition survey each day and transmit the survey results to the computer system 110 over the network 120. in addition, the module 174 can cause the client devices to track step count or, if the client device does not have the capability to do so, to communicate with other devices (e.g., a cell phone, a smart watch, etc.) to initiate tracking of step counts and to transmit the data. Over time, in response to researcher actions or through automatic optimization, the computer system 110 can generate and transmit an updated module 174 or updated settings over the network 120. For example, an updated module 174 may specify additional types of sensor measurements to be collected, may include new surveys to be presented, or may specify changes in the way data is collected (e.g., changing frequency of collection, accuracy of collection, etc.).

The monitoring programs may collect data from various types of user devices (e.g., phones, tablet computers, smart watches, glucometers, weight scales, etc.), which can also run software to carry out interactions of a monitoring program over time. For example, a user's phone can run an application that downloads a customized program module 174 for a specific monitoring program. Based on the downloaded program module 174, the application may be configured to initiate the data collection actions needed for the monitoring program, e.g., sensor measurements, survey presentation, ecological momentary assessments, interactive games, etc. The downloaded program module 174 can specify which sensors to use, which types of data to collect, timing to use for initiating data collection, rules specifying triggers or conditions for initiating data collection, and so on. As a result, user devices, whether prompted by a server or not, can perform data collection actions in a manner that is scheduled, periodic, on-demand, triggered based on conditions (e.g., events, contexts, or other factors detected), or otherwise performed according to the needs of a monitoring program.

At the beginning of a monitoring program or at other times as needed, the computer system 110 can send a program module 174 that includes software, configuration data, instructions, and other content that causes receiving devices to configure themselves to perform the types of monitoring needed for the program. This can include initiating sensor measurements, activating different sensors on a schedule, recording certain types of data, presenting surveys and other interactions for a user, transmitting data in a specified format or schedule to the computer system 110 or another server over the network, and so on. The program module 174 can be received and processed by an operating system of a remote device or an application installed at the remote device. As a result, the remote devices involved in a program begin ongoing monitoring for a period of time, often for weeks or months, including repeated sensor measurements, surveys, and other interactions. The modules 174 can be or can include modules as discussed in U.S. Pat. No. 9,858,063, issued on Jan. 2, 2018 and titled "Publishing Customized Application Modules," which is incorporated herein by reference. The modules can be or can include form data packages as discussed in U.S. Pat. No. 9,928,230, issued on Mar. 27, 2018 and titled "Variable and Dynamic Adjustments to Electronic Forms," which is incorporated herein by reference.

The communication can include the initial configuration of devices for a monitoring program, including the transfer of the configuration elements (e.g., configuration data, software, instructions, settings, etc.) that cause or enable the remote devices to perform the needed types of monitoring for the program. The provided program module 174 can include rules, software, instructions, and content that enable the remote device to respond to different conditions and trigger notifications, sensor measurements, user interface, and other actions. The system 110 can also process the collected data from different devices and send further instructions to the remote devices to perform these and other actions.

The monitoring program can be configured for the remote devices to acquire and report data collected for first types of data specified by the first monitoring program. For example, a monitoring program may specify that remote devices should measure step count, GPS location, resting heart rate, and user-reported mood. The system 110 can receive, from each of the remote devices over the communication network, a series of messages including monitoring data collected by the remote device at different times for first types of data specified by the first monitoring program. For example, devices may send messages with the various measurements they determine as the measurements are made or as a batch once an amount of data or a time threshold is reached. For example, each of a set number of devices (e.g., devices of participants in a cohort for a research study) can send one or more messages daily to provide the data that the respective devices have collected.

As discussed further below, the computer system 110 can implement changes to monitoring by sending updates to program modules, configuration data, or instructions over a communication network such as the Internet. The computer system 110 can manage and orchestrate the process of making the changes active and implemented at the client devices 141a-141f, whether initiated manually by a researcher or initiated automatically by the computer system 110. For example, the computer system 110 can send instructions, code, scripts, configuration settings, software, and other elements to change user interactions for participants in monitoring programs (e.g., by changing which user interfaces, sequences of interactions, media, notifications, digital therapeutics, and other interactions are provided), as well as to change which data collection is performed (e.g., the devices or sensors used, the types of data collected, the surveys presented, etc.) and the parameters for collecting the data (e.g., the timing, frequency, precision, accuracy, mode of data collection, etc.). The computer system 110 can change the schedule of interactions or the set of interactions of a monitoring program with a user, whether a server system sends requests for client devices to perform measurements or collect survey responses, or whether client devices apply downloaded software or rules so that the client devices initiate the data collection.

The computer system 110 stores collected data 176 for each of the monitoring programs. The collected data is stored separately for each monitoring program. For example, the computer system 110 can use different partitions or data areas for storing data from different monitoring programs, and encrypt the data for different monitoring programs with different keys or other settings to maintain limited access. The collected data 176 can any of various types of data collected, such as physiological data, behavioral data, psychological and mental health data, environmental data, and so on. For example, the collected data 176 can include data such as user interaction data, event logs, sensor data, survey responses, ecological momentary assessment (EMA) responses, patient-reported outcomes, and so on. The collected data 176 can include information about various operational aspects, including compliance tracking records for participants, information about time spent on surveys, and so on.

The computer system 110 provides many tools for authorized users (e.g., researchers 131a-131n, administrators, etc.) to use and share the data collected for their respective monitoring programs. For example, the computer system 110 provides each of the researchers 131a-131n a web-based portal, such as in the form of a web page or web application that can be displayed in web browsers of the client devices 130a-130n. For example, the user interface 150 shows an example of a web-based portal provided to the researcher 131a through the client device 130a. The portal can provide user interfaces so that the researchers 131a-131n can view data collected (e.g., raw data, stored values, participant records, etc.), view status information about the monitoring program (e.g., data collection completeness, progress over time, compliance rates for individuals and groups of participants, participant health outcomes and treatment progress, and so on), and view other information about the monitoring program. Each researcher 131a-131n is provided a version of the portal that provides access to the protocol 172, collected data 176, and other program information for the monitoring program(s) that the researcher 131a-131n has authorization to access, e.g., with an administrator role or permission.

The computer system 110 includes various features to view and adjust data collection parameters (see also FIGS. 2-X), to share data securely with customized properties and limitations (see also FIGS. X-Y), and to optimize monitoring performance by evaluating monitoring results and learning from results of many monitoring programs (see also FIGS. Y-Z). These features are discussed briefly with respect to FIG. 1 and are described in further detail with respect to the subsequent figures.

The portal provided to the researchers 131a-131n can include the functionality to create new monitoring programs or edit existing monitoring programs (e.g., adjust cohort sizes and cohort membership, change program duration, change the protocol for participants or data collection more generally, etc.). The portal also provides features to enable researchers 131a-131n to view and change the data collection parameters used in their monitoring programs. When interfaces present collected data (e.g., measurement values, charts, graphs, etc.), the interfaces often do not specify the data collection parameters used to collect the data. For example, if a chart shows resting heart rate categories for a cohort of participants, the viewer typically does not have access to information specifying how the resting heart rate was measured. Nevertheless, parameters such as the type of device used to measure heart rate, the precision of measurements, the frequency of measurements, and others can greatly affect how the information is interpreted and whether it can be relied on.

Traditionally, if systems made the protocol or data collection parameters available at all, the user would need to navigate to a new web page or view and leave the context of the chart or data table where the user was reviewing the data. Even if the user were able to find a list of data collection parameters, the system would not be able to link the parameters in a separate list or interface to the collected data or content that the user was interested in. In other words, the user would often not be able to confirm or have confidence that the data collection parameter values showing on a first web page or document were the data collection parameter values that actually apply to and were used to collect the data shown in a second web page or document, much less to the specific view, visualization, table, chart, or field that is of interest to the user. The situation is even more complex when data collection parameters are allowed to be adjusted over time, because there may be different sets of data collection parameter values applied at different times to collect different instances of collected data.

Given the limited screen area of client devices and design of typical web pages, it has been generally infeasible to incorporate all of the applicable data collection parameters into an interface such as a web page. In addition, previous systems did not provide users the capability to be able to specify changes to data collection parameters and have the changes propagated to remote client devices. Even if the user was able to look up the protocol for a monitoring program, for example, the user would often need to navigate to several other separate interfaces to find where to change system settings to adjust measurements and other interactions, if the capability to make the changes even exists.

The techniques of the present system make the data collection parameters and other protocol information accessible from any or all dashboards and interfaces, without having to navigate to a new web page or view and leave the context of the chart or data table where the user is reviewing the data. The system tracks the relationships among the data shown and the data collection parameters used to collect the data shown, allowing the system to tailor the display of data collection parameter information specifically to the items the user is viewing. This provides the user high confidence that the data collection parameter values that are presented are the parameter values used to collect the data being displayed, and that the values are applicable to the specific view, visualization, table, chart, or field that is of interest to the user. By dynamically showing and hiding the views of data collection parameters, and by selectively showing the parameter values most relevant to the current user interaction, the system provides a highly efficient use of screen space to show the most relevant parameters on demand. In addition, the system can provide the interactive controls that enable a user to change system settings to adjust measurements and other interactions, and the system can automatically implement the changes (including distributing changes to multiple remote devices) when the user indicates a desired change.

The computer system 110 provides researchers 131a-131d enhanced access to data collection parameters for their monitoring programs. This includes features of the portal to present the parameter values that were used to collect data and/or to collect future data, as well as to provide interactive controls to change the parameter values. The computer system 110 can provide the portal so that data collection parameter information and adjustment controls are selectively provided based on the context and interactions of the user. While the user in in a particular context (such as the current monitoring program, and a particular measurement type, data set, or cohort or individual participant for the current monitoring program, etc.), the portal can provide, in that context, the data collection parameter values and adjustment controls relevant to that context. As a result, the portal can provide the relevant information and controls in the context without requiring the user to leave the context to seek out another interface. In addition, the set of data collection parameter information and controls provided can vary according to the portions of the user interface that the user views and interacts with, allowing high relevance while using screen space very efficiently.

The user interface 150 shows an example of these techniques. The user interface 150 shows a portal provided to the researcher 131a about a monitoring program called "Clinical Trial 1." The user interface 150 includes a region 152 providing monitoring results with a data table and a chart 153 of measurements collected in the monitoring program. The monitoring program may collect ten different types of data (e.g., heart rate, step count, nightly hours of sleep, etc.)

from participants, and each of the collected types of data may have various parameters that set how the data is collected (e.g., setting frequency of collection, sensors used for collection, time of day collection occurs, etc.).

Initially, data collection parameter values used to collect the monitoring results are not shown in the user interface 150. However, the user interface 150 is designed so that the data collection parameters and adjustment controls are dynamically presented, targeted to the particular context of content presented, or more specifically, to the portions of the page that the researcher 131a is interacting with. For example, when the researcher 131a interacts with the chart 153 (e.g., by clicking, tapping, hovering, selecting, etc.), the user interface 150 initiates display of a panel 154 that provides the data collection parameter values used to collect the data represented in the chart 153. In this example, that is collection of heart rate daily, and with a precision of 1 bpm. The panel 154 also includes controls enabling the researcher 131a to alter those parameters for future data collection, through a drop-down control 155 to select a different frequency of measurement and a number entry field 156 to specify the level of precision for measurement and data recording. As a result, the user interface 150 responds to the interaction of the researcher 131a by dynamically presenting the set of data collection parameter values and adjustment controls identified as relevant to the current context. Out of the ten measured items in the monitoring program and the potentially dozens or hundreds of different parameters set for the monitoring program, the user interface 150 presents the information for just one of the measured items that is identified as relevant to the current context and chart.

As discussed further below, several techniques can be used to identify the relevant items and data collection parameter values for different portions of the user interface 150. For example, the computer system 110 can embed the information into the user interface data, with metadata that associates different user interface elements with corresponding data collection parameters and/or parameter values. As another example, the computer system 110 can provide a table or mapping data that associates user element identifiers with corresponding data collection parameters and/or parameter values, and a script or other code of the user interface 150 can look up the appropriate information. As another example, user interactions with the user interface 150 can trigger the user interface 150 to send a message to the computer system 110 over the network to request the data collection parameters and/or parameter values for a given context or user interaction. When the computer system 110 receives a message indicating that the chart 153 was interacted with, the computer system 110 can look up which records or types of data were used in the chart 153, and then provide to the client device 130a the data collection parameters and/or parameter values for the data shown in the chart 153. To facilitate these techniques, the computer system 110 can track the sets of parameter values used as data is collected, and can also track which data (e.g., which records, which types of data, etc.) are used to generate the respective user interface elements of the user interface 150. Using the tracking data, the computer system 110 can then link an element of the user interface 150 to the underlying collected data used to generate that element, as well as to the data collection parameters and parameter values used to collect the underlying collected data.

The computer system 110 can integrate the functionality to provide user interface elements for viewing and changing data collection parameters into various dashboards, management interfaces, and other user interfaces for monitoring programs. For example, the computer system 110 can use collected monitoring data to provide information for display in a native application, web page, or web application enabling a researcher to view the status of a monitoring program, view results, or run statistical analysis on the data. The computer system 110 can embed, into any or all of the interfaces provided to a researcher, functionality that enables the researcher to easily view relevant data collection parameters that were used to collect the data represented in the user interface, as well as data collection parameters that are currently in effect for the researcher's monitoring program. In some implementations, this can be implemented as a step or phase in generating user interface data, such as to tag or embed a user interface with the elements that will dynamically present context-dependent data collection parameter information and controls into any of various interfaces being provided.

To conserve limited screen space, the information about data collection parameters may initially be hidden in user interfaces, and can then presented in response to a researcher triggering display of data collection controls. This provides a mechanism for researchers to access data collection parameters and associated controls for changing them from any of various user interfaces, without leaving their current context and task. When a researcher triggers display of the data collection controls, the user interface can provide the controls for a subset of data collection parameters that the system determines to be relevant to the current context of the user interface, including the current view and current or recent user interactions of the user with the interface. For example, the user interface can selectively provide controls to view and adjust just a few of potentially dozens of different data collection parameters for the monitoring program, with the displayed controls being selected for and targeted to the current view of the user interface or to a particular region of the screen that the researcher selected or interacted with.

For example, a user interface may include multiple graphs or charts that present data for different physiological and behavioral attributes, with each graph or chart showing multiple data series (e.g., showing time series data or data groupings for different individuals, demographic groups, or cohorts). The system can provide user interface data for user interfaces configured so that, when a user interacts triggers display of data collection controls, the user interface presents the information and controls for the data collection parameters relevant to the particular graph or chart, or particular portion thereof, that the user is viewing or interacted with. If the user taps or clicks a chart showing blood pressure for cohort members, the user interface can show the data collection parameters for blood pressure collection in the monitoring program (e.g., frequency of measurement, devices used for measurement, surveys or software used, precision of data collected, etc.) and controls to change them. If the user taps or clicks a graph showing sleep data for members of the cohort, the user interface can present data collection parameters used for sleep tracking and sleep quality measurement (e.g., surveys used, devices and software used, frequency of measurement, etc.). In the same manner, the system can likewise enable contextually-relevant data collection controls to be provided in response to interaction with specific text descriptions, numerical measures or scores, data sets, records, data fields, statistics, tables, graphs, charts, lists, images, or portions thereof.

When a user adjusts data collection parameters using the data collection controls, the system 100 can perform various steps to make the data collection change take effect for remote devices. This can include changes that affect server-driven and client-driven data collection. For example, the computer system 110 or another server system may send instructions or requests over the network 120 for devices of monitoring program participants to initiate sensor measurements or present surveys. Based on the data collection parameter changes indicated by a researcher or other administrator, the computer system 110 can change the types of data collection the server requests, as well as the timing and other properties of the server's requests to the remote devices, such as client devices 141a-141f. In addition, or as an alternative, the computer system 110 can generate and distribute monitoring program modules and configuration data 174 to client devices 141a-141f. The distributed data packages can be processed by the client devices 141a-141f to configure the client devices 141a-141f to perform ongoing data collection. For example, the updated configuration can set the client devices 141a-141f to perform recurring interactions and sensor measurements such as according to a schedule or set of rules, without the need for the computer system 110 or another server to prompt specific instances of data collection.

The portal provided to researchers 131a-131n provides many other features to enable access to and analysis of collected data 176. These features include the ability to share securely data with recipients, which can be individuals, groups of individuals, organizations, and so on. The computer system 110 enables each instance of sharing to be customized by the user initiating the data sharing, and the computer system 110 makes the shared data available through a customized portal provided to the data sharing recipient. The data sharing recipient can be provided a version of the web-based portal that researchers 131a-131n receive for their monitoring programs, but the data sharing recipient is limited to accessing only a particular subset of monitoring program data (e.g., a subset approved by the user initiating sharing) and is limited to performing only particular actions or functions (e.g., actions or functions approved by the user initiating sharing). As a result, the computer system 110 provides researchers 131a-131n and other authorized users the versatility to control which data is shared and how the shared data is used, as well as to change those properties for each data sharing recipient. In addition, the computer system 110 can facilitate data sharing to any recipient, even if the recipient does not have an existing account or registration with the computer system 110.

In the illustrated example, the user interface 150 includes a region 160 with controls 162 for initiating and defining a new instance of data sharing. The researcher 131a can use the controls 162 to specify various aspects of how the data sharing will occur. These include specifying the recipient, the portion of data shared, the actions or functions that are permitted, and additional features. In the example, the researcher 131a specifies a recipient's email address, "john.doe@harvard.edu." The computer system 110 can provide in the user interface 150 a control to select from a directory or database of users of the system, or enable a user to enter a different form of identification, such as a phone number, e-mail address, etc. The researcher 131a specifies the portion of the "Clinical Trial 1" collected data that will be shared, e.g., only the portion of data from data set 2 that is for cohort 1 and was collected in the year 2020. The researcher 131a specifies how the shared data can be used, whether through by authorizing certain actions and access or by denying certain actions and access. In this example, the researcher 131a specifies that the recipient is authorized to view de-identified data (and cannot view or access personally identifying information for participants), and that the recipient can read or view data and perform statistical analysis. Other functions, such as to share the data, download the data, perform machine learning analysis, and so on are not permitted and are blocked by the computer system 110. The researcher 131a specifies also that usage of the shared data by the recipient should be tracked, and that a usage log and any reports generated with the shared data should be provided to the researcher 131a.

Based on the settings shown in the area 160, the computer system 110 generates a new data sharing record 170 for this data sharing instance from researcher 131a (and the associated Clinical Trial 1) to the specified recipient. The data sharing record 170 specifies the permissions and restrictions applied for the recipient. Based on the data sharing record 170, the computer system 110 provides a customized portal to the recipient, where the customized portal allows access to only the limited portion that the researcher 131a authorized and allows use of only the limited set of portal features that the researcher 131a authorized. As discussed further below, this can include the computer system generating user interface data that tailors the data presented and the interactive controls presented, to customize the recipient's experience and interaction with the shared data as the researcher 131a specified.

When a new sharing instance is initiated, the computer system 110 can notify the recipient, such as through a message through e-mail, a short message service (SMS) text message, or other communication channel. For example, the computer system 110 can provide a hyperlink (e.g., URL, URI, etc.) to gain access to the customized portal for the recipient, or provide a code (e.g., an alphanumeric code, an optical code such as a barcode or QR code, etc.) that encodes an identifier for the new sharing instance. When the recipient accesses the data sharing platform with the information in the message, the computer system 110 can authenticate the recipient, such as through a one-time authorization code sent to the known e-mail address, phone number, or other address for the recipient. Once the user is authenticated, the computer system 110 can then provide access to shared monitoring data 132b in a custom portal that enforces the corresponding restrictions on data access and functions that can be performed.

The computer system 110 can also evaluate monitoring programs to improve performance. This can include learning from the data collection outcomes achieved in various different monitoring programs to identify the data collection parameters that provide the best performance or are predicted based on the historical results to achieve high performance. With this information, the computer system 110 can identify opportunities to change the data collection processes in ongoing monitoring programs, and then make recommendations or make changes to improve monitoring program outcomes (e.g., increase data quality for collected data, increase participant compliance or adherence with monitoring program actions, improve participant retention, etc.). The changes to data collection procedures can be made for different reasons. In some cases, the computer system 110 identifies a problem with current data collection, such as a decrease in participant compliance over time or data quality or completeness that does not meet a target. In other cases, the computer system 110 may predictively or proactively identify an opportunity for improvement, such as by determining that measures of data collection for a monitoring program are below those of similar peer monitoring programs or other references, even though performance may currently meet the minimum targets for the monitoring program.

In general, the quality and reliability of data collection achieved can vary significantly based on which techniques or parameter values are used. For example, providing a long survey daily might cause participants to feel overly burdened and to stop reliably completing the survey. On the other hand, if the same long survey is provide once a week or once a month, users may lose interest and not complete the survey or may take a long time to complete the survey.

The computer system 110 can analyze the results from data collection across many monitoring programs and determine which settings produce the best compliance and data quality. For example, the computer system 110 may determine based on empirical results of studies using a particular survey instrument, that the highest completion rate and highest reliability of answers happens when the survey is presented every other day. For a second survey instrument, the computer system 110 may determine that the highest data quality is achieved by presenting the survey once a week. Similarly, the computer system 110 may determine that for a cohort to achieve 90% compliance in survey completion three times a week, the survey needs to be presented 5 times a week and at varying times to achieve the desired amount and consistency of data. Similar analysis can be performed for surveys of different types of categories, e.g., for different topics or lengths (e.g., surveys with 1-5 questions, 6-10 questions, surveys with 11-15 questions, surveys taking an average of 5 minutes or less, 6-10 minutes, 11-15 minutes, or 15 or more minutes to complete, etc.). Similar analysis can be performed for any of the data collection performed in a monitoring program, including sensor measurements, location tracking, biospecimen sample collection, and so on.

By analyzing the patterns and trends in data collection results achieved using different combinations of data collection parameter values (e.g., using the various different monitoring program protocols 172), the computer system 110 can learn the effects of different data collection techniques and parameter values on monitoring program results (e.g., on data quantity, data quality, data consistency, participant retention, etc.). The computer system 110 can then identify or predict the data collection parameter values (e.g., specifying the techniques used, devices used, surveys used, settings values, timing, frequency, etc.) that will yield the best results. Importantly, the results achieved often depend on context, such as the age and health of the participants, the topic of the monitoring program, the area of health being studied, and so on. The computer system 110 can analyze monitoring program results taking into account these factors to learn how they affect data collection. Then, The computer system 110 can receive data collected for monitoring programs (whether collected through user interactions, sensor measurements, or other means) over a communication network such as the Internet. The computer system 110 then assesses the efficiency and effectiveness of the data collection procedures used in each monitoring program, and can customize those procedures to achieve better results. For example, the computer system 110 can tailor the data collection parameters for each monitoring program separately to better meet the needs of the monitoring program given the monitoring program's characteristics and objectives. This process can include identifying and carrying out changes to monitoring programs to enhance the completeness of data sets, improve the quality of the data sets, improve efficiency of data collection (e.g., reducing client device battery power, network bandwidth usage, storage requirements, etc.), improve compliance or adherence by participants, improve participant retention, or otherwise improve the performance of the data collection for a monitoring program.

Efficient and effective data collection is often critical to the success of monitoring programs, such as clinical trials and other health research. Researchers need high quality data, e.g., accurate and precise data, with an appropriate level of completeness of the data set. Researchers also need high compliance or adherence to the procedures and required activities for the study, as well as high retention of participants throughout the study. One of the reasons that studies have not achieved desired levels of accuracy and completeness of data collection is that researchers lacked tools to assess the performance of their data collection procedures and to adaptively adjust the data collection procedures over the course of the study.

Traditionally, many research studies followed a predominantly static model for data collection, where the types of data collection and procedures used were set in a study protocol at the beginning of the study and were rarely adjusted. While this can provide predictability and consistency, it often leads to inefficiency and sub-optimal data quality. For example, if a clinical trial is created and includes a survey for measuring a user's diet, many systems would continue using that survey even if completion rates for the survey were low or if the data was not as reliable as desired. In many cases, the issues with poor completion rate or poor data quality would not be detected until late in the lifecycle of the study, after it is too late to improve data collection and achieve the level of consistency and completeness needed over a sufficient duration of time before the end of the study.

The ability of the computer system 110 to selectively adjust data collection in monitoring programs is an important tool for to achieving high efficiency. Many monitoring programs, including clinical trials and other health research studies, begin well but ultimately fail to achieve the scope and quality of monitoring needed. This may occur due to participants failing to remain active in the programs, participants failing to comply with program requirements, the data set for a cohort lacking data for participants with an appropriate level of diversity, and other factors. When these monitoring programs fail to be completed or return poor data sets, the computational resources expended for the client devices, servers, and networks involved have been effectively wasted, and many times the programs need to be re-designed and re-run. However, the techniques described herein allow the monitoring performed to be adjusted dynamically, to adapt to changes in participant behavior as well as other potential challenges. This can enable data collection procedures to be adjusted early in the course of a monitoring program, well before monitoring degrades to the extent that the monitoring becomes unreliable or unusable.

The techniques enable changes to data collection of ongoing monitoring programs, whether initiated by an administrator or performed automatically by the system. In some implementations, the system evaluates monitoring data received, and can detect the need for a change in data collection parameters (e.g., detecting participant compliance below a threshold, detecting inaccuracy or high variability, identifying decreasing trends for data quality, etc.). In response to detected conditions, the system can identify which types of data collection need to be adjusted, and which new settings or parameter values are likely to improve data collection performance. The computer system 110 can recommend these for an administrator to approve (e.g., through a portal such as the user interface 150), or, at least in some implementations, the computer system 110 can implement the changes automatically.

In addition, or as an alternative, the computer system 110 can be configured to predictively adjust data collection parameters even before performance falls. For example, through analysis of data collection performance of various different monitoring programs, the computer system 110 can identify the data collection parameters that yield the best performance in different situations. This can be done using statistical analysis, rules-based models, machine learning, or other techniques. The computer system 110 can then apply the information about historical data collection performance to proactively adjust settings of monitoring programs, in order to maintain or improve the monitoring performance. The computer system 110 can perform the analysis and adjustment at a fine-grained level, for example, separately assessing which parameter values are best for different types of data (e.g., blood pressure, heart rate, sleep quality, etc.). For each data type, the computer system 110 can further assess how different contextual factors affect the performance. In other words, even for heart rate measurements, the computer system 110 may learn that the most effective settings are different for different purposes (e.g., fitness tracking vs. detecting cardiac risks), in the context of different diseases (e.g., heart disease, diabetes, etc.), or different participants (e.g., the best parameter values may be vary based on participant age, sex, race, geographic location, technology experience, education, etc.). As a result, the computer system 110 can take into account the particular circumstances of a given monitoring program and its associated cohort of participants to determine the most appropriate data collection changes to perform. The computer system 110 can make changes gradually or iteratively in small increments, and can repeatedly assess the resulting changes in data collection performance to determine whether to make further changes or roll back changes that did not have the desired effects. This provides the computer system 110 with active, closed-loop feedback for making changes, enabling the computer system 110 to vary data collection parameter values and verify that changes made are achieving the desired increases in performance.

In general, the computer system 110 can be used to design and carry out various types of research studies, including observational studies, prospective cohort studies, case-control studies, randomized controlled trials (RCTs), clinical trials, observational trials, longitudinal trials, correlational studies, interventional trials, treatment trials, prevention trials, screening trials, and so on. In some implementations, the monitoring program is a decentralized clinical trial, sometimes referred to as a digital trial or virtual trial, in which trial participants conduct most or all of the monitoring away from medical facilities (e.g., at home, at work, during day-to-day life) using mobile devices and other technology. A program can provide the instructions, software, configuration data, and content to enable a user to enroll in and participate in a corresponding research study. The subject matter of the studies may also vary widely, encompassing studies such as studies of health and disease, pharmaceutical studies, fitness studies, sociological studies, and the like. In some implementations, various different programs offered by the computer system 110 correspond to different clinical trials. The computer system 110, in determining how to select and rank opportunities for individuals and devices to participate in the programs representing different studies, can automatically assess satisfying inclusion criteria or exclusion criteria for clinical trials, in real-time and as information available about participants and studies changes.

The programs can represent different research studies with different types of objectives, including different types of trials for drug development. For example, different types or phases of clinical trials can have different objectives, which can affect the types of data to be collected and conditions to be monitored and thus affect the technology options that are selected by the computer system 110. One program can be for a phase 0 trial, which may be experimental, with the aim to determine how a drug is processed by the body. Another program can be for a phase I trial used to evaluate drug safety and dosage, for example, to find the best dose of a drug that has limited side effects, by gradually increasing dosage until side effects become too severe or positive effects are observed. Another program may be for a phase II trial can be used to assess safety as well as effectiveness of a drug, potentially evaluating effects of a drug in combination with other drugs or other factors. Another program may be for a phase III trial to further assess safety and effectiveness of a drug, for example, to compare effectiveness of a drug with a reference, such as a current standard-of-care drug. As different types of trials have different monitoring and reporting needs, the computer system 110 can use these parameters to determine the profiles for the corresponding programs and to tailor the recommendation and distribution of programs.

The monitoring programs can be designed and implemented to monitor, maintain, and/or improve a user's health and wellness. This includes programs designed to help treat or manage diseases or health conditions, e.g., heart disease, diabetes, cancer, etc. Different programs can be designed and provided for different health conditions and for different types of patients (e.g., different ages, different severities of disease, etc.). The programs may also be used to provide digital therapeutics, including evidence-based therapeutic interventions driven by software programs to prevent, manage, or treat a medical disorder or disease. The programs can be configured to provide contextually relevant interventions to support the health and wellness of a user, can provide adaptive, personalized interventions including content and interactions to improve health of a user. In many cases, the monitoring and adaptive actions of the computer system 110 facilitate precision medicine that is tailored for the needs of individual patients or participants. The computer system 110 can also be used to deliver a variety of digital therapeutics, including deliver of interactions through a user's remote device that are tailored for a user's health needs and current context.

Figure 2:
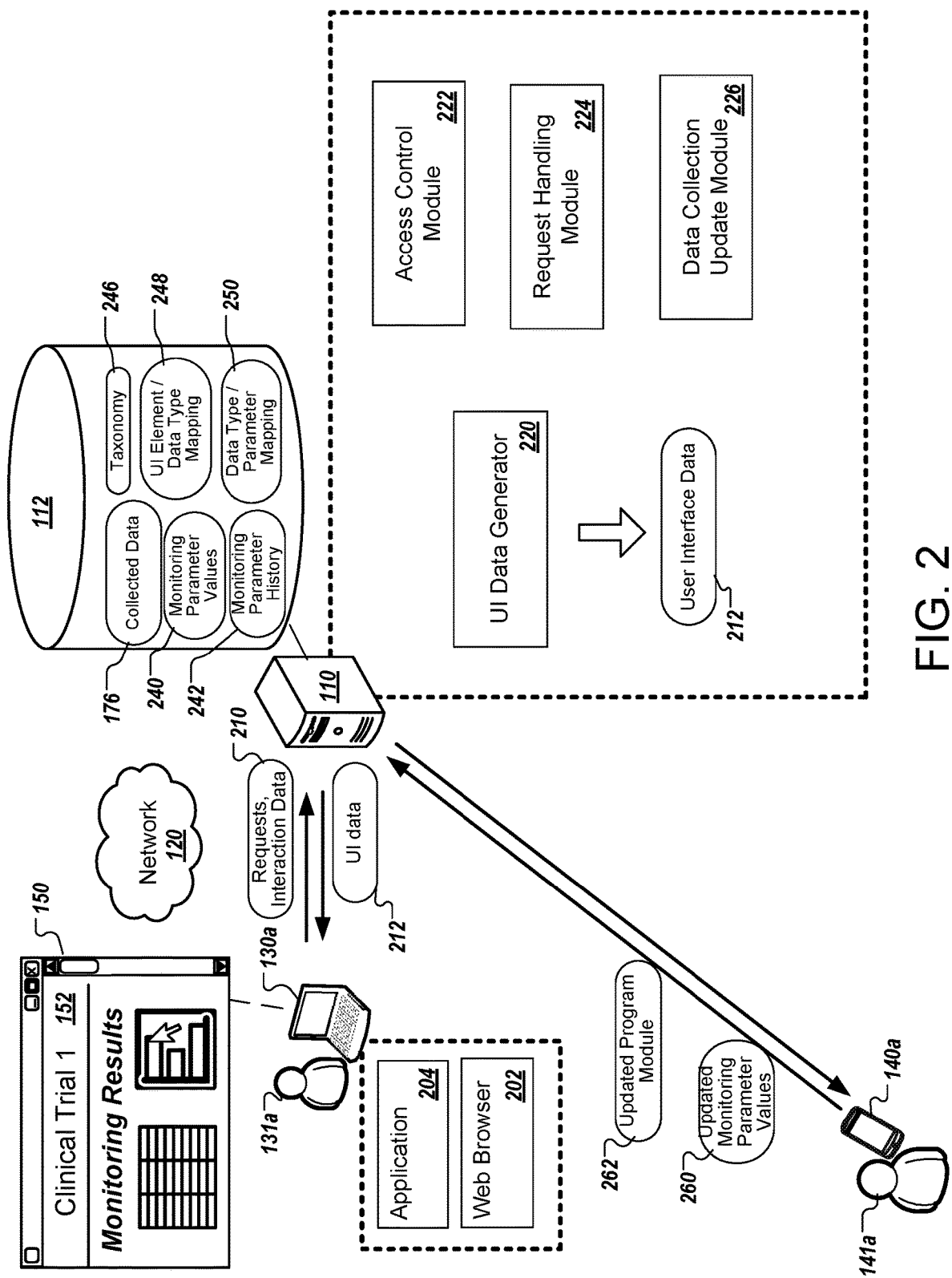
FIG. 2 is a diagram that illustrates techniques for providing user interfaces for adjusting monitoring performed using remote devices.

FIG. 2 is a diagram that illustrates techniques for providing user interfaces for adjusting monitoring performed using remote devices. The example of FIG. 2 explains in further detail how the computer system 110 facilitates presentation of data collection parameter information in the panel 154 as discussed in FIG. 1. This includes features to associate different instances of collected data with the data collection parameters used to collect the various instances of collected data (e.g., settings that were active or which affected the process of collecting the data).

In addition, the computer system 110 can generate user interface data presented in the user interface 150, and when generating the user interface data the computer system 110 can identify and record which instances of collected data relate to the respective user interface elements. By tracking this information the computer system 110 can identify and present the data collection information that is most relevant to each user interface element. In other words, the computer system 110 can store information specifying relationships among (1) the displayable user interface elements, (2) the underlying collected data that the respective user interface elements represent (or from which the user interface elements were derived), and (3) the data collection parameters and values of those parameters that were used and are currently set to be used for future data collection. The computer system 110 can then embed the information about these relationships in the user interface data, or the computer system 110 can use the relationships to respond to messages from the client device 130a to provide content for presentation in response to user interaction.

The computer system 110 provides tools that enable researchers to quickly determine how their various data collection procedures are performing and to easily make adjustments. For example, when the computer system 110 provides a researcher portal, such as a web-based application, the computer system 110 tracks the relationships between types of data collected, monitoring results obtained, and the elements presented in the researcher portal. With this information, the computer system 110 can integrate or embed information about the data collection procedures used, so the data collection parameter information can be accessed from (e.g., through interaction with) any part of the interface 150 where collected monitoring data is mentioned, used, or otherwise represented. The computer system 110 can also integrate or embed data collection adjustment controls to adjust the data collection procedures that will be used in the future. When a researcher indicates a change to a data collection parameter, the computer system 110 can respond by making all the necessary adjustments to make the new data collection procedure take affect at remote client devices, e.g., distributing updated configuration data for the client devices, changing server-directed data collection activities, updating the study protocol, and so on.

The computer system 110 provides the researcher portal in a way that the data collection controls are shown in a contextual, space-efficient manner. For example, the set of controls can be tailored to the particular user interface view being shown, or even to the specific elements or elements that the user is interacting with. In addition, the data collection controls can be initially hidden from view, but can be dynamically called into view in response to certain types of user interactions or inputs. For example, in the researcher portal, if a user taps or hovers on a chart or table in a report, the interface 150 can dynamically generate and present data collection controls for the particular types of monitoring data represented in the chart or table. This provides a contextually-relevant and screen-space-efficient set of controls that can indicate the data collection parameters that have been used to collect the data described in the chart or table. The same controls can also provide the ability to directly change those parameters for ongoing or future data collection.

In the example of FIG. 2, the researcher portal is provided as a web page or web application, and the researcher 131a accesses the interface 150 of the researcher portal using a web browser 202. In other implementations, the same functionality discussed for the user interface 150 and 300 can be provided through another application 204, such as a native application that is not a web browser or does not render web content.

The user 131a logs in to authenticate to the system. The client device 130a sends requests 210 and interaction data to the computer system 110 over the network 120. For example, when the user 131a logs in and requests access to the researcher portal, the computer system 110 receives the request and generates and provides user interface data 212 in response. The user interface data 212 can be content that, when rendered by the web browser 202, provides the user interface 150 with the functionality to dynamically provide contextually-relevant data collection parameter information and adjustment controls.

To facilitate the generation of the user interface data 212, the computer system 110 can store and use various types of data. The stored data and the relationships created and maintained during data collection enable the computer system 110 to link each instance of data collection (e.g., each sensor measurement, each survey response, etc.) with the data collection parameter values used to collect that piece of data. For example, the computer system 212 can store a taxonomy 246 that specifies the various types of data that can be measured in monitoring programs (e.g., resting heart rate, peak heart rate, blood pressure, step count, body weight, blood oxygenation level, blood glucose level, etc.). The taxonomy 246 can assign a code for each of the different types of data (e.g., resting heart rate assigned code "1," peak heart rate assigned code "2," etc.) as a consistent identifier to use for the various types of data. The taxonomy 246 can be used across multiple monitoring programs or may be specified for a single monitoring program.

The taxonomy 246 can also specify the various parameters that affect data collection for each type of data. For example, for resting heart rate, the data collection parameters may include measurement frequency (e.g., how often a measurement is performed, such as every 30 minutes), a measurement window duration (e.g., each measurement involves measuring for 15 seconds), a sampling rate to apply during the measurement window, a precision for data collection (e.g., rounded to the nearest 1 beats per minute), and so on. As a result, for each type of data, the taxonomy 246 can specify the set of data collection parameters that correspond to and affect collection of that type of data. The data collection parameters can also be assigned codes (e.g., measurement frequency can be assigned code "A1," precision can be assigned code "A2," and so on). In some implementations, the relationship between each data type and the corresponding set of data collection parameters that are relevant to it is stored in separate mapping data, such as mapping data 250 associating data types with respective parameters.

As monitoring data is collected from the remote devices, the computer system 110 can identify and record the type of data represented by each collected piece of data. This can include tagging or otherwise specifying the semantic meaning of each piece of data, so that a measurement such as "62" can be understood as representing a resting heart rate in beats per minute (bpm), rather representing a blood pressure, a respiration rate, or another type of data. Collected data can have the meaning or type of data specified through the structure of the database or data storage 112, such as by storing the value in field located in a column of a database table, where the column is defined or labeled to have a particular semantic meaning. In structured or unstructured data, particular pieces of data or groups of data items can be associated with metadata that specifies the type of data, such as through a tag for the collected data that specifies one of the data type codes from the taxonomy 246.

The computer system 110 also stores the current monitoring parameter values 240 that are set for the monitoring program. This information can be stored in the monitoring program protocol 172 or other stored information. The current monitoring parameter values 240 can be organized and specified according to the categories or hierarchies specified in the taxonomy 246. For example, for the data type assigned code "1" (e.g., resting heart rate), the monitoring program protocol 172 can specify a parameter value of 30 minutes for data collection parameter assigned code "A1" (e.g., measurement frequency) and can specify a parameter value of 1 bpm for the data collection parameter assigned code "A2" (e.g., precision). For another data type, such as blood pressure or step count, parameter values may be set and stored for the same or different data collection parameters as with resting heart rate. For example, the blood pressure data type can have values set for the measurement frequency and precision data collection parameters, but the values may be different for blood pressure data collection than for resting heart rate data collection (e.g., measurement twice a day and with precision to nearest 5 mmHg for blood pressure, instead of measurement every 30 minutes and with precision to nearest 1 bpm for resting heart rate).

When new pieces of monitoring data are collected, the computer system 110 can often infer that the new data was collected using the set of relevant data collection parameters that are active (e.g., as specified in the current monitoring parameter values 240) at the time of collection (e.g., measurement, sensor data acquisition, user interaction, etc.). The computer system 110 can store a monitoring parameter history 242 for the monitoring program, to indicate the sets of data collection parameter values that were set and used at different times. For example, this can be stored as the initial data collection parameter values set for the monitoring program, and then a list of changes to the parameter values and the times of the changes. As another example, the monitoring parameter history 242 can specify time ranges and the different sets of data collection parameter values active during the respective time ranges. In addition, if different sets of data collection parameter values are used for different participants or remote devices or if some data collection deviates from the specified parameter values, the parameter values used in each case can be specified individually. With the monitoring parameter history 242, the computer system 110 can look up the set of data collection parameters used for any measurement or piece of data in the collected data 176, using the time of data collection (e.g., a timestamp) and the type of data represented by the piece of data (e.g., the data type code from the taxonomy). This avoids the need to store multiple copies of the parameter values used. Although the computer system 110 may optionally tag or associate each piece of data with metadata specifying the parameter values used for its data collection, this is not required with the monitoring parameter history 242 available.

The computer system 110 uses a user interface (UI) data generator 220 to create the user interface data 212. The UI data generator 220 can use a variety of templates and resources to provide the content of the researcher portal. In the process of generating the user interface data 212, the UI data generator 220 performs a number of operations to enable the user interface 150 able to provide the panel 154 and similar panels for other portions of the user interface 150. For example, as the UI data generator 220 retrieves data elements from the collected data 176 to generate user interface elements and populate fields in the UI data 212, the UI data generator 220 identifies and stores data indicting which portions of the collected data 176 are used for each portion of the user interface 150. These relationships can be captured in mapping data 248, which can specify a mapping between user interface elements and data types. In other words, as the UI data generator 220 accesses the collected data 176 to generate different user interface elements, the UI data generator 220 can identify and record which types of data were used (and potentially the specific data elements used) to generate each user interface element. This information about which data types are relevant to each user interface element can be stored in the mapping data 248. In some implementations, as discussed further below, the information may be incorporated into the generated user interface data 212, e.g., with a metadata tag for each of various user interface elements to indicate the data type(s) associated with the element.

As an example, as the UI data generator 220 generates text for a first part of the user interface 150, the computer system 110 may determine that the text is extracted from or generated based on a first record in the collected data 176. The computer system 110 identifies, from the collected data 176, the type of data represented (e.g., from metadata specifying a data type code recorded with the collected data, from a label for a column of a database from which the text was extracted, from a database schema, etc.). For example, a data type code associated with the record can specify that the record represent a sleep quality survey response. In addition, the computer system 110 also determines the time that the data in the first record was collected (e.g., from a data collection timestamp for the first record). The computer system 110 can determine the data types and collection times for monitoring data associated with various portions of the user interface 150 as the UI data generator 220 accesses collected monitoring data 176 to produce the user interface data 212 for those portions. For example, the computer system 110 can determine, based on data type codes associated with the portions of collected data 176 accessed, that a second part of the user interface (e.g., a measurement value) is based on data representing a resting heart rate, and that a third part of the user interface (e.g., a visualization) is derived from blood pressure measurements. The collection times for the underlying collected data is determined for these items also. With this information, the computer system 110 records the mapping data 248 to associate the first portion of the user interface 150 with the sleep quality survey data type, associate the second portion of the user interface 150 with the resting heart rate data type, and associate the third part of the user interface 150 with the blood pressure measurement data type. Various elements of the user interface 150 (e.g., text, images, charts, graphs, etc.) can be assigned element identifiers, and the mapping data 248 can indicate the correspondence between UI element identifiers and the determined data type codes. The collection times determined can also be stored in the mapping data 248.

The computer system 110 can use the stored data 112 to determine the data collection parameters and parameter values relevant for a user interface element. For example, for a given user interface element, the computer system 110 can use the mapping data 248 to determine the data type and collection time for the portion of monitoring data relevant to the user interface element. With this information, the computer system 110 looks up the monitoring parameters that correspond to the type of data, using the taxonomy 246 and or the mapping data 250. The computer system 110 also uses the monitoring parameter history 242 to look up the parameter values that were active at the time of data collection. As a result, for any user interface element in the interface being generated, the computer system 110 can look up the relevant data types (e.g., based on the mapping data 248), the data collection parameters that affect collection for those data types (e.g., based on the mapping data 250), the current parameter values for the data collection parameters (e.g., based on the current monitoring parameter values 240), and the parameter values previously used if they are different (e.g., using the monitoring parameter history 242 and the time of data collection). In other implementations, data collection parameters used can be specified directly in the collected data 176 as metadata for each collection instance, and those parameter values can be retrieved more directly from the collected data 176.

The computer system 110 can use any of various different techniques to cause the user interface 150 to be able to dynamically display the data collection parameter information and adjustment controls for different user interface elements. One technique is to include or embed the data parameter information in the user interface data 212. For example, the user interface data 212 can include the data parameter information for data parameter panels in advance of user interaction with the user interface 150. Another technique is to provide user interface data 212 that does not include all the data parameter information, but which causes data parameter information to be requested in response to user interaction. For example, when the user interacts with the chart 153, the client device 131*a* sends a message identifying the chart 153 that was interacted with, and the computer system 110 responds by providing the data parameter information for the panel 154. For both techniques, the user interface data 212 can include script content or other content that causes the web browser 202 to detect interaction with specific user interface elements or portions of the user interface 150 and to trigger display of a data collection panel targeted to the current context and interaction in the user interface 150.

In further detail, the computer system 110 can generate and provide the user interface data 212 to include, in advance of user interaction, data parameter information for various user interface elements in the user interface data 212. For example, in this technique, the user interface data 212 from the computer system 110 includes all of the information the client device 130*a* would need to display data collection parameter panels for the user interface elements in the user interface 150 (e.g., data for the panel 154 for chart 153, as well as data for similar panels for each of multiple other user interface elements). The data collection parameter data is provided in a way that the panels are initially hidden and not displayed in the initial presentation of the user interface 150. Because the content for the data collection parameter panels is received as part of loading the user interface 150, when the user interface 150 is rendered, the client device 130*a* can immediately provide the data collection parameter panels for any of the user interface elements that the user 131*a* may interact with in the user interface 150.

The user interface data 212 can include several types of information for each user interface element in the user interface 150 that represents or is derived from collected monitoring data 176. For example, for each different panel that can be presented can be specified, with the text, collection parameter values, and adjustment controls indicated, along with layout and formatting information to arrange the content of the panel. In some implementations, a template for panels is provided and used. For each panel, the panel information to populate the panel is specified, e.g., identifying the data type and data collection parameter(s) described in the panel, values of the current monitoring parameter values 240 for the applicable data collection parameter(s), and which of the parameter values can be adjusted and in what way (e.g., through text entry, number entry, selection from a list, etc., so the adjustment controls can be presented appropriately). If the parameter values used to collect the underlying data used to generate the user interface element are different from the current parameter values for collecting that type of data, the computer system 110 can include the previous parameter values that were used, as determined from the monitoring parameter history 242.

The monitoring parameter information can be included in the user interface data 212 in various ways. For example, the data for the panel for each user interface element can be included in document content, such as in metadata, markup language tags, etc., as part of the content or definition of each user interface element. As another example, the data for the panels can be stored in a different section, or in a separate resource or file. Each user interface element (or specific portions of them) can be assigned an identifier, and the sets of panel information can be associated with the identifiers. As a result, when a user interacts with a user interface element of the user interface 150, script content or other functionality of the user interface 150 can look up and present the appropriate panel information that corresponds to the identifier of the user interface element the user interacted with.

In some implementations, the computer system 110 performs additional contextual analysis to define panel content, besides determining which portions of collected monitoring data 176 and which types of data were used to generate a specific portion of the user interface. For example, a particular user interface element may be based on multiple types of data, or one type of data may have many parameters that affect it, and the potential items for display may exceed the limited space available in a panel. As a result, the computer system 110 can rank or filter the set of data types and/or parameter values described, or otherwise selectively determine a subset of relevant items to present. In some implementations, the computer system 110 has a predetermined ranking or priority for data collection parameters for different types of data, and so the three top-ranked parameters can be indicated, while others are omitted.

In other implementations, scoring and ranking of items to include in a panel is performed in a customized way based on the characteristics of the monitoring program or the behavior of the user 131*a*. For example, the computer system 110 can identify data types or parameter values that are most important based on the level of interaction of the user 131*a* with those data types and parameter values. For example, if the 131*a* interacts with heart rate data elements more than blood pressure content (e.g., in the current session or across multiple sessions of using the researcher portal), then the heart rate data is preferred. Similarly, parameters that are adjustable by the user (e.g., given the nature of the collection technique, the protocol 172 requirement, the user's level of authorization) can be preferred. In addition, parameters that have been adjusted most often or most frequently can be preferred for display.

The computer system 110 can also take into account additional context information to select items to include in a panel. For example, the computer system 110 can analyze the context of the rest of the user interface 150 to determine the prevalence or emphasis of certain types of data over others. For example, if 10 elements in the page or 60% of the page has elements determined to be associated with heart rate data, parameters for that data type can be preferred over information about sleep quality data collection that has perhaps only 1 element covering 5% of the page or perhaps is not represented in other content of the page at all. The computer system 110 can also store a database with keywords (e.g., words, phrases, etc.) that correspond to different data types and data collection parameters. The computer system 110 can analyze the text content to be included in the user interface data 212, to identify keywords and then prioritize various data types and data collection parameters according to the amount and frequency with which the keywords appear. Similarly, the proximity of identified keywords to a user interface element (e.g., adjacent to or in neighboring user interface elements) can also indicate a high importance of the data type or data collection parameter corresponding to the keyword.

In general, the computer system 110 can select or order items to include in a panel use the context of the user 131a, a task of the user 131a, the content of the user interface 150 being generated, and history of interactions (e.g., of the user 131a specifically, and with other users interacting with data of the same monitoring program). For example, if the user interface 150 was provided to two different researchers for the same monitoring program, the panel content for a user interface element may be tailored differently for different users. As an example, for a user interface element based on many data types, the computer system 110 may select panel content for a cardiologist that emphasizes cardiac data collection, while the panel content selected for a nutritionist may emphasize diet data collection instead, even for interaction with the same user interface element. In addition, as the nutritionist interacts with cardiac data in the panel or other parts of the user interface 150, the computer system 110 may learn the interest and preference of the user and increase emphasis on the cardiac data in future panels provided (e.g., by increasing an amount of cardiac data collection parameters shown, by positioning the cardiac parameter information higher in the panel, etc.).

In some implementations, the actions of the UI data generator 220 can be split among multiple modules, steps, or stages. For example, a first module can generate web page content for the entire interface 150, and can include temporary tags indicating the types of data or sources of data (e.g., records, columns or fields of a database table, etc.) used to generate different user interface elements. In a second pass, another module may analyze the web page content generated. In this process, the second module can identify the temporary tags, look up the current parameter values and/or former parameter values for those tags, and then insert the parameter values and other panel content in place of the temporary tags to complete the user interface data 212. In other words, the user interface is generated first, and then analyzed to add the data collection panel information for user interface elements. This two-stage process can enhance the ability of the computer system 110 to use the context of other user interface elements and keywords to define the panel contents. For example, the primary content of the user interface 150 is complete at the end of the first stage, including the layout and arrangement of user interface elements, the overall set of keywords and the proximity and prevalence of different keywords in different sections of the user interface 150 can be known more accurately during the second stage when the panel content is defined. In addition, the two-stage process can more easily integrate the addition of dynamically presented data collection panels to a wide variety of interfaces, including potentially the third-party interfaces or interfaces of other systems.

In some implementations, instead of incorporating data collection panel information into the user interface data 212, the user interface 150 is configured to cause the client device 130a to request panel information in response to user interaction. For example, the user interface data 212 can include script, code, or other functionality that causes the web browser 202 to listen for interaction events with various user interface elements in the user interface 150. The user interface data 212 specifies that, when interaction with an appropriate user interface element is detected, this triggers the web browser 202 to send a message to the computer system 110 over the network 120 to request the panel information to display for the user interface element interacted with. In other words, on detection of an interaction, the web browser requests and loads the UI element just in time, in response to the user interaction.

To facilitate on-demand requests to the computer system 110, the UI data generator 220 can include metadata that indicates user interface element identifiers or data type codes. When a user interaction occurs with an element in the user interface 150, the script content of the user interface data triggers the client device 130a to send a message to the computer system 110. The message includes the user interface element identifier and/or data type code from the metadata for the user interface element interacted with. When the computer system 110 receives the message, a request handling module 224 extracts the user interface element identifier and/or data type code, and uses the extracted data to identify the relevant data collection parameters and parameter values. For example, when a user interface element identifier is provided, the computer system 110 uses the mapping data 248 to identify the data type (e.g., semantic meaning or category of data, indicating the property measured) previously determined to be applicable to the underlying data used to generate the user interface element. Similarly, a data type code in the message from the client device 130a can directly indicate the data type. With the data type identified, the request handling module 224 can look up the data collection parameters applicable for the data type using the mapping data 250, and can look up the current and/or former parameter values for the identified data collection parameters using the monitoring parameter values 240 and monitoring parameter history 240.

With the relevant data collection parameters and parameter values determined, the request handling module 224 can generate the arrangement of the items for display, including interactive adjustment controls for data collection parameter values that can be changed. The computer system 110 sends the resulting data package with the data collection panel content to the client device 130a over the network 120, and the web browser 202 uses the content to present the data collection panel in response to the user interaction.

The computer system 110 also handles updates to data collection parameter values made using the adjustment controls in the data collection panels. For example, if the user 131a uses the control 155 in the panel 154 (see FIG. 1) to change monitoring frequency to twice daily, the computer system 110 can update the parameter values 240 and the protocol 172 to indicate the new parameter value for heart rate measurement frequency. The computer system 110 also updates the monitoring parameter history 242 to indicate the change and the time the change occurred.

The computer system 110 also causes data collection to change at remote devices for the monitoring program. Typically, the data collection parameter values apply to multiple participants in a monitoring program or to the monitoring program as a whole. For example, the set of monitoring parameter values 240 can apply to an entire cohort of multiple participants, or to multiple cohorts or all participants in the monitoring program. As a result, changes to the data collection parameter values used generally involves changes to operation of many remote devices providing data in the monitoring program. For server-directed data collection, where the computer system 110 sends discrete requests for each data collection event, the computer system 110 can simply change the frequency or nature of data collection requests sent to the remote devices. For many types of data collection, however, remote devices manage and initiate much of the data collection, with scheduled data collection actions or data collection triggered by detected events or conditions.

To change the client device operation, the computer system 110 can generate and send various data packages configured to change how remote devices perform monitoring, in accordance with the new, researcher-specified data collection parameter values. In some cases, the computer system 110 can send updated monitoring parameter values 260 over the network 120, and client-side software (e.g., an application and program module for the monitoring program) can adjust the data collection operation accordingly. For example, by specifying an increase in measurement frequency for heart rate data, the software on the client devices 141*a*-141*f* can change the frequency that heart rate measurements are initiated (e.g., from once a day to twice a day). Other configuration data can also be provided as needed, such as data specifying sensor settings to use. In some cases, an updated program module 262 for the monitoring program is provide to the client devices 141*a*-141*f*, which may include additional information such as changes to rules or triggers for collecting different types of data, providing new survey content, providing software or media changing user interfaces provided to participants, and so on.

The updated parameter values 260 and/or updated program module 262 provided to remote devices can adjust operation of the remote devices in any of various ways to facilitate research and align with the changes a researcher specifies, or which are automatically determined to be appropriate by the computer system 110. This can be performed by sending configuration data in various forms. The computer system 110 can configure devices and causing them to acquire data for the second types of data and providing the acquired data to a server over the communication network. This can include distributing a program module for the sub-study or other configuration data to remote devices associated with users selected for a sub-study cohort. Distributing the configuration data can include transmitting, to each of the one or more devices, configuration data configured to adjust operation of the remote devices to set or change sensor parameters used by the remote device to conduct sensor measurements using one or more sensors, including changing at least one of a set of sensors used, a type of property measured, a timing of the sensor measurements, a frequency of the sensor measurements, a level of accuracy or precision for the sensor measurements, rules for evaluating validity or quality of the sensor measurements, sets of events or conditions that trigger initiation of the sensor measurements, software settings for an application or operating system in order to enable the sensor measurements, or a set of post-measurement processing steps to perform for data collected by the sensor measurements.

The configuration data provided to remote devices can set parameters for operating and using various types of sensors including accelerometers, gyroscope sensors, inertial measurement units, GPS receivers, cameras, microphones, pressure sensors, heart rate sensors, EKG sensors, and more. The configuration data can also instruct measurements to be performed using connected devices, such as weight scales, glucometers, blood pressure cuffs, and so on.

The configuration data provided to remote devices can be configured to adjust operation of the remote devices to set or change data storage parameters used by the remote device to format or store data acquired for the program to a server system over a computer network, the data storage parameters specifying at least one of: a format for a message, data stream, or data package to provide the data from the sensor measurements; an aggregation operation for aggregating measurements of the sensor data; a filtering operation for filtering or smoothing results of the sensor measurements; or an accuracy or precision setting for storing results of the sensor measurements.

The configuration data provided to remote devices can be configured to adjust operation of the remote devices to set or change network communication parameters used by the remote device to report data acquired for the program to a server system over a computer network, the network communication parameters comprising at least one of a server or network address to which acquired data is transmitted, a network protocol or encryption scheme to use in transmitting acquired data, one or more events or conditions that trigger transmission of acquired data, or one or more ranges or thresholds that trigger transmission of acquired data.

The configuration data provided to remote devices can cause remote devices to perform various changes or configuration actions, often without requiring user action once the user enrolls in the program. The actions can include: enabling or disabling a sensor of the remote device or a device communicatively coupled to the remote device; setting or changing sensor parameters used by the remote device to conduct sensor measurements using one or more sensors, including changing at least one of a set of sensors used, a type of property measured, a timing of the sensor measurements, a frequency of the sensor measurements, a level of accuracy or precision for the sensor measurements, rules for evaluating validity or quality of the sensor measurements, sets of events or conditions that trigger initiation of the sensor measurements, software settings for an application or operating system in order to enable the sensor measurements, or a set of post-measurement processing steps to perform for data collected by the sensor measurements; setting or changing data storage parameters used by the remote device to format or store data acquired for the program to a server system over a computer network, the data storage parameters specifying at least one of: a format for a message, data stream, or data package to provide the data from the sensor measurements; an aggregation operation for aggregating measurements of the sensor data; a filtering operation for filtering or smoothing results of the sensor measurements; or an accuracy or precision setting for storing results of the sensor measurements; setting or changing network communication parameters used by the remote device to report data acquired for the program to a server system over a computer network, the network communication parameters comprising at least one of a server or network address to which acquired data is transmitted, a network protocol or encryption scheme to use in transmitting acquired data, one or more events or conditions that trigger transmission of acquired data, or one or more ranges or thresholds that trigger transmission of acquired data; setting or changing power usage parameters of the remote device, including changing a device power state or sleep setting of the remote device; altering a user interface of an application installed at the remote device, including changing a set of interactive user input controls presented in the user interface; setting or changing interactive content to be presented by the remote device as part of the program, the interactive content including at least one survey, prompt, or electronic form; or setting or changing parameters for presenting the interactive content that includes at least one of timing, frequency, format, triggers, or contexts for providing the interactive content.

The example of FIG. 2 shows information for a single monitoring program, but the same techniques can be used by the computer system 110 to separately and concurrently provide user interfaces and controls for data collection parameters for each of multiple monitoring programs. The information shown in the data storage 112 can be generated and stored separately for each monitoring program, so the data collection parameter values used and the panel interfaces are customized for each monitoring program's characteristics and collected monitoring data. In addition, the techniques for identifying, displaying, and presenting adjustment controls for data collection parameter values can be used to provide information about and controls to adjust other parameters of the monitoring program. These include parameters for the monitoring program itself (e.g., duration, number of participants, cohort composition, etc.), for communication with participants (e.g., sending reminders, sending clinical data, etc.), and for network properties (e.g., determining when and how frequently collected data is sent, changing batch sizes and caching at remote devices, etc.).

FIGS. 3A-3D are diagrams that illustrate examples of user interfaces for presenting and changing monitoring program parameters. FIGS. 3A-3D each show a user interface 300 and different types of interactions and ways that data collection parameter values used and adjustment controls can be provided.

Figure 3A:
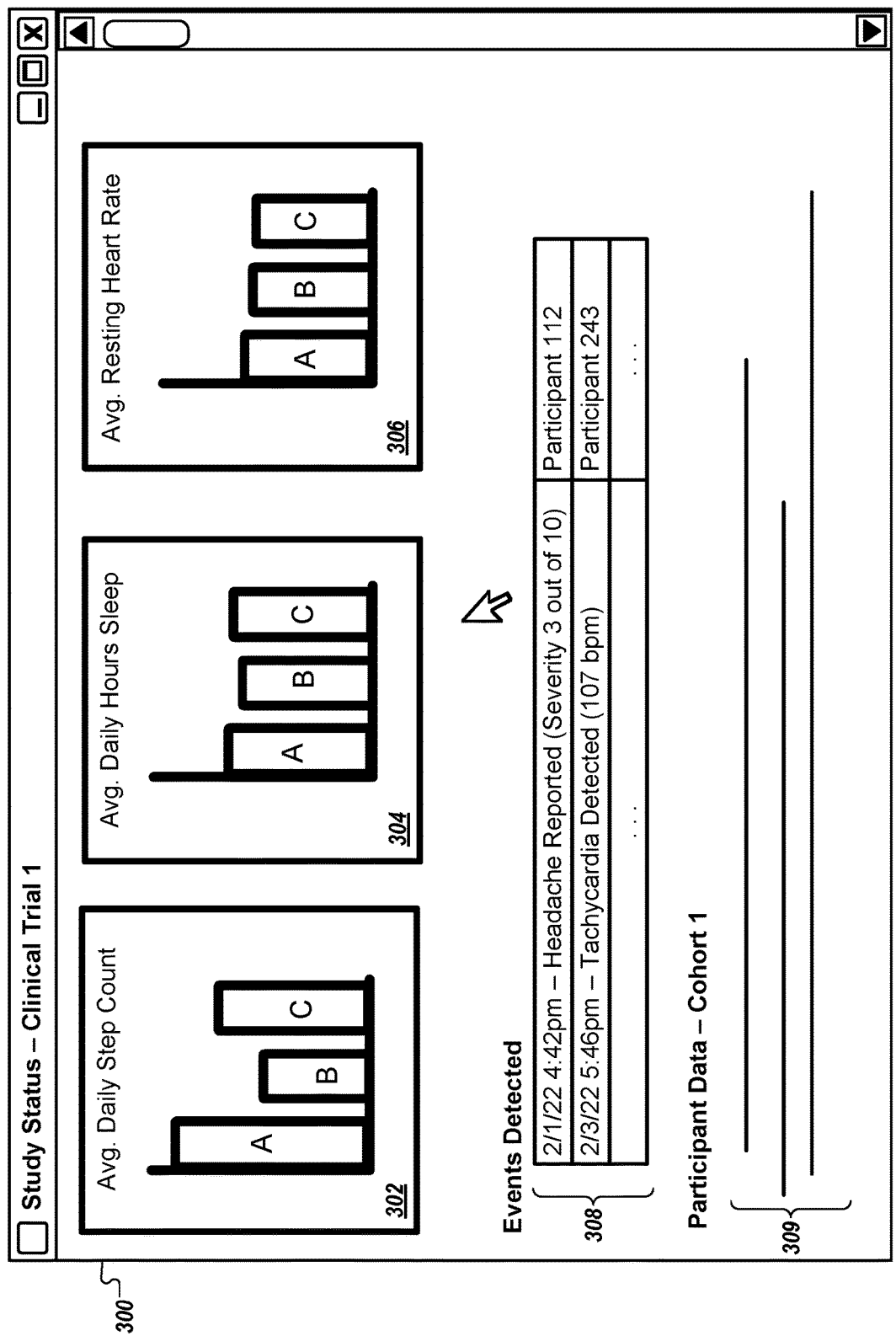
FIGS. 3A-3D are diagrams that illustrate examples of user interfaces for presenting and changing monitoring program parameters.

Referring to FIG. 3A, the user interface 300 represents an interface presented to a researcher 131a-131n to provide monitoring data from a monitoring program. The user interface 300 can provide information about the status of the monitoring program, controls to update or change the monitoring program, controls to perform data analysis and other operations, and so on. The user interface 300 can be any of various types of interfaces, such as an overview or dashboard, or a report on compliance, retention, health outcomes, or other information from the monitoring program. The user interface 300 in the example is not a settings page or user interface focused on listing or changing settings of the monitoring program. Instead, the focus of the user interface 300 and the screen area used are used to present results of monitoring and the data collected.

The user interface 300 provides several charts 302, 304, 306 that represent different measured characteristics for different groups of participants, labeled A, B, and C. The chart 302 shows average daily step count, the chart 304 shows average daily hours of sleep, and the chart 306 shows average resting heart rate. The user interface also includes an event list 308 showing information about various events detected through the monitoring performed. The user interface also shows additional participant data 309 for a particular cohort, Cohort 1.

Initially, as shown in FIG. 3A, the user interface 300 does not present the data collection parameters used to collect the various types of data reflected in the charts 302, 304, 306, the event list 308, or the participant data 309. The user interface 300 also does not present adjustment controls for altering the data collection parameters used for current or future data collection in the monitoring program. Nevertheless, the user interface 300 is configured to respond to at least some user interactions to provide information and adjustment controls for selected data collection parameters determined to be relevant to the portions of the user interface 300 that the user interacts with. The system conserves limited user interface area by hiding or not displaying the data collection parameter information until it is needed. In a user interface such as shown in user interface 300, with a variety of different types of collected data shown and represented, it generally would not be feasible to show all of the relevant data collection parameter values and their associations with specific portions of the user interface. In addition, attempting to provide all of the data collection parameter information in advance would likely reduce the viewer's ability to understand and interpret the monitoring results, which is the primary purpose of the user interface.

Figure 3B:
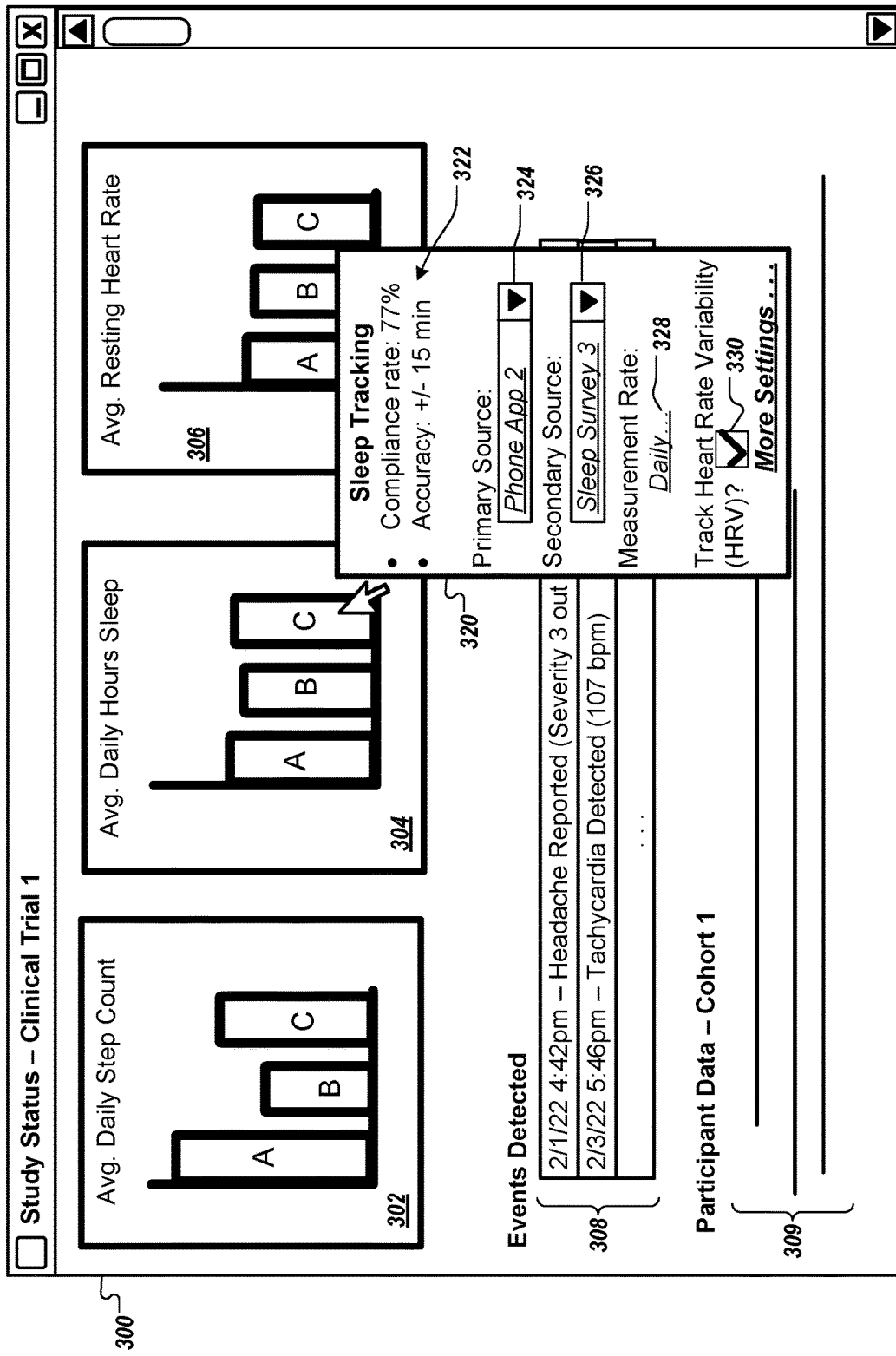

Referring to FIG. 3B, the user has interacted with a the chart 304, such as by clicking or hovering on the column for participant group C. The user may alternatively use a touchscreen interface to tap, press and hold, swipe, or otherwise interact with the user interface elements. The user's client device detects the interaction, and in response, causes the user interface 300 to provide a panel 320 with data collection parameter information and adjustment controls. The panel 320 is shown as an overlay or pop-up in FIG. 3B, but other techniques for presenting the information in the panel 320 can be used. For example, instead of an overlay panel, the information may be populated into another area of the user interface 300 (e.g., a sidebar, an inline frame, etc.). As another example, a region can be inserted in the interface 300 to include the information, e.g., expanding or inserting the content into the interface 300 below or to the side of the chart 304. Other techniques can also be used to dynamically show the information in response to user interaction and then hide the information after it is used.

The user interface data for the user interface 300 can include content of a web page or web application provided over the network 120. The user interface data can include interpretable or executable code, e.g., script content, that detects user interactions and triggers processing in response. In this case, the user interface data is interpreted and rendered in the web browser so that the user interface 300 determines which element was interacted with (e.g., the chart 304) and then identifies the corresponding measured data item (e.g., average daily hours of sleep) represented by the element interacted with. The user interface 300 the presents the panel 320, which includes various types of information about the sleep tracking data collection parameters that affect collection of the sleep data shown in the chart 304.

In the example, the panel 320 shows performance information 322 about the sleep tracking process, including the rate of compliance among participants (e.g., 77% of participants provide the requested level of data) as well as the accuracy of the recorded sleep totals measured (e.g., plus or minus 15 minutes). This information 322 can include further indicate trends (e.g., whether compliance or accuracy is increasing or decreasing), a goal or target for performance and status with respect to goal or target (e.g., indicating whether the accuracy, compliance, or other measure of data collection performance is meeting a threshold level for the monitoring program), alerts that performance is low or that the data collection parameters need to be adjusted, and so on.

The panel 320 also indicates various parameters that affect the sleep data collection and the parameter values or settings used. These include sources of the sleep information, e.g., a phone application "Phone App 2" as a primary source of information and a survey "Sleep Survey 3" as a secondary source of information. The panel 320 also shows the measurement rate (e.g., daily measurement), and whether heart rate variability (HRV) is being tracked. Along with the information about the parameters, the panel 320 provides interactive controls enabling the user to change the data collection parameters to be used. For example, the drop-down control 324 enables the user to change the primary source for sleep tracking information, and the drop-down control 326 enables the user to change the secondary source for sleep tracking information. The control 328 is a hyperlink that opens a further interface to set the measurement rate or frequency of measurement. The control 330 is a checkbox that the user can check or uncheck to set whether HRV will be tracked for participants.

After the user finished viewing the panel 320 and moves the mouse away from the chart 304 and the panel 320, the user interface 300 can automatically hide the panel 320. As a result, the user interface 300 avoids interrupting the view of the other portions of the user interface 300 with the panel 320 when the information in the panel 320 is no longer applicable to the current user interaction or focus.

When the user changes parameter values in the panel 320, the computer system 110 automatically updates the protocol 172, monitoring instructions 142, monitoring program module and configuration data 174, and other information as needed to cause the changes parameter values to take effect. In some implementations, when changes are made, the user interface optionally requests an additional confirmation for the user to confirm the changes are desired, before the computer system 110 rolls out changes to the monitoring performed by the client devices.

By interacting with the monitoring results in the user interface 300, the user can prompt the display of related and relevant data collection parameter values and controls to adjust them. The panel 320 provides the limited subset of the data collection parameters that are applicable to the current portion of the user interface 300 that the user interacted with. Rather than have to review all of the data collection parameters and settings for the monitoring program or even just the current user interface 300, the user can be shown, on demand, the specific set of data collection parameters that the system determined to be relevant to the current interaction or user interface element of focus. The user does not need to seek out a settings page or other web page designed for that purpose. Indeed, the user does not even need to know which settings or collected data types are applicable in order to call up the information in the panel 320. The computer system 110 maintains the records of relationships between collected data, the data collection parameters that affect the data collection (e.g., used in the past and set for use in the future), and the user interface elements and user interface areas.

The content of the panel 320 is set based on the authorization level and permissions of the user, who logs in and authenticates before being provided the user interface 300. As a result, the interactive controls for changing the monitoring program (and as a result how the remote devices involved will operate) are presented only when the user has sufficient authorization to change these settings.

There are several different techniques that can be used to retrieve the appropriate data collection parameter information relevant to the user interface element that a user interacts with. For example, the computer system 110 can determine in advance the data collection parameter values and adjustment controls that are relevant to each of the elements of the user interface 300. The computer system 110 can then include the full set of information to be able to provide any of the potential data collection parameter panels in or with the user interface data (e.g., in tags of a markup language document such as web page HTML, as XML, data, JSON data, as metadata, in a resource file, etc.). For example, the content of data collection parameter panels for chart 302, chart 304, chart 306, and other user interface elements in the user interface 300 are provided to and downloaded by the client device as part of loading the web page or loading the web application. This allows the information to be presented with minimal latency after the user interaction, because the information the client device needs to present the panel 320 (or a similar panel with content tailored for any other portion of the user interface 300) is already present at the client device when the user makes the interaction.

As another example technique, the computer system 110 may create and provide mapping data specifying the correspondence of user interface elements to different data collection parameters, parameter values, and adjustment controls. As with other techniques, the computer system 110 can determine in advance the correspondence of different user interface elements (or portions of them) with specific data collection parameters, parameter values, and adjustment controls. Rather than associate each user interface element with the corresponding data collection content in the content of the page, the computer system 110 may provide a separate table or other mapping data that indicates the correspondence of user interface elements or user interface areas with different data collection panel content. As a result, when an element of the user interface is interacted with, the client device can look up whether that element has a corresponding set of data collection panel content and can retrieve and display it if it does. This also provides low latency because the data is provided in advance at the client device, and can reduce data transfer size when multiple elements in a page or across multiple pages are associated with the same data collection parameters and panel content.

As another example technique, the user interface 300 can be configured to request panel content in response to user interaction. For example, user interface elements such as the chart 304 can have associated metadata specifying an element identifier and/or a tag indicating the type of collected data is represented. Script content in the user interface data can respond to user interaction with the chart 304 by sending a message over the network 120, where the message provides the element identifier and/or a tag for the type of collected data for the element the user interacted with. In response, the computer system 110 retrieves the appropriate set of content for the panel 320 and provides over the network 120 to the client device for display. This technique may involve some additional latency in providing the panel 320, but has the advantage of limiting the size of the initial user interface data transferred to provide the user interface 300. In addition, the dynamic data collection parameter display functionality can be added to pages with minimal alteration. Pages only need to have element identifiers or tags for the represented collected data, and the script content to detect interactions, request data collection parameter content, and cause display of the content received in response to the requests.

Figure 3C:
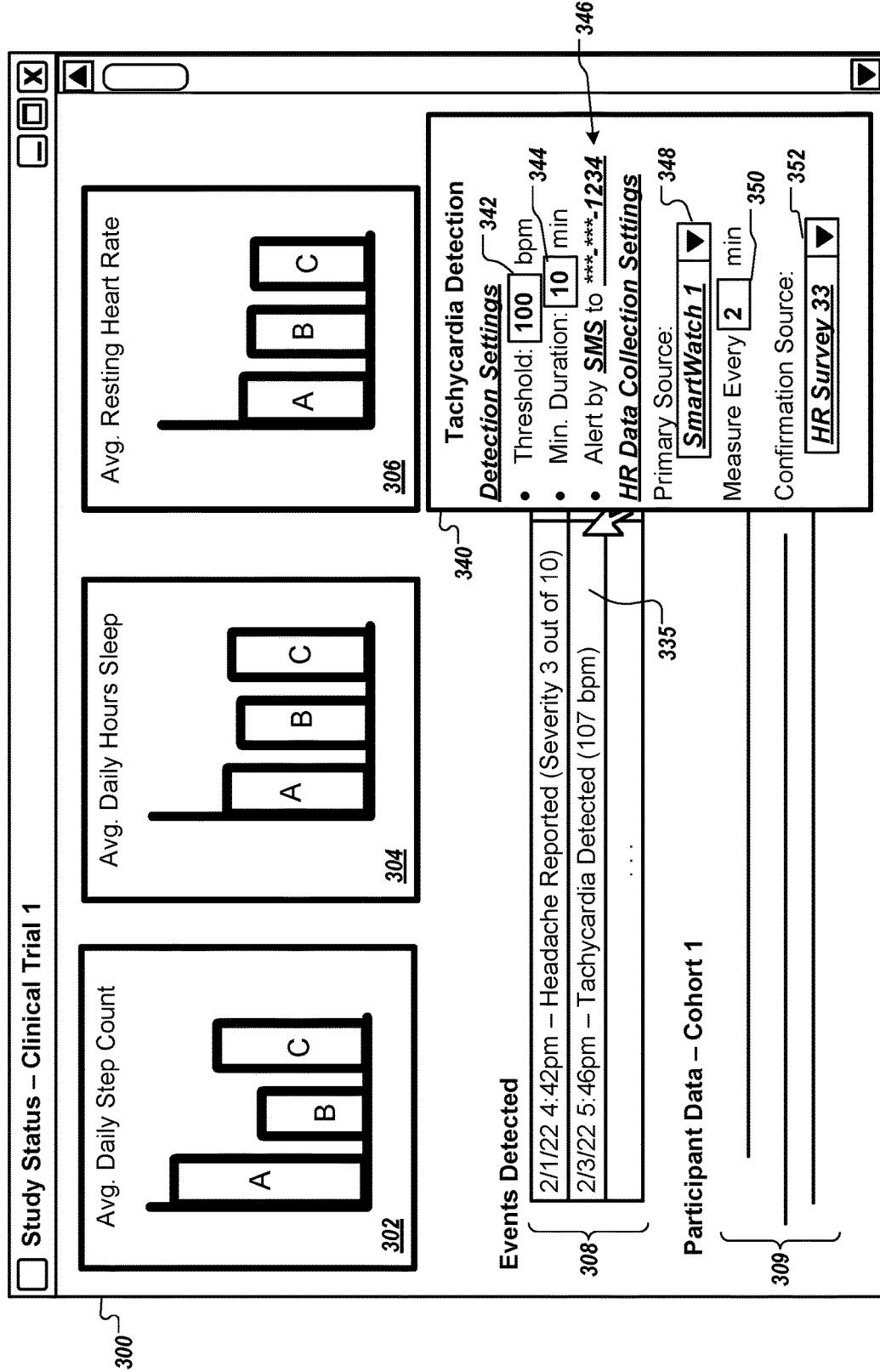

Referring to FIG. 3C, the user has interacted with a different element of the user interface 300. When the user selects a record 335 in the event list 308, the user interface provides the panel 340. The record 335 provides information about detection of a tachycardia event, representing a high heart rate detected. Based on the record 335, the panel 340 is presented to provide information about the detection settings used for detecting tachycardia as well as the heart rate data collection settings used. This provides the user a holistic view of the data sources and settings used to arrive at the monitoring data shown, so the user can assess their strengths and weakness and evaluate the reliability of the collected data. If the settings need adjustment, the user can make the adjustment directly in the panel 340 without seeking out any other interface.

As with other user interface elements, the selection of which data collection parameters and parameter values to present can be based on the underlying data represented by or used to generate the displayed user interface element. For example, the text shown in record 335 is derived from a detection event in the database and based on heart rate measurements for an individual. The computer system 110 that generates and provides the user interface data identifies and tracks this relationship to be able to provide the relevant data collection parameter information for each user interface element. In some implementations, the computer system 110 can also identify specific keywords in the generated user interface data (e.g., "tachycardia" and "bpm" in the text of record 335). However, even without these keywords, the computer system 110 can detect when generating the user interface data that the record 335 is derived from a database entry for heart rate (e.g., to obtain the "107 bpm" measure) and from tachycardia detection data (e.g., from the event record or log that prompted inclusion in the displayed event list 308), and can retrieve the data collection parameter information corresponding to these items accordingly.

For example, the tachycardia detection settings include a threshold of 100 bpm and a minimum duration of 10 minutes for the event to be detected. The panel 340 includes number entry fields 342, 344 for the user to change the threshold and minimum duration respectively. The panel 340 also provides controls 346 for adjusting the response to detecting the event. This includes sending a SMS text message to a particular phone number. Because tachycardia can represent a safety risk, the protocol has specified that alerts be provided when the condition is detected. The panel 340 enables the user to review and change the settings when needed.

The panel 340 also provides heart rate data collection settings, including the primary source of heart rate data (e.g., devices of model "SmartWatch 1"), a frequency of measurement (e.g., every 2 minutes), and an additional source of heart rate data (e.g., survey "HR Survey 33"). Each of these has a corresponding control enabling a user to adjust the parameter values. For example, the drop-down control 348 enables selection of other data sources, the field 350 enables the user to enter a different measurement frequency, and the drop-down control 352 provides options to select another data source.

Figure 3D:
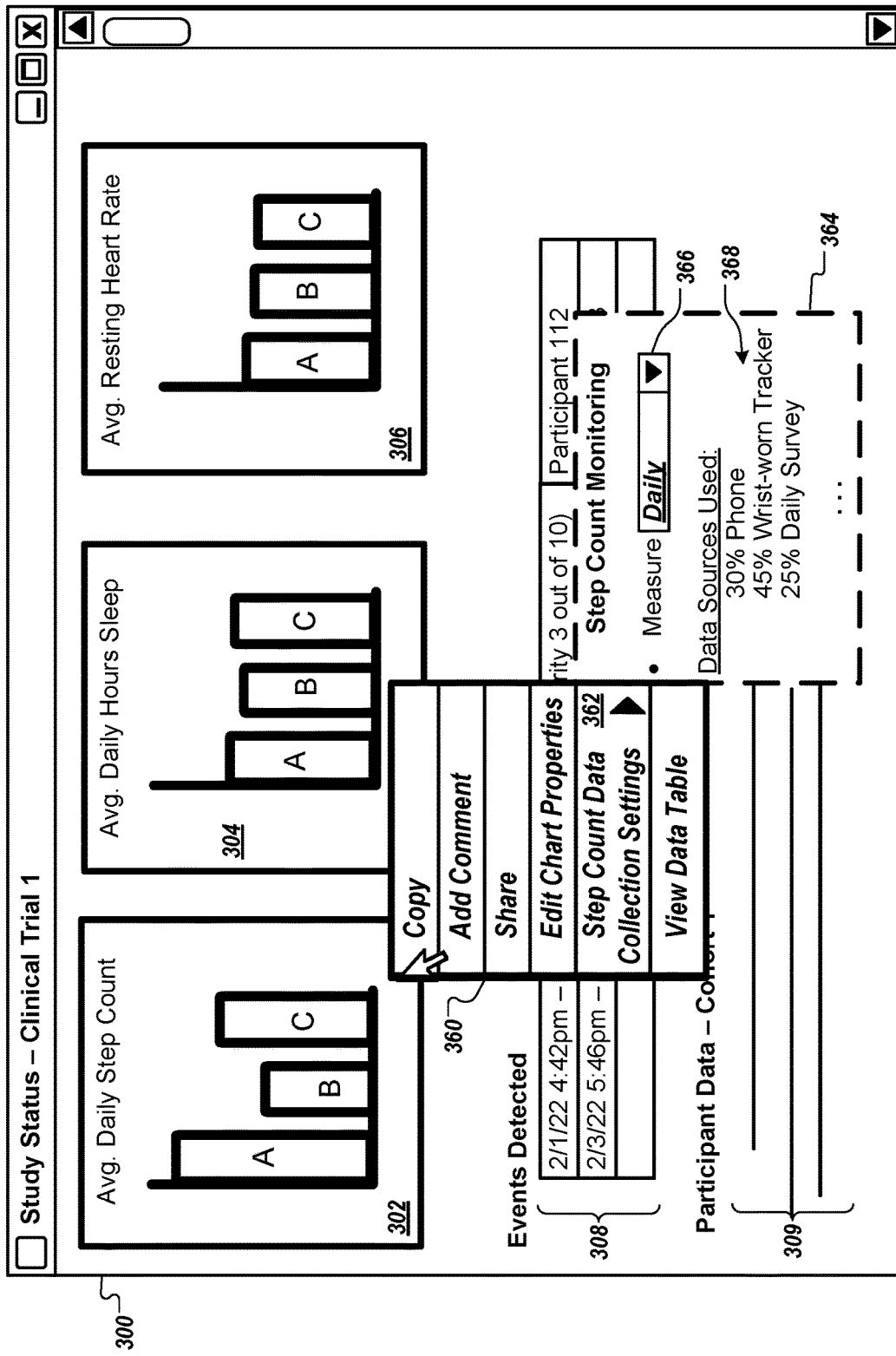

Referring to FIG. 3D, the user has interacted with a different portion of the user interface 300. In particular, the user has interacted with the chart 302 representing information about average daily step count of users in the monitoring program. The data collection parameter information for other user interface elements has been hidden and removed from view. In the example, the user interaction caused a context menu 360 to be presented, such as through a right-click or other interaction. The information about relevant data collection parameters is provided as an entry 362 in the context menu 360. The entry 362 identifies the relevant data type (e.g., average daily step count), and the user can select the entry 362 to view or adjust data collection settings for this data type. For example, if the user selects the entry 362, this will cause display of the panel 364, as an expanded menu item to the right of the primary context menu 360 list of options. The panel 364 indicates the measurement frequency and includes a control to change that frequency, and also indicates a breakdown of the various sources of information used to perform the step count monitoring.

The techniques discussed herein can be used to make data collection parameter information and controls available for any portion of the interface, for any type of UI element (e.g., measurement value, text, inline frame, chart, graph, image, etc.). Different data collection parameter information and controls can be shown for different portions of a user interface element also. For example, if a chart shows lines representing monitoring results of two different cohorts using two different sets of data collection settings, then selecting each line will cause a different set of settings to be shown, to reflect the set of settings that were used and/or are currently used for the corresponding cohort.

In the examples of FIGS. 3A-3D, the captions of the charts 302, 304, 306 indicate the type of collected data shown. However, this is not needed, and the system can identify and provide the relevant data collection parameter information without labels or keywords. As discussed above, the computer system 110 can track which data fields or data types are used to generate the respective. Thus, even for a chart, image or other element that has no text caption or label, the computer system 110 has tracked which source data from the database was used to generate or include that user interface element, and so can provide the relevant data collection parameter information.

In the user interface 300 and whenever dynamic display of data collection parameter information is made available, the system can optionally provide a marking or visual indicator when data collection parameter information is available. For example, elements like the charts 302, 304, 306 for which interaction can prompt display of a data collection parameter panel can be marked with a colored border, an icon, or other indicator to signal to the user that the panel is available. Nevertheless, this type of marking is optional and in many cases dynamic information panels can be made available without any marking to distinguish the element from other portions of the user interface 300 (e.g., from other areas for which no data collection parameters may be applicable).

Figure 4:
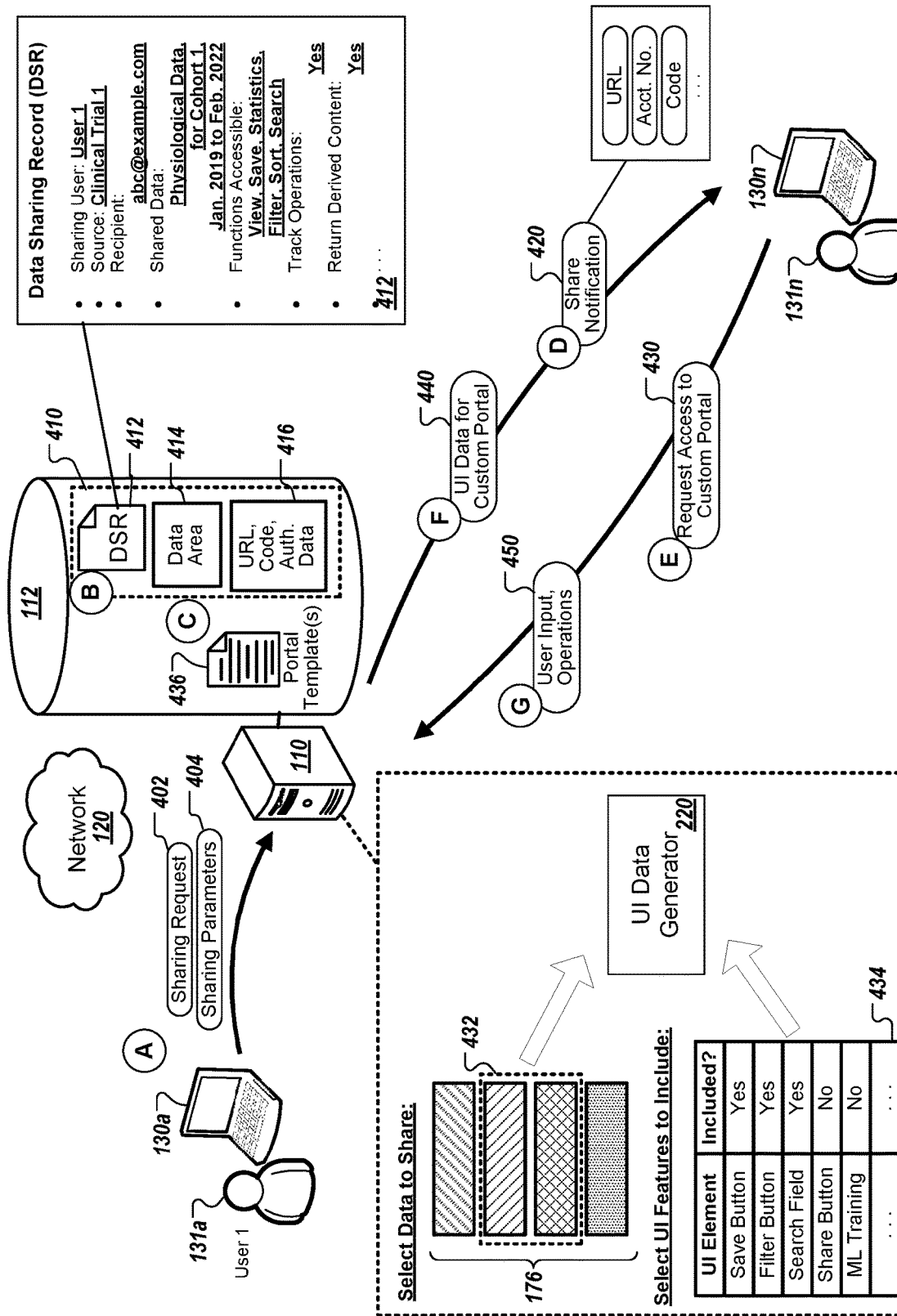
FIG. 4 is a diagram that illustrates techniques for customized, selecting sharing of data collected in monitoring programs and providing customized portals to access shared data.

FIG. 4 is a diagram that illustrates techniques for customized, selecting sharing of data collected in monitoring programs and providing customized portals to access shared data. Research studies generate more and more data, but existing platforms have traditionally failed to provide researchers with the features needed to effectively share the data and collaborate with shared data sets. The computer system 110 can provide tools that enable authorized user to selectively share the collected data 176 from monitoring programs with other users and other organizations.

The computer system 110 can provide enhanced researcher control of data sharing, including improved data sharing access for machine learning modeling. In general, the computer system 110 can provide data sharing capability with fine-grained control for the researcher. The system can provide the ability to share research data among participating researchers, for example, among researchers in the same organization that are in different departments or that work on different studies. The system can also provide the ability to share de-identified research data with the broader research community, beyond the participating researchers for a study or organization.

The system can share results of research back to participant or patients, with reference to how the individual participant or patient contributed to the research. For example, the system can provide to clinical trial participants information about findings or results across the study as a whole, and the system can also provide personalized information that shows the user actions or measurements that the individual contributed and how those measurements contributed to the findings of the clinical trial.

The system can also assist collaboration by enabling the researchers to share specific participants or patients as candidates for inclusion in other studies. For example, when a first researcher shares data about a first clinical trial with another researcher, the first researcher may specify, as candidates for a second clinical trial of the other researcher, individuals selected from the cohort for the first clinical trial. These individuals may be selected using query or filter criteria to select individuals meeting certain criteria (e.g., having physiological measurements in certain ranges, have experienced a particular disease or symptom, etc.). To maintain privacy, the system may enable the second researcher for the second clinical trial to receive de-identified shared information about the recommended candidates from the first clinical trial. This can include monitoring data and health information to review the candidates' eligibility for the second clinical trial. The shared information can also include compliance data showing how well the candidates have complied with various requirements of the first clinical trial (e.g., for providing sensor measurements, survey responses, etc.). As a result, the second researcher can evaluate the candidates for participation in the second research study using the shared data from the first clinical trial, even while the identities of the candidates are not provided. The computer system 110 can internally link the shared data with the participant records for the first clinical trial, so that If the second researcher finds the candidates to be appropriate, the computer system 110 can send an invitation message inviting the candidate to the second clinical trial on behalf of the second researcher, without revealing candidate identities and contact information to the second researcher. If a candidates agrees to participate and consents to sharing their identity, at that time the computer system 110 can make the candidate information available as the candidate enrolls in the second clinical trial.

The computer system 110 can provide interfaces, including user interfaces and application programming interfaces (APIs), that provide authorized users (e.g., researchers for a health research study) access to the collected data 176 of a monitoring program, as well as information about the characteristics and operational data for the study itself. These interfaces can include a web-based portal (e.g., a web application, a web page, etc.) to view, edit, organize, visualize, and otherwise manipulate the collected data. The interfaces also provide functionality for users to share collected data and to set customizable controls and policies governing sharing. The computer system 110 then provides sharing recipients limited access to shared portions of data sets while enforcing the limitations or restrictions set by the user that initiated the data sharing.

The computer system 110 provides a platform that enables researchers to selectively share data from their research studies, subject to customized policies or sharing profiles. The computer system 110 provides tools for a user to control or limit various aspects of collected data being shared, such as the portions of data sets that a sharing recipient can access, the level of participant information and study information a sharing recipient can access, and more. The sharing can be done selectively according to data type, data source, time range, cohort, participant profile, and more. In addition, the computer system 110 can enforce limitations on the types of actions that a sharing recipient is permitted to perform.

Access limitations and tailored sharing can be implemented by providing sharing recipients a customized access portal. This customized portal can be a view in a web application that selectively shows or emits portions of data sets, and can also provide or omit interactive controls and features of the portal according to the policy or a sharing profile that the data owner set for the particular data share. When a data owner initiates a new share of data to a recipient, the system enables the data owner to specify the policy or sharing profile to be used. This enables a user to set whether the recipient can view shared data, modify shared data, download shared data, or take other actions with the shared data. In addition, the sharing profile can specify which of other more advanced features of the system will be accessible to be used on the shared data. This can include whether to use the shared data and machine learning training, to perform machine learning prediction on the records in the shared data, to permit further sharing to additional downstream sharing recipients, to allow certain statistical analysis functions, and so on. The sharing profile can also set any number of access restrictions based on other criteria, such as range of time or location of data when the date it was created, range of time or locations where access to the shared data is permitted, and so on.

These techniques enable a researcher to provide different levels of access, and different sets of data, to different recipients to meet different needs. Frequently, researchers are asked to provide data to different parties (e.g., within the organization, outside the organization, a researcher in another hospital or a partner organization, to another study, to share or pool research, and so on). The researchers are often asked to answer questions from different sources, such as from media, executives, doctors, from patients. The computer system 110 can enabled tailored access to of the type, scope, and duration needed. For example, a participant's doctor may need full access to medical data for a specific patient. On the other hand, a journalist may request information about a high-profile study, but only the overall findings may be appropriate to provide. The computer system 110 can enable sharing that can be tailored to any of these situations.

The example illustrated in FIG. 4 shows a user 131b initiating data sharing with a data sharing recipient 131n, and the computer system 110 providing a customized portal for the data sharing recipient 131n based on the selections of the user 131b specifying the nature of the data sharing arrangement. The customized portal limits the access by the recipient 131n to only the specific portions of data that were shared, and the customized portal also limits the set of functions made accessible to the sharing recipient 131n as specified by the user 131a. As a result, the user 131a that initiates sharing can initiate sharing of different subsets of collected data 176 with different recipients, and the user 131a can set any of a wide variety of limitations or restrictions on access and use of the shared data by the different recipients.

The computer system 110 can provide high versatility and customizability so that each instance of sharing can have a separate policy or set of constraints defined and applied. For each instance of sharing, the computer system 110 enforces the corresponding set of constraints, including tracking data use and tracking access. The computer system 110 also adjusts the web-based portal it provides for data access and can reconfigure the portal to provide the limits defined for the data sharing relationship. For example, where a sharing user 131a has disallowed or has not granted authorization for a data analysis tool to be used, the computer system 110 can configure the portal for the sharing recipient 131n to disable or omit the buttons or other user interface controls that would provide that tool. For example, the portal for a sharing recipient 131n can restrict the menus, buttons, and other features of the portal's user interface to present only the tools or functions that are authorized by the sharing arrangement set by the sharing user 131a.

Each instance of sharing can be customized, so that different sharing recipients receive access to different portions of a monitoring program's data and/or are provided different permissions for using the data that is shared. This provides researchers a highly versatile tool to serve different users within their organization as well as collaborate with people in different organizations. The computer system 110 enhances privacy and security by enabling each data sharing instance to be limited in scope, duration, and access to achieve its particular purpose. The computer system 110 stores records of each instance of data sharing (e.g., each data share event or data sharing relationship established) and the corresponding permissions and constraints for the sharing recipient 131n, so all are enforced as specified by the user 131a initiating the sharing.

As an example, a researcher for a health research study may desire to share some data with a colleague in another organization that works in the same field. The researcher may user the interface provided by the system to indicate specific portions of the collected data to be shared, such as data collected over a particular date range from a specific cohort of participants, and that the shared data needs to be de-identified. The researcher can also grant or deny permissions for the sharing recipient to limit the set of actions or functions that the sharing recipient can perform with the shared data. For example, the system may provide the researcher 50 different data analysis functions or tools through the researcher's full-authorization version of the portal for accessing the collected data for his own research study. However, the researcher can limit the sharing recipient to only be able to use subset of those data analysis functions or tools, such as 10 specific functions that the researcher selects or approves. The system then creates a customized portal for the sharing recipient to access the shared data under the constraints or conditions that the researcher specified. For example, as directed by the researcher's selections, the customized portal can enable the sharing recipient to view the shared data, create visualizations of the shared data, and perform statistical analysis on the shared data, but the customized portal can disallow editing, downloading, or further sharing of the data.

In the example of FIG. 4, the computer system 110 has provided a researcher portal to the client device 130a of the user 131a. For example, the portal can be a web page or web application with a user interface 150 as shown in FIG. 2.

In stage (A), the user 131a initiates sharing of a limited portion of the collected data 176 for clinical trial 1 with a data sharing recipient 131n. For example, the user 131a may click a button in the researcher portal user interface and maybe shown a view of parameters that the user 131a can set to define the sharing relationship. There, the user 131a can specify the recipient 131n, specify which portions of the collected data 176 should be shared, and specify the permissions or restrictions on operations and uses of the shared data.

The client device 130a sends a sharing request 402 to the computer system 110 over the network 120. Included in the request 402, or in accompanying data, the client device 130a provides the sharing parameter values that define the authorizations and restrictions that the user 131a has set. For example, the sharing parameters 404 can include restrictions, limitations, conditions, settings, permissions, etc.

In stage (B), the computer system 110 creates a data sharing record 412 that records the parameter values that define this new instance of data sharing. In the example, the data sharing record specifies The user 131 that initiated sharing (e.g., user 1) as well as the source of data shared (e.g., clinical trial one 1). The data sharing record 412 also specifies the recipient, which in this case is identified by an email address (e.g., abc@example.com). Depending on the implementation, recipients may be identified by any of various types of identifiers, such as phone numbers, email addresses, usernames among users, registered with the computer system, 110, and so on. As we'll be discussed further below, data sharing recipients, maybe existing users of the platform the computer system 110 provides, but recipients are not required to be existing users.

The data sharing record 412 also specifies which data of the collected data 176 for clinical trial one, is authorized to be shared with the recipient 131n. Any collected data 176 that is not authorized to be shared will not made available to the recipient 131n. The computer system 110 allows users that initiate sharing to specify the portion of data to be shared in a number of different ways, such as records for specific individuals or groups of individuals (e.g., for specified cohorts), e.g., by date range at which data was collected, by data type (e.g., by semantic meaning or classification of the data) by source of the data collected, and many other types of criteria In this example, the data record 412 shows that the user 131 has authorized the recipient 131n to receive physiological data, for cohort one, for a limited time range from January 2019 to February 2022. Other types of data, such as psychological data, data for other cohorts, and data collected outside the specified date range will not be provided to the recipient 131n.

The data sharing record 412 also authorizes certain functions or operations to be available to the recipient 131n. This authorization of a limited set of functions will affect how the recipient 131n can interact with the shared data in the web-based custom portal that will be provided. For example, when the computer system 110 creates the web page or web application data for the custom portal, content and interactive elements that are not authorized can be disabled or omitted. For example, the data sharing record 412 authorizes the recipient 131n to view, save, generate statistics, filter, sort, and search using the shared data. Other functions not authorized, such as using the shared data to generate a machine learning model or sharing the shared data with yet another user, are not permitted and the computer system 110 would not permit them.

The data sharing record 412 also can specify what information, if any, about use of shared data by the recipient 131n will be provided to the user 131a. For example, the data sharing record 412 indicates that the user 131a has specified that operations performed by the recipient 131n using the shared data should be tracked. In addition, the data sharing record 412 indicates that the computer system 110 should provide, to the user 131a, derived content that the recipient 131n causes to be generated using the shared data. As a result, with these conditions, charts, graphs, reports, or other materials and results that the user 131 and creates with the shared data would be recorded and made available to the user 131*a*.

In stage (C), the computer system 110 performs additional operations to configure a custom portal for the recipient 131*n*. At this point, the recipient 131*n* has not yet requested a custom portal to be provided and served. The computer system 110 prepares the settings and other infrastructure to be able to effectively provide that custom portal when needed. For each instance of data sharing, the computer system 110 can store a separate set of information used to provide the custom portal for the recipient 131 *n* as well as to store data generated using that custom portal. This set of information that is specific to the particular sharing instance is represented as data collection 410. Along with the data sharing record 412, the computer system 110 can allocate a data storage area 414 for the custom portal. This can be a separate data area that is typically private for the sharing recipient 131*n* and stores data generated using the custom portal. For example, reports generated or preferences set by the sharing recipient 131*n* can be stored in this data storage area 414.

The computer system 110 also creates account information and authentication information to enable the data sharing recipient 131*n* to access the custom portal. If the recipient 131*n* is already an existing user of the platform, the computer system can identify the user and associate the new data share with that user's account. Otherwise, the computer system 110 can create a new account for the recipient 131*n*. For example, the computer system 110 can create a new account and create account information 416 that specifies a URL, a code, or other authentication data that will be used for the data sharing recipient 131*n* to access the particular custom portal that is provided for him or her. The account information 416 can be as simple as an alphanumeric code that identifies the recipients share account and which the recipient 131*n* needs to provide, or an authentication token that the recipient 131*n* can provide to gain access.

In stage (D), the computer system sends a notification 420 to the recipient 131*n*. The notification 420 can inform the recipient 131*n* of the new share of data, for example, indicating the user that initiated the data sharing, the source of the data shared (e.g., clinical trial 1), and other information. For example, the notification 420 can include information explaining how to access the shared data, such as a URL to access the custom portal, or an account number or code to access the new account created for the recipient. 131*n*.

In stage (E), the recipient 131*n* uses the client device 130 and to initiate access to the custom portal for the recipient 131*n*. For example, the recipient 131*n* can navigate to the URL for the particular custom portal, or can navigate to a URL of the platform in general, and then enter the account number, code, or other information. This is represented in the figure as a request 430 sent by the client device 130*n* over the network 120 to access or log into the portal for viewing the shared data.

The computer system 110 can use a variety of techniques to verify the identity of the recipient 131*n*. If the user 131*n* is an existing user of the platform, the computer system 110 can have access to user records, so that the user is required to log in or otherwise authenticate before gaining access. For recipients that are not existing users, the computer system 110 can still verify that the user is the intended recipient 131 and, such as by sending a short-term passcode to the email account, mobile phone, or other network address or communication address specified for the recipient 131*n*.

In stage (F), the computer system 110 generates user interface data for the custom portal for the recipient. This can include selecting data to share, e.g., to present in the user interface of the custom portal. For example, out of the collected data 176, the computer system 110 can apply the restrictions and limitations in the data sharing record 412 to identify the subset of data 432 that is authorized for the recipient 131*n* to access. The user interface data generator 220 can use only the selected subset 432 in generating the custom portal user interface data 440. In addition, the computer system 110 selects which of the user interface features to permit or include in the generated user interface data 440. For example, the table 434 lists a set of user interface elements that are included in the standard or fully featured researcher portal. Based on the information in the data sharing record, however, the recipient 131*n* is only able to access a subset of the features represented by these user interface elements. Using the data sharing record 412, the computer system 110 can determine whether each of the various user interface elements in the table 434 should be enabled or even whether they should be included in the custom portal. For example, the data sharing record 412 indicates that a user can save, filter, and search the shared data. As a result, the save button, filter button, and search field are marked to be included in the custom portal. However, user interface elements for other functions (such as the share button to share with other users and the machine learning training controls for machine learning analysis) are not included in the user interface for the custom portal, because the computer system one tend determines that these elements correspond to features or functions that are not authorized to be used with the shared data. The computer system 110 can include a set of mapping data between user interface elements of the researcher portal and the different permissions or functions that they correspond to. As a result, the computer system 110 can determine, using the permissions or restrictions of a data sharing record, which user interface elements are authorized and which are not.

The UI data generator 220 can access portal templates 436 to generate data for a web page or web application that will provide the custom portal. For example, the portal template 436 can represent a fully featured researcher portal, and the computer system 110 can remove or disable user interface elements that are not authorized. As another example, the portal template 436 may represent a baseline researcher portal that includes basic layout and web page structure, but does not include functions for manipulating shared data, and the computer system 110 can add in user interface elements determined to represent functions authorized for the recipient. 131*n* to perform. Along with the templates 436, the computer system 110 can include a repository of user interface element definitions, page formatting information, and other components that maybe assembled by the user interface data generator 220 in generating user interface data 440 that is limited to the shared data subset 432 and is also limited to the set of features or functions that the recipient 131*n* is authorized to perform. In this process, the resulting portal has both content and behavior that is tailored for the particular characteristics and limitations set forth in the data sharing record 412 that applies specifically to the user 131*n*. While the example of FIG. 4 shows sharing with a single user 131*n*, similar techniques can be used to share with groups of users or with organizations.

In stage (G), the computer system 110 provides the generated user interface data 440 for the custom portal to the client device 130*n* over the network 120. The client device 130*n* renders the user interface data 440 and a web browser or other application to present the interactive user interface to the recipient 131n. The user interface that the recipient 131n is provided has components such as the save button, filter button, and search field as noted in the table 434. The user interface for the custom portal also omits the share button, machine learning, training controls, and other features that are not authorized for the recipient 1231n. In some implementations, the custom portal may disable unauthorized features in other ways, such as by showing the menu options or controls, but making them grayed out and non-interactive, or otherwise disabling their function.

In stage (H), the recipient 131 and interacts with the custom portal user interface at the client device 130n. this can result in a variety of requests and operations resulting from interaction by the recipient 131n. For example, the recipient 131n may run queries against the shared data, filter or sort the shared data, run statistical analyzes, and perform other data processing operations permitted by the data sharing record 412. This often includes sending user input and instructions 450 to the computer system 110 over the network, and the computer system 110 can run the requested processing and return new, updated user interface data for the custom portal. Results of data processing requested by the recipient 131n can be stored in the data area 414 that is allocated for this data sharing arrangement. The computer system 110 can maintain this data across multiple sessions of the recipient 131n accessing the custom portal.

Often, the user interface for the custom portal removes the buttons enabling the user 131n to even attempt unauthorized actions. Nevertheless, in some implementations, at least some of the blocked and unauthorized actions can be represented in the user interface, but can trigger a request for further authorization to the user 131a instead of triggering the actual operation. For example, if the user 131n desires to perform a type of analysis that is not currently permitted, the user 131n may attempt the action, which would then not be immediately performed, and would be delayed and only performed if the user 131a granted further authorization, whether for a one-time use of the operation or for an update to the data sharing arrangement as a whole that would grant ongoing authorization for the requested operation.

The computer system 110 will maintain the data sharing record 412 over time, and the recipient 131n can access the shared data through a custom portal at various times for various sessions of use of the portal. The user 131a can specify a duration for the sharing arrangement to persist. For example, the user 131a may specify for data sharing to be performed for one year, and at the end of the year, the computer system 110 will block any further access by the recipient 131n.

The computer system 110 can use any of various techniques to make the data sharing restrictions take effect. For example, in some implementations, data, sharing arrangements allow access to only a "snapshot" of data existing at a certain time, such as a time that the data sharing is initiated. In this case, the computer system 110 can determine the subset of data 432 that is shared and can store a copy of that data in the data area 414 that is set aside for the recipient 131 and the corresponding custom portal. In this situation, the custom portal accesses a copy of the data that is separate from the collected data 176 for the monitoring program, and any later-added monitoring data would not be made accessible to the recipient 131n even if it met other criteria for sharing.

In some implementations, the data sharing arrangement permits newly collected data to also be shared, as long as the new data meets the other restrictions in the data sharing record 412. For example, the user 131a may share a certain type of data and not restrict the time range, so that newly collected data added after data sharing is initiated will also be available to the recipient 131n. In this situation, the computer system 110 can dynamically select the applicable data available for the recipient 131n each time the recipient 131n logs in to the custom portal or attempts operations using the shared data. In some cases, the computer system 110 may dynamically create a temporary copy of whichever subset 432 of data is available to the user for the current session. For example, the computer system 110 may cache relevant records during a session for manipulation, and then discard the temporary cached data once a data processing operation is completed or when the session of the recipient 131n has ended.

The data sharing provided by the computer system 110 enhances the ability of researchers to collaborate on research studies with other researcher counterparts. The computer system 110 supports data security, specialist diversity, geographically dispersed collaboration, and other features that enhance research. Collaboration is frequent in and essential to the scientific process, scientific data analysis, and the publication process. The techniques enabled by the computer system 110 enable higher quality scientific findings through diverse collaboration and participation in scientific process. The data sharing can expedite research, analysis, findings, and publication of scientific research. The data sharing can also reduce the cost, effort, and time involved in conducting scientific research.

The computer system 110 can enable both among researchers affiliated with a clinical trial and with others who are not affiliated with the clinical trial. For example, the platform can be used to share to the broader research community (beyond researcher counterparts) to provide research data, analyses, and findings, which enables recipient to utilize this data for validation, to inform new studies based on the findings, and identify populations of participants or patients to engage in future studies.

Shared data can enable additional scientific investigation using previously collected research data to a broader community of researchers. For example, independent research initiatives supported can include utilizing the shared study data alone to conduct new research, or combining the shared study data with other research or data from other studies to conduct new research. When a user shares data, the user can specify whether combination of shared data is permitted, and how the results from a combined data set (e.g., shared data plus other data) can be used. This and other features Increase value and reduce cost of scientific research by sharing to broader community.

In compliance with best practices for secure data sharing, personal health information (PHI) and personal identifying information (PII) can be maintained confidential in most cases by the computer system 110 even as substantive data is shared. The computer system 110 can also enable identification and sharing of study participants and patients that would add value to other research. For example, as directed by or authorized by the researcher for a first clinical trial, the computer system 110 can use the collected health data and compliance information from a first clinical trial to identify candidates that the computer system 110 determined to have high relevance and/or high likelihood of successful participation (e.g., retention and high compliance) in a second clinical trial. The information about these prospects or candidates can be shared securely to researchers of the second clinical trial, without revealing the identities of the candidates until authorized by the participants. This can expedite identification of study prospects for other unique or complementary research, such as through Identification of participants or patients with unique health conditions to include in other research, or through Identification of active participants or patients that stay engaged and actively participate in study activities of one study and so are likely to do so for other studies.

The computer system 110 can provide the ability for researchers to perform a variety of actions, such as: (1) share data with their researcher counterparts (affiliated with the research or affiliated with different research), (2) share a data set to collaborate with researcher counterparts (e.g., so resulting data is shared among both parties); (3) share data analysis, annotations, findings, and visualizations with others; (4) limit the information about study participants or patients and the data fields to be shared and/or viewed by a recipient; (5) restrict access to shared data for different uses (e.g., to allow shared data for some uses or data processing operations but not others); (6) share data sets with recipients that are not affiliated with the research; (7) selectively identify participants or patients in a manner that is confidential and de-identified, and in compliance with applicable regulations, potentially provided identities of participants and patients when appropriate; and (8) share back annotations, findings, visualizations made by sharing recipients with researchers.

The computer system provides a portal that enables a researcher to manage all aspects of data set creation, data restriction, and sharing. The researcher can set, with desired granularly, how the sharing operates, e.g., what data to provide, which recipient(s) receive it, and what the recipient (s) can do with the data in the platform. When initiating sharing, the researcher can specify the participant or patient cohort for which data is to be shared. Further, the system enables researchers to restrict the specific data about the participants or patients that are described in the shared data. For example, the system can restrict the shared data to a subset of available data for a research study, such as to specify whether to include or exclude items such as identity information, health data, survey data, operations data (engagement, login, communications, navigation), and derived scientific data (e.g., statistical analyses, results from artificial intelligence or machine learning algorithms). This can enable sharing a single data set with different user communities and different data access and restrictions. This also enables sharing different data sets with different user communities.

The computer system 110 provides the ability to restrict access based on use conditions. Access to broad and detailed dataset used by the researcher would have strict access control. Access to de-identified data may have a more relaxed access control.

The computer system 110 can provide the ability to create a collaboration workspace to facilitate sharing and collaboration through shared visualizations, data analysis, findings, and annotations. The computer system 110 can also provide the ability to create and manage a hierarchy of collaboration workspaces to facilitate sharing, restrict access, and collaborate on topical areas of interest.

In some cases, the computer system 110 provides the ability for two-way sharing between a researcher and a data sharing recipient. This can provide the researcher a view of how the recipient is using the shared data (e.g., which operations are performed, and the results obtained). In some cases, all actions that recipient performs, or at least actions that meet certain predetermined criteria, may be logged and shared with the researcher or data owner. For example, when a researcher shares a data set with a doctor, the sharing can be set so that data manipulations (e.g., changes to visualizations, new data columns, statistics, annotations, etc.) are shared back to the researcher.

Figure 5:
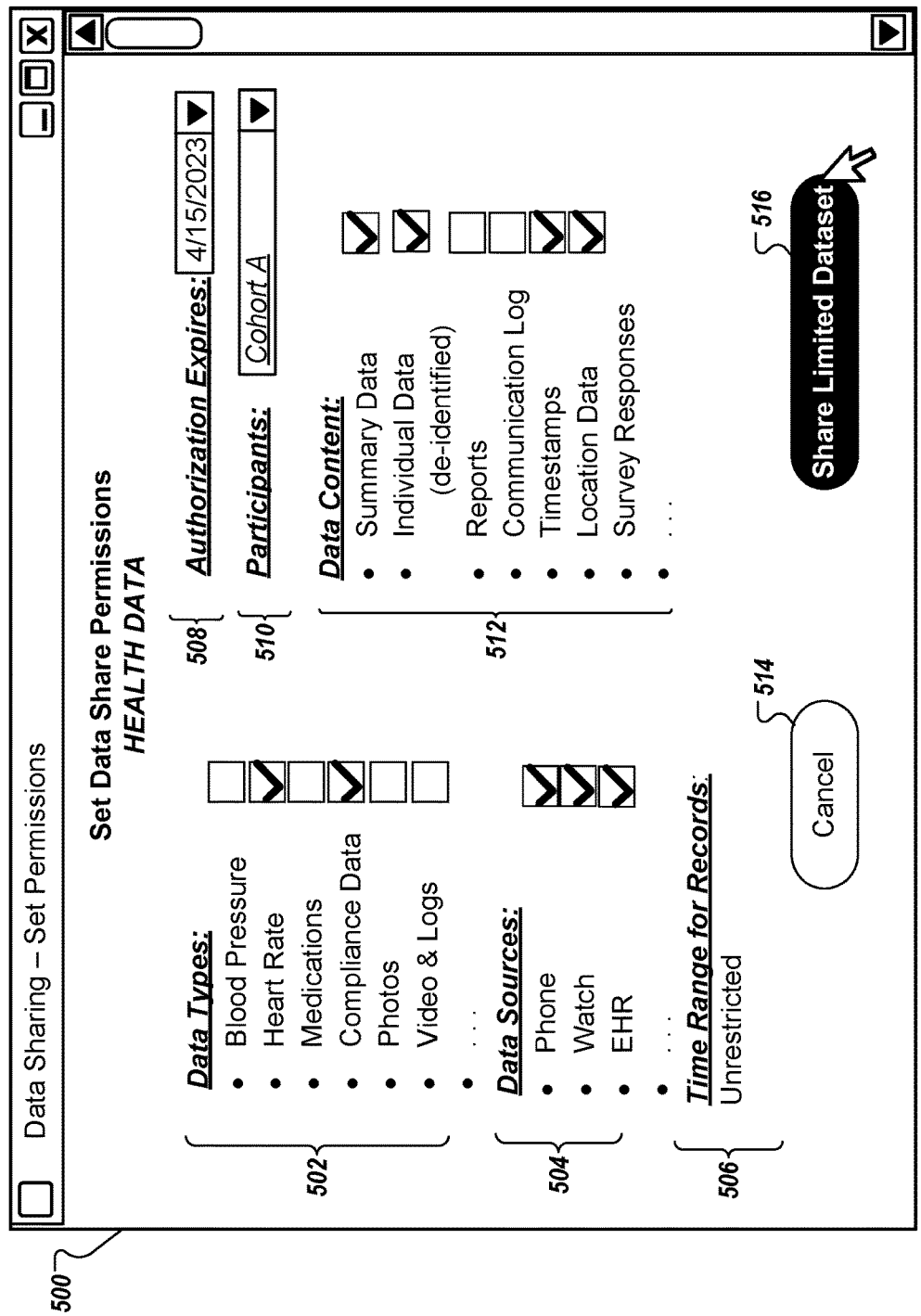
FIG. 5 is a diagram that illustrates examples of user interfaces for specifying parameters for sharing data.

FIG. 5 is a diagram that illustrates examples of user interfaces for specifying parameters for sharing data. FIG. 5 shows a user interface 500 that can be presented to a user 131a to define the nature of a data sharing relationship. The example user interface 500 includes various controls that the user 131a can use to specify which types of data or portions of the collected data 176 can be shared with a particular recipient. As noted with respect to FIG. 4, user interfaces can also enable a user 131a to specify a user identifier, email address, or other user identifier to specify the recipient or recipients to receive access to the shared data.

The user interface 500 includes controls 502 for specifying which data types of the collected data 176 will be made available to the recipient 131n. The user interface 500 also includes controls 504 that enable the user 131a to allow or deny access to data from specific data sources or types of data sources. The user interface 500 also includes controls 506 to specify a time range for the data to be shared, such as by specifying a date range so that only data collected within the date range is shared. The user interface 500 also includes expiration controls 508 to specify when the data sharing arrangement ends. The user interface 500 also includes controls 510 for the user 131a to permit or deny access to data about specific participants or groups of participants. The user interface 500 also includes controls 512 for specifying particular types of content or formats of content that are authorized for the recipient. For example, some users may be permitted to see summary data for a study or for a cohort, but may not be permitted to view individual data about individual participants. The user interface 500 also includes controls for the user to cancel the sharing operation (control 514) or proceed with the specified data sharing (control 516).

In general, the computer system 110 can allow fine-grained control over which substantive data (e.g., measurement results) and metadata (e.g., time of day, location, time spent on a survey, and so on) is shared with a recipient. For example, a user can specify category-by-category or data-type-by-data-type whether access should be provided for location data, survey data, access times (e.g., time of day), amount of time taken to complete an activity, and so on. The computer system 110 can enable selective sharing of other information about participants, such as when it is best to contact each participant (e.g., when particular users or cohorts have responded with highest compliance), and in what communication mode (e.g., by email, in-application notification, SMS text message, etc.). This information can be included in a technographic profile for an individual or group of individuals, and sharing some of this information may be very helpful to other researchers, especially as researchers share information about participants that may be good candidates for another researcher's study. This can also help the effectiveness of research to tailor interactions for participants. For example, providing an interactive ecological momentary assessment (EMA) would be ineffective if the person does not have a compatible phone, and so the computer system 110 can select a different interaction or note that the person is not a good candidate for a study that requires that type of EMA. In general, the computer system 110 can manage sharing of many types of operational information about the actual interactions for participants, such as the timing, frequency, duration, type, and results of those interactions.

When sharing data, the computer system 110 can take into account the sensitivity of the data and apply varying levels of protection as a result. For example, personal health history, personal behaviors, and beliefs are sensitive types of information that can be protected by the system. For example, in a user interface such as the interface 500, the computer system 110 may mark sensitive types of information to distinguish them from less sensitive types, and the computer system 110 may require additional confirmation from a researcher in order to share sensitive types of data. In some implementations, markers can be used for certain types of data and for certain survey responses. For example, sensitivity level codes or other metadata indicating the level of sensitivity can be applied for collected data so that the level of sensitivity can be determined and the data treated appropriately.

The computer system 110 can use a predetermined taxonomy or set of codes for surveys and individual survey questions and responses. For example, the computer system 110 can use standardized or repeatable coding to explain how surveys and individual questions have been interacted with. The operational data about surveys can indicate include information about how often users skip a question, how much time is taken on different questions, and so on. This information can be used to determine how effective the question or survey, and ultimately to determine the level of reliability of the question or survey.

When de-identifying data, there can also be functions applied to aggregate the data and perform more than simply removing the associated participant name. For example, the computer system 110 may exclude small samples or generalize data from small sample sizes so that data cannot be generalized to a specific person.

The computer system 110 can enable users to share procedures used and operational results achieved, along with characterization of participant interactions, in addition to the substantive health data itself. For example, in addition to sharing the results the participants provided for surveys, the system can track and share information about the completion rates of surveys, the amount of time spent on the surveys, the level of agreement of the survey results with sensor data or other corroborating sources, and so on. This provides researchers valuable information about the effectiveness of different techniques and better ability to understand and interpret the meaning of the substantive results. This also helps researchers to better select the data collection instruments and parameters that they will use in their studies.

In addition to the controls and options shown in FIG. 5, a similar user interface can be provided with options to specify which functions and types of processing that the recipient should be allowed to perform. For example, the interface can present a list of functions that the system is able to provide to data sharing recipients (e.g., save, filter, search, sort, statistical analysis, machine learning analysis, share, etc.), and the user 131a can select individually or in groups which functions or operations the recipient should be allowed to perform in the custom portal provided to the recipient.

Figure 6:
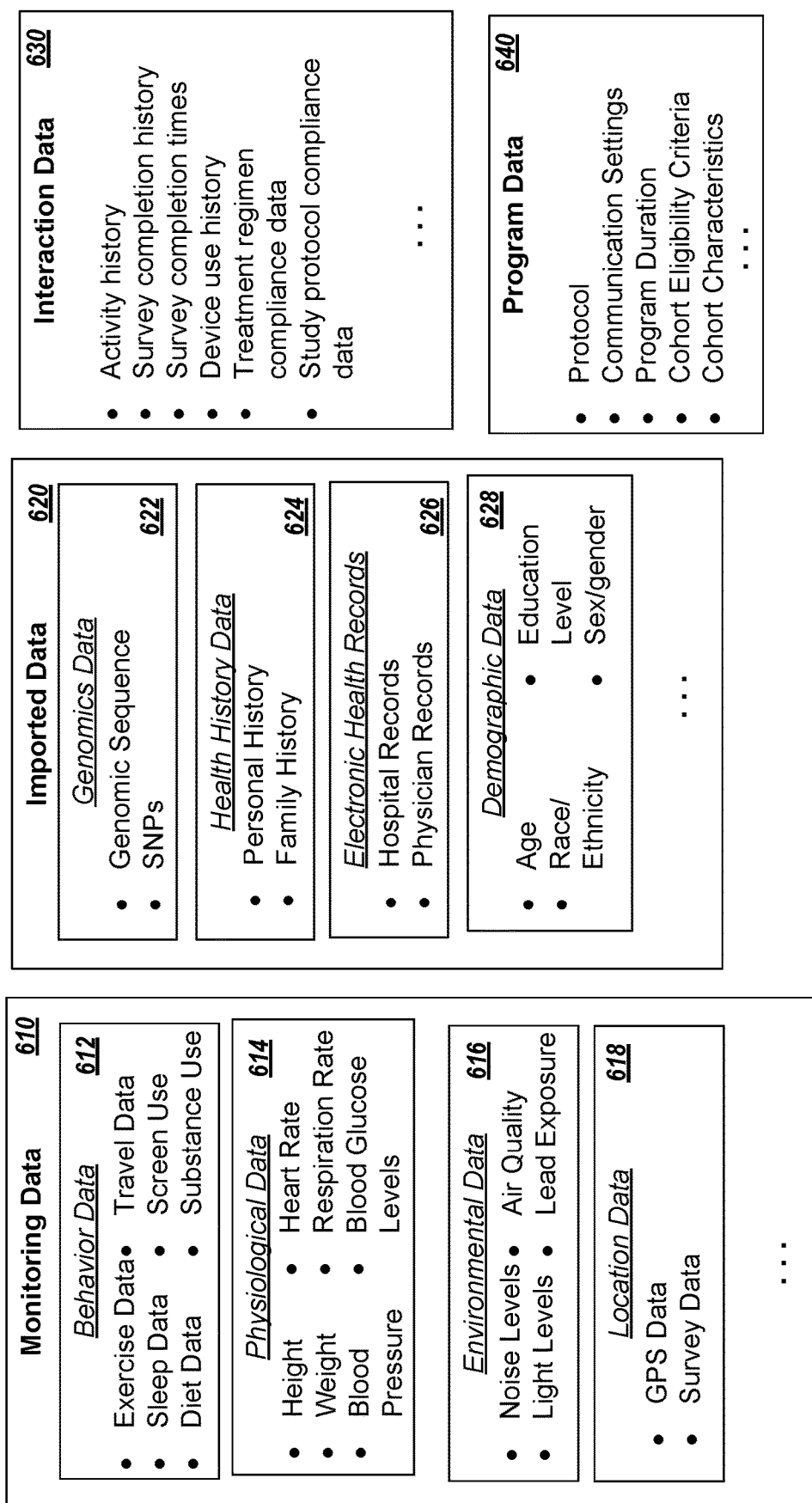
FIG. 6 is a diagram showing examples of types of data that can be collected for a monitoring program.

FIG. 6 is a diagram showing examples of types of data that can be collected for a monitoring program. FIG. 6 shows examples of various types of data from a monitoring program that may be shared. Using the techniques discussed for FIGS. 4 and 5, a user can authorize or deny authorization for a sharing recipient to access any or all of these different types and categories of information. The user 131a may also specify additional parameters to selectively share portions of each of these types of data, such as further restrictions on time ranges, data sources, summary data versus actual measurement values, and so on. Different restrictions or limitations can be set for different types of data (e.g., restricting the time range of location data, but not restricting the time range for physiological data). As a result, the computer system 110 provides the user 131a with a versatile, highly customizable platform for tailoring the specific data shared to limit access to a custom subset or set of criteria for each instance of sharing.

For example, the data that can be shared includes monitoring data 610, which can include items such as behavior data 612, physiological data 614, environmental data 616, and location data 618. These are just a few of the examples of types of monitoring data 610, and other types can be collected and selectively shared as well. A monitoring program may also receive and store imported data 620 from various sources. For example, the imported data 620 may include genomics data 622, health history data 624, electronic health records 626, demographic data 628, and so on. These imported records may include user profile information, insurance records, physician records, hospital records, biospecimen analysis, reports, and so on.

The computer system 110 can also enable users to selectively share interaction data 630 that indicates how individual participants and groups of participants have interacted during the monitoring program. This can include operational data about the monitoring program and its interactions with participants. For example, the interaction data 630 may indicate the frequency of messages to participants as a whole or to specific participants, the logs of events in a monitoring program or summary data about those events, the amounts of time that are spent by participants to complete surveys (whether for individual surveys or as aggregate data such as averages across a group or across multiple surveys), information about compliance of participants with a study protocol, and so on.

The computer system 110 can enable selective sharing of program data 640 as well. In some cases, it may be useful for a user 131a to share information about the characteristics and parameters of the monitoring program itself. For example, a researcher may desire to share settings or attributes of a health research study with another researcher. The computer system 110 can enable the user 131a to specify which portions of program data 640 can be shared, just as with monitoring data and other information associated with a monitoring program.

Figure 7:
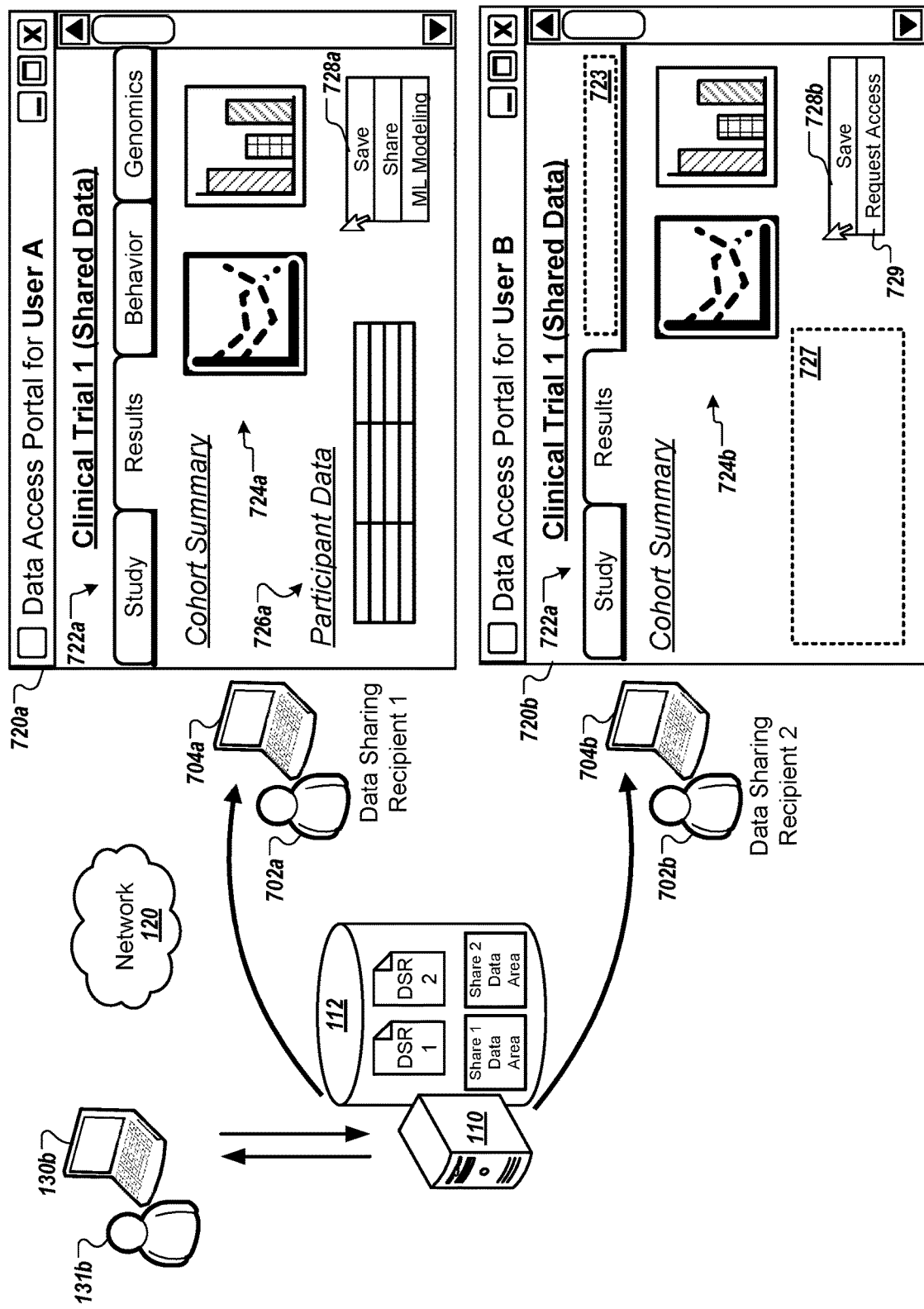
FIG. 7 is a diagram showing examples of data access portals that can be provided.

FIG. 7 is a diagram showing examples of data access portals that can be provided. FIG. 7 shows how customized portals for different recipients can show different content and sets of user interface elements. The example shows the user 131a having shared portions of the collected monitoring data 176 for clinical trial 1 with two different data sharing recipients 702a, 702b. The computer system 110 has created a separate data sharing record 712a to define sharing with the first recipient 702A, and has created a second data sharing record 712a to define the data sharing with the second recipient 702b. The data sharing records 712a, 712b indicate different portions of the collected monitoring data 176 to be shared, and also specify different operations and uses of the shared data. This results in different customized portals for the two recipients 702A, 702b, as shown in the user interfaces 720a, 720b.

The user interface 720a shows the custom portal provided to the recipient 702A through the client device 704a. The user interface 720b shows the custom portal provided to the recipient 702b through the client device 704b.

The user interface 720a includes several tabs for accessing data about different aspects of the clinical trial. The user 131 has authorized the recipient 702a to access tabs for the study as a whole, for results monitored, for behavior of participants, and about genomics of participants. Because the data sharing record 712a authorizes access to these different categories of data, all four of these tabs 722a are shown in the custom portal. In the user interface 720b, there are only two tabs 722b presented, because the data sharing record 712b only authorizes access to the study data and result data tabs. As a result, the computer system 110 generates the custom portal data so that information about behavior and genomics is not presented and is not accessible to the recipient 702b. The area 723 shows the absence of these features, which is a result of the computer system 110 determining that the recipient 702b is not authorized to access the corresponding information.

In the user interface 720a, the result tab shows a visualization 724a with summary information for a cohort. The user interface 720b also shows the same content as visualization 724b. In this case, both data sharing records 712a, 712b authorize access to these charts.

In the user interface 720a, there is a region with participant data 726a, which shows records for at least some individual participants in the clinical trial. By contrast, in the user interface 720b, the information about individual participants is omitted, as shown by empty region 727. Because the data sharing record 712b does not permit the individual participant data to be accessed by the data sharing recipient 702b, the custom portal for this recipient 702b is generated to exclude that data.

The user interface 720a is shown with a context menu 728a that includes menu options to save, share, or perform machine learning modeling. Each of these options is a function that the user 131a has been authorized to perform with the shared data. These options represent a subset of the full and unrestricted set of context menu options and other functions that can be included in researcher portals. For example, if the user 131a were accessing the researcher portal for his own clinical trial, many more options would be presented because the user 131a has greater authorization.

The user interface 720b also shows a context menu 728b, but it includes different menu items than the context menu 728a of the user interface 720a. For example, the context menu 728b includes a save control to save the state of the custom portal or save processed results generated using the custom portal. However, the context menu 728b has been customized to remove options such as sharing data or performing machine learning modeling. Because the data sharing record 712b does not permit those operations. In some implementations, the user interface 720b can include controls enabling the user 702b to request for their access, such as through the menu item 729. If the recipient 702b requests access to an operation or feature, then the computer system 110 can relay the request to the user 131a with user interface controls to authorize or deny the requested type of access.

In the example of FIG. 7, the computer system 110 stores a separate set of persistent data for each of the two custom portals. For example, there is a data area 714 for the first recipient 702a and a separate data area 714b for storing data for the custom portal of the second recipient 702b. These separate data areas 714a, 714b can be used to store the settings, state information, and configuration of each custom portal separately. They can also be used to store reports, visualizations, annotations, comments, and other information generated using the custom portal.

Figure 8:
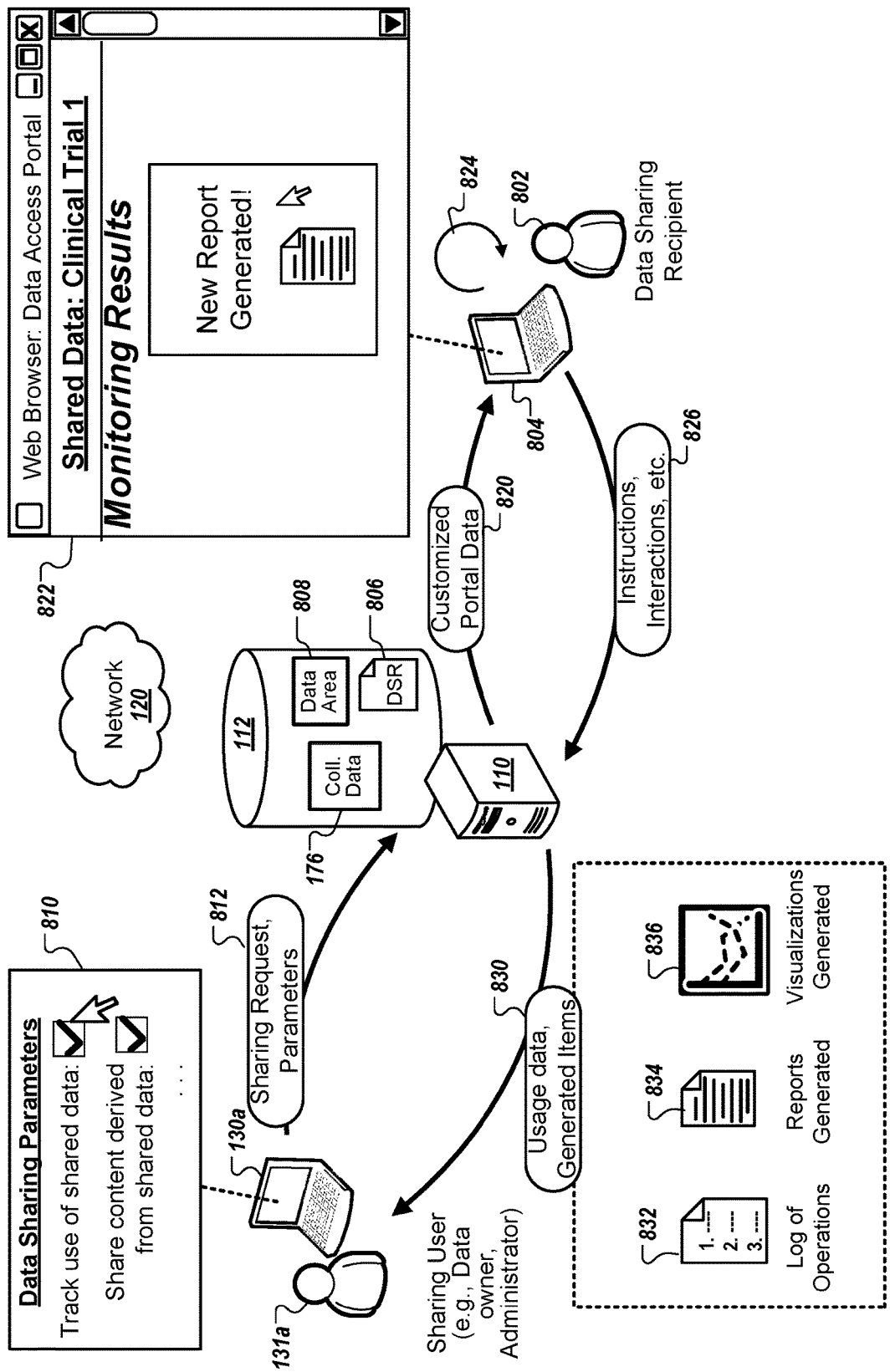
FIG. 8 is a diagram that shows an example of information generated by a data sharing recipient being provided to the user that initiated data sharing.

FIG. 8 is a diagram that shows an example of information generated by a data sharing recipient being provided to the user that initiated data sharing. When a user initiates data sharing with a recipient, the interfaces can enable the user to specify which recipients receive access, which portions of the data are shared, and how the data can be accessed and used by the recipients. Beyond limiting access to and use of shared data, the computer system 110 can also allow users to specify tracking to be performed to track access to and use of shared data. The computer system 110 can then track which portions of the data are accessed by the sharing recipient, and provide the data owner a log or report of how the data was used.

The computer system 110 can enable users to set a sharing arrangement with "two-way sharing," where one user shares data from a monitoring program, and data generated by the recipient with that shared data is shared back to the user (or monitoring program) that allowed the sharing. For example, when a researcher shares a data set with a recipient, the researcher can specify that visualizations, reports, and search query results generated by the recipient using the shared data should be automatically shared with the researcher. The system notifies the recipient of the data share and the conditions on access to the shared data, including the requirement that results derived from the shared data will be saved and shared with the data owner. The system provides the recipient access to a portal customized to provide the access and constraints that the researcher specified. If the recipient agrees with the terms of data sharing that the researcher defined, the recipient can use the information from the system to open the portal in a web browser and begin accessing the data shared by the researcher. As the recipient uses the portal to create visualizations, generate reports, and run queries using the shared data, the system automatically logs these events and saves the results, making them available to the data owner. This provides the data owner visibility into how the shared data is being used and what insights or results are being derived from the data FIG. 8 shows an example in which information generated by a data sharing recipient 802 using a custom portal is stored and provided to the user 131a that initiated sharing. As a result, tracked usage of shared data and other information derived from the shared data is provided back to the user 131a that authorized the data sharing.

In the example of FIG. 8, the user 131a has shared data with a recipient 802. As shown in the selected data sharing parameter options, the user 131a has specified that the computer system 110 should track use of shared data by the recipient 802. The user 131a has also specified that content derived from the shared data by the recipient 802 should also be provided to the user 131a. When the user 131a initiates the data sharing arrangement, or at a later time if the user 131 updates the data sharing arrangement, these settings are stored in a data sharing record 806 that defines the nature of the sharing arrangement. For example, when the user 131a provides the initial sharing request 812 to begin the data sharing, the user 131a may specify these options among other settings that are set and recorded in the corresponding data sharing record 806.

As discussed above, the computer system 110 can generate and provide user interface data 820 for a customized portal for the data sharing recipient 802. An example of this customized portal is shown as user interface 822, which is shown on the client device 804 of the recipient 802. Through various interactions 824, the data sharing recipient 802 may manipulate the shared data using the custom portal shown in user interface 822. As the recipient 802 interacts with the user interface 822, the user input triggers various requests and other interactions with the computer system 110 over the network 120. For example, the interactions with the user interface 822 can result in API calls, requests for more user interface data, and other instructions and interactions. 826. Because the data sharing record 806 specifies that tracking should be performed, the computer system 110 can keep a log of interactions with the shared data using the custom portal. For example, the computer system 110 can log events such as accesses to data, application of filters, which user interface views are accessed, and so on. For example, the computer system 110 can create a log of operations 832 that the recipient 802 initiated or instructed to be performed using the custom portal. As a result, the log of operations 832 can indicate items such as the text or other criteria of queries performed, annotations or notes made in the custom portal, filter parameters, applied, view settings that are changed, and so on. This information provides the user 131a a view of how the shared data is used. In addition, the operations can be recorded with sufficient specificity for the operations to be performed again. For example, the queries run can be saved with specificity for the terms used, date range is applied, and other criteria, as well as which set or type of data the query was applied to, so that the user 131a may re-run the query if desired. In other implementations, the computer system 110 may additionally or alternatively store the results to the query to be able to provide that set of results to the user 131a.

The various interactions of the recipient 802 with the recipient's custom portal can produce various types of information derived from the shared data. For example, the user interface 822 shows that a new report has been generated based on the shared data that the user 131a provided access to. Because the data sharing record 806 specifies that derived content is to be provided to the user 131a, the computer system 110 collects the reports 834 generating using the custom portal. In addition, visualizations 836 generated using the custom portal are also stored and made available to the user 131a. Content generated from shared data in the custom portal may be stored in a data area 808 for the custom portal or maybe stored in another data area that is separate, for example, a data area where generated items would not be subject to editing or deletion by the recipient 802.

In the example, the computer system 110 provides usage data 830 from the data sharing recipient 802, including derived content and other generated items. This information may be delivered in various ways. For example, the computer system 110 can provide a user interface that shows how a particular recipient 802 has used shared data. These interface can list operations performed, a list of sessions of use of the custom portal by the recipient 802 (e.g., times, durations, and amounts or frequency with which the portal is accessed), information that specifies which portions of the shared data were actually used, and so on. In addition, the interface can provide links or other controls to view and interact with reports, visualizations, and other content generated by the recipient. 802 using the shared data. In some implementations, the computer system 110 may send notifications in response to certain actions by the recipient 802. For example, the user 131a may specify a preference to be notified when a new visualization or report is generated. Based on this preference, the computer system 110 can detect when a new qualifying content item or event occurs, and the computer system 110 can send an email, text message, in-application alert, or other notification of the new content or new event.

The computer system 110 can also structure the custom portal for the recipient 802 so that the recipient 802 is notified that use of the shared data is tracked and that generated content is stored and shared with the user 131a. This can be done through a notice when the recipient 802 first accesses the custom portal or confirms his account. In addition, the computer system 110 may generate the user interface data for the custom portal to include reminders or notices indicating that the tracking and sharing back to the user 131a that is ongoing.

Figure 9:
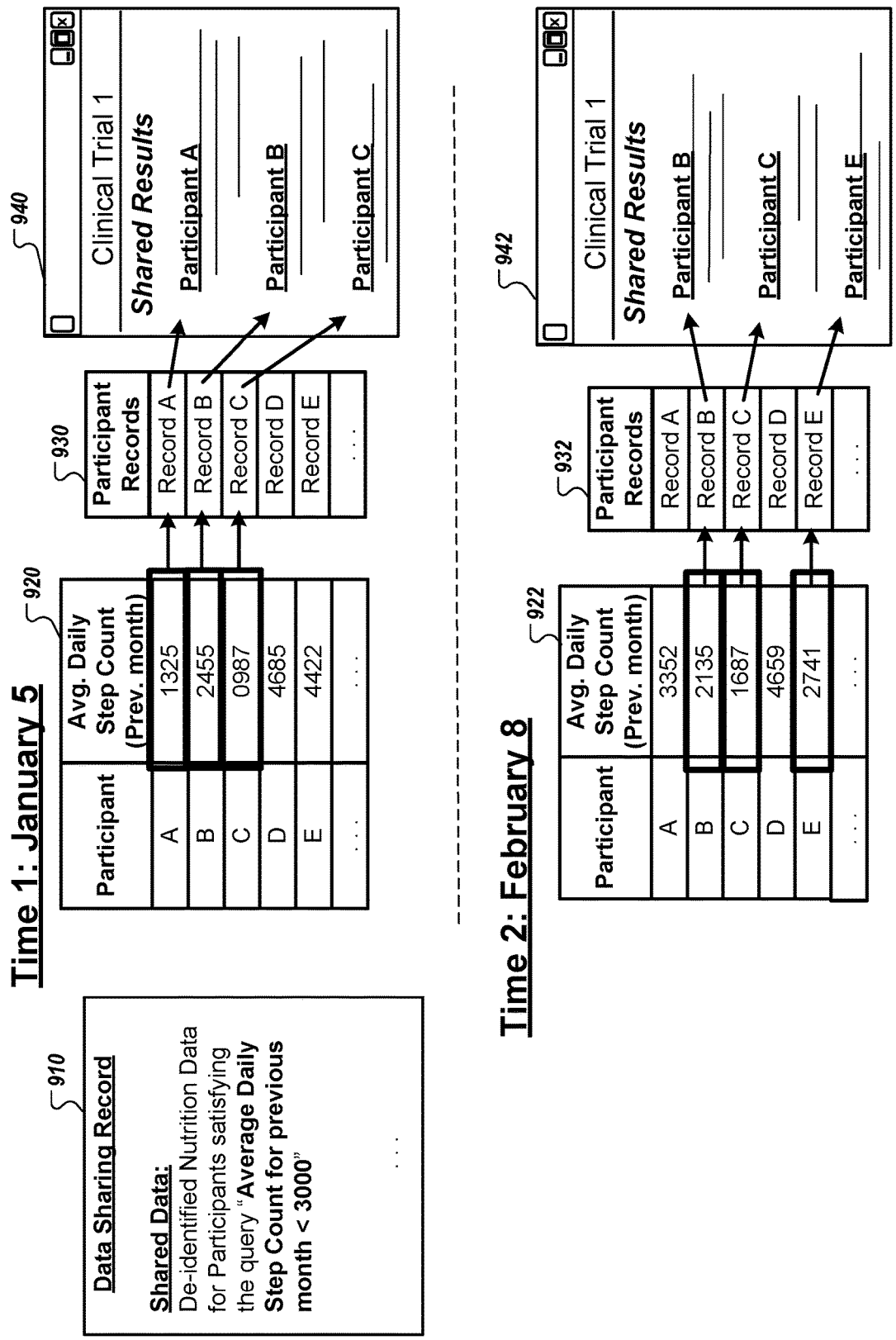
FIG. 9 is a diagram that shows an example of sharing a dynamic data set.

FIG. 9 is a diagram that shows an example of sharing a dynamic data set. The computer system 110 can provide other features to facilitate sharing among different users. For example, the computer system 110 can provide different ways for a user to define the set of data to be shared. The subset of data to be shared can be defined using constraints for various different aspects, such as the type of data, the set of records, the range of time represented, the source of the data (e.g., sharing data from some sources but not others), and so on. These options often define the set of data to be shared as a specific group of data or records, often a subset of data existing at the time the sharing is initiated. However, to facilitate sharing of data for monitoring programs where data collection is ongoing and data sets are growing and changing, the set of data made accessible by a data sharing relationship or transaction can be defined instead based on criteria that enable the shared data to vary. In some cases, this can be as simple as enabling the shared portion of a data set to encompass newly acquired data meeting certain criteria (e.g., for source, type of content, etc.) as the additional is collected or generated. In other cases, the system can define the data set to be shared based on a set of search criteria, filter criteria, or classifications of records, and the portions of records may change as the underlying data set changes. With this feature, the system enables a user to share a dynamic data set, where the portion of the data set varies, potentially expanding and contracting over time automatically as data is added to the data set and the set of records satisfying the criteria for access change.

As an example of sharing a dynamic data set, a user may specify a search query as criteria for defining the data to be shared. As a result, the data shared and made available in the customized portal for the recipient will be the set of results to the specified search query. Rather than share only a static snapshot of the results at the time data sharing is initiated, however, the set of results for the query (and thus the portion of the data set available to the recipient) can be re-determined each time the recipient accesses the shared data. For example, for each session of use of the customized portal for the recipient, the system can run the search query again to determine which set of records or results will be made available in the customized portal. As a result, in one session 72 records may be results that meet the conditions of the query, in another session 84 records may be results for the query, and in yet another session only 61 records may be results for the query. For example, if the query searches for records that have a keyword or a measurement value in a certain range, as the records are edited or supplemented over time the set of records meeting the query criteria may change. Thus, the portion of data made available to the recipient can also change in response as the set of matching records changes. As another example, a researcher may have a study with 1000 participants or patients. The researcher selects to share a dataset that represents results to a query, which initially has data for 153 participants or patients who match the query criteria. A week later, when the recipient logs in again, the data set may have records for 172 participants or patients who now meet the criteria at that time.

The example of FIG. 9 shows a situation where content to be shared with a recipient is specified in a manner that causes the content of the shared data set to change over time, based on a variable set by the user initiating the sharing. In particular, the user sharing the data has specified criteria that cause the content of the shared data to vary from one session of accessing the custom portal to another. While the user initiating the sharing specifies a set of criteria that does not change. In this example, the portions of the collected data 176 that meet the criteria do change. Thus, unlike sharing a fixed portion of monitoring data. (e.g., a snapshot of monitoring data at a specific time) or sharing a portion of monitoring data that simply grows as more qualifying data is added, the dynamic data set of FIG. 9 can grow, shrink, and change according to which records or portions of collected data meet the criteria.

The example shows a data sharing record 910 in which the portion of data shared is defined in part by a query. In particular, the data sharing record 910 states that nutrition data should be provided for participants meeting the query criteria of "average daily step count for previous month is less than 3,000." With this set of criteria, each time the sharing recipient logs into a custom portal, the computer system 110 will run the query a new to determine which set of participants and records meet the query criteria at that time. In other words, the computer system 110 will reconsider which set of participants satisfy the query criteria and so re-determine a new subset of the collected monitoring data 176 for the clinical trial, each time based on the then-current set of collected monitoring data 176.

The example shows two user interfaces 940, 942 that represent the same custom portal for a single sharing recipient, but show the set of information provided through that custom portal at different times. For example, the user interface 940 shows the custom portal on January 5th, and the user interface 942 shows the custom portal on February 8th, just over a month later. Because the set of monitoring data 176 has changed from the first time to the second time, the two user interfaces 940, 942 show information about different participants.

In further detail, at the first time, in order to show the user interface 940, the computer system 110 evaluates the information in table 920 to determine which participants satisfy the query criteria that affects which data is shared. At the first time, on January 5th, there are three participants, participant A, participant B, and participant C that satisfy the query criteria by having average daily step count for the previous month of less than 3,000. As a result, the computer system 110 selects participant records for only participants A, B, and C to be shown in the user interface 940.

Although the step count is a parameter used to define the record selection, that information is not necessarily provided to the sharing recipient in the custom portal. For example, the data sharing record 910 provides that nutrition data is shared, but step count is not in the category of nutrition data and so step count data will not be available. As a result, the parameter that the sharing user has set for determining which records to share is not even a parameter for which values are shared with the recipient. This is provided as an example how the system provides users great flexibility to defining what data will be shared, and that the set of data can be selected based on any of various different parameters.

At the second time, on February 8th, a new month has begun, and so a different portion of the collected data 176 is now applicable to determining which portions of the collected data 176 should be shared. As shown in the table. 922, the applicable step counts are different from those used at the first time, and as a result, different participants are selected by the query criteria. In particular, participant A no longer satisfies the query criteria and so the records for participant A are not shared in the user interface 942. In addition, and participant E, who had a step count that did not meet the conditions for sharing at the first time, now satisfies the query criteria at the second time. As a result, the computer system selects the records of participant E to be included in the a user interface 942 of the custom portal, along with records for participants B and C that also meet the query criteria.

Figure 10:
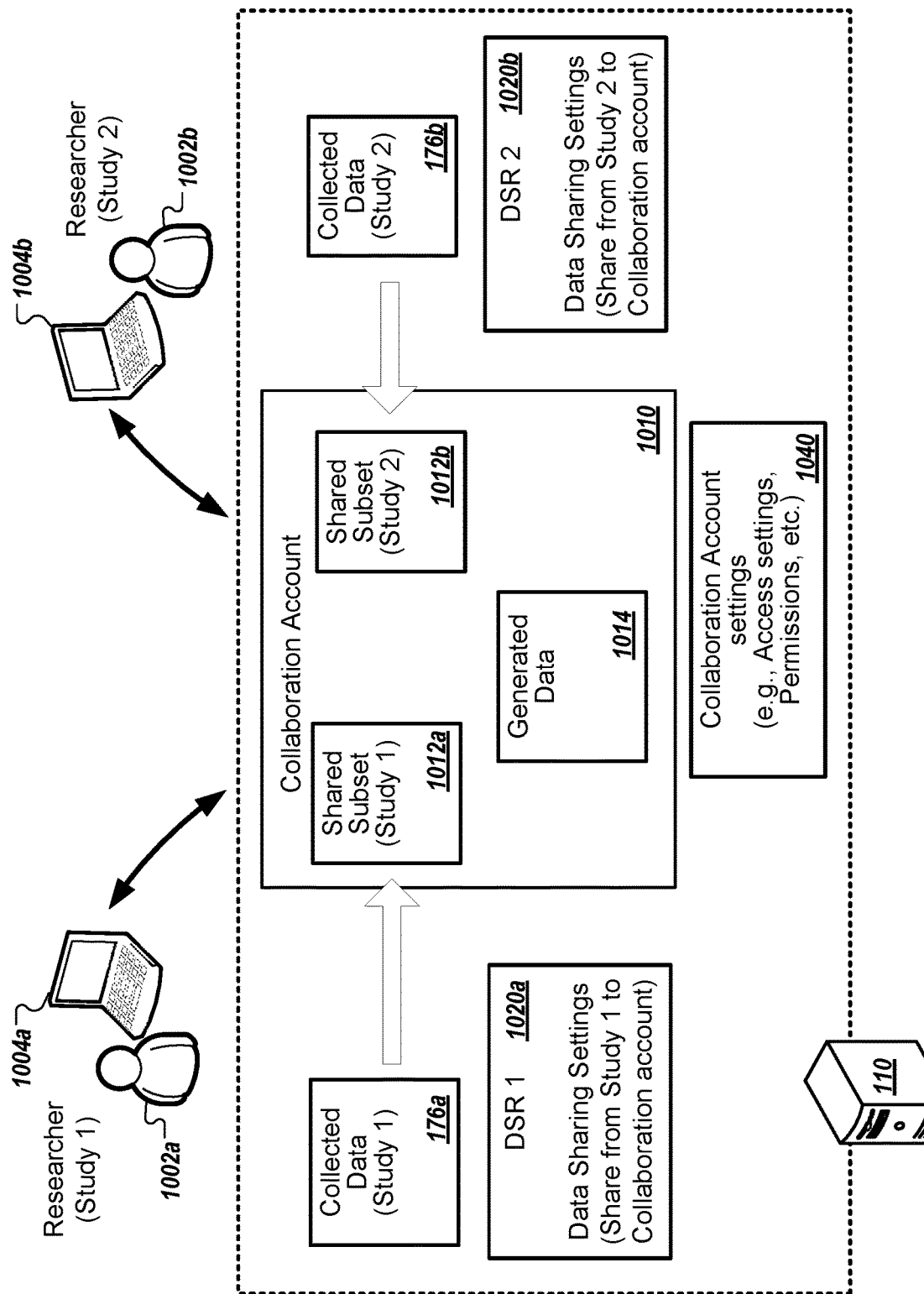
FIG. 10 is a diagram that shows an example of features for collaborating and combining data from different users or accounts.

FIG. 10 is a diagram that shows an example of features for collaborating and combining data from different users or accounts. For example, the computer system 110 enable different users to establish a shared data collection or sharing account that is accessible to multiple individuals or organizations. Various different parties can contribute data to a shared collection, using the techniques discussed above to limit both the portions of collected data made accessible as well as limiting the actions or functions that are available to be applied to the shared data.

For example, researchers for different clinical trials can each specify subsets of By combining the shared data and permissions set by each of multiple parties, the system can create a shared collection, with a shared portal customized to permit the actions and data analysis processes permitted by the parties. This can function as a virtual data sharing room, where the customized portal to access the shared data is provided to all parties involved and each party can interact with and manipulate the data according to the permissions granted by the respective data owners. The system can maintain a separate data storage area or partition for the shared data in the collection, so that alterations to the data and new derived data can be collected and maintained for the parties without affecting the source data sets from which the shared data was derived.

The example of FIG. 10 shows how two researchers 1002a, 1002b that are affiliated with different research studies and different organizations each provide data to a collaboration account 1010 or shared project. The researcher 1002a shares a subset 1012a of monitoring data 176a for Study 1, and the researcher 1002b shares a subset 1012b of monitoring data 176b for Study 2. In this example, these two instances of data sharing each have a separate data sharing record 1020a, 1020b that defines the corresponding subset 1012a, 1012b and specifies how the respective shared data can be used in the collaboration account. In addition, separate collaboration account settings 1040 can be used to further define how the data in the account is used.

In the example, the subsets 1012a, 1012b are each limited to the uses and types of accesses that the users that shared them have specified, and the computer system 110 enforces those limitations. Generated data 1014 that the researchers 1002a, 1002b create (e.g., reports, visualizations, scores, machine learning models and inference results, etc.) can be stored in the shared account 1010 and are accessible to both researchers 1002a, 1002b.

Figure 11A:
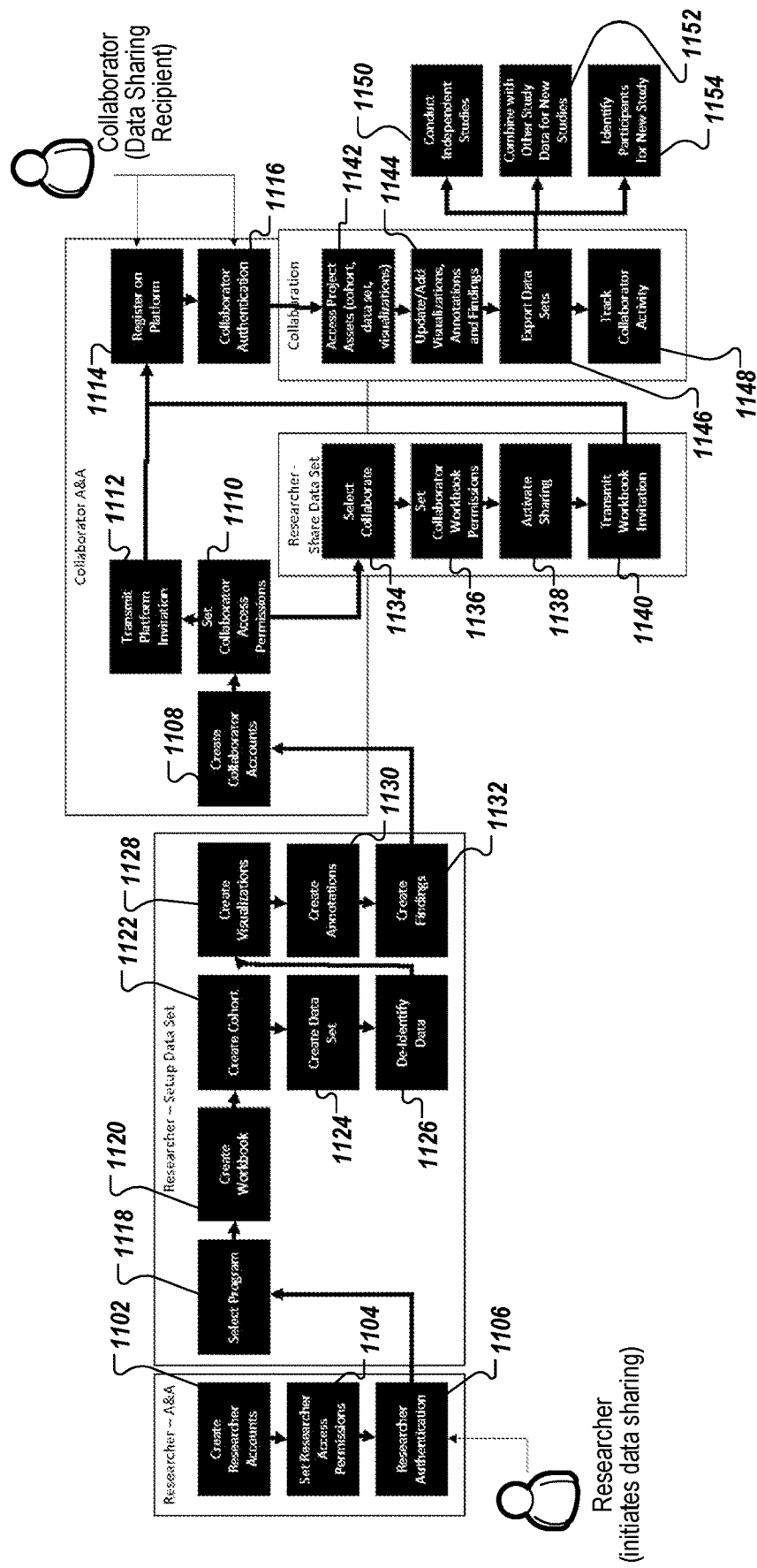
FIGS. 11A-11D show additional views of actions that can be performed to manage research studies and perform data sharing.

FIG. 11A shows a block diagram showing various functions and elements that can be used to manage monitoring programs and manage data sharing. For example, the computer system 110 can provide capabilities for these various functions to be performed. Different subsets of the functionality are revealed to different users depending on their role and relationship to a research study or other monitoring program.

The computer system 110 provides capabilities for account creation, account management, and role-based access control for research staff and collaborators. These features include functions and interfaces to perform operations such as:

Create Researcher Accounts 1102—Ability to create accounts for researchers (direct contributors) who will have the ability to create new cohorts, data sets, and collaborations Set Researcher Access Permissions 1104—Set permissions for researcher access to data, cohort creation, visualization, annotation, export and sharing capabilities. Includes specific access to programs, associated data assets, and associated operations available to the researcher.

Researcher Authentication 1106—Authentication and authorization capabilities for researcher access.

Create Collaborator Accounts 1108—Ability to create accounts for collaborators (e.g., sharing recipients) who will have the ability to access previously created cohorts and data sets.

Set Collaborator Access Permissions 1110—Set permissions for collaborator access to data, visualization, annotation and export capabilities. Includes specific access to shared workspaces, associated data assets, and restrictions on operations that can be performed with that data.

Transmit Platform Invitation 1112—Transmit invitation to a collaborator to join the platform. Once registered (and verified), the collaborator can access shared workbooks (e.g., sets of shared data provided through a customized portal).

Collaborator Registration on Platform 1114—Collaborator registers on the platform and receives the access rights provided at the platform level.

Collaborator Authentication 1116—Authentication and authorization capabilities for collaborator access.

The computer system 110 can also provide features and interfaces for workspace creation, cohort creation, data selection, data set creation, visualizations, data identification, annotation, and generating findings. These functions can be enabled through a set of researcher-facing capabilities, to perform operations such as:

Select Program(s) 1118—Enable researchers with access to multiple programs to select the individual program or collection of programs they choose to work with.

Create Workbook 1120—Enable the researcher to create a workbook to create the specific study assets as a managed collection to be shared.

Create Cohort 1122—Ability for researcher to identify the specific set of participant/patient based on researcher specified filtering criteria.

Create Data Set 1124—Ability for the researcher to identify the specific categories of data and attributes to include in scope of the workbook. Examples of categories of data include demographics, surveys, health data, wearable data, etc. Examples of attributes include the specific data elements associated with a category of data, such as daily summary of steps associated with an activity tracker or all participant/patient-provided data with a particular survey.

De-Identify Data 1126—Enable researchers to remove all or select identity information from access within data set and/or by collaborators to meet PHI/PII security requirements. Access is allowable when critical to the research activity and appropriate care is take to restrict access to only those who need access.

Create Visualizations 1128—Enable researchers to create visualizations from the selected cohort and associated data set.

Create Annotations 1130—Enable researchers to add comments to data sets, visualizations, and other artifacts to enable effective communication among researcher(s) and collaborators.

Create Findings 1132—Enable the ability to create, save and annotate selected visualizations and data sets to reflect scientific findings, and incorporate associated work products (e.g., documents, presentations, or other sourced data) to be included with the data set. Also provides the ability to lock data elements, documents, and artifacts to restrict unwanted modifications.

The computer system 110 can also provide features and interfaces to share data with collaborators, and these features can enable functions such as:

Select Collaborator(s) 1134—Determine which collaborators to share the workspace and data set with.

Set Collaborate Workbook Permissions 1136—Determine the specific capabilities to provide to the collaborators, to include view only, ability to create new visualizations, ability to change filter and search criteria, ability to update data set, ability to export data set, ability to annotate data set, and ability to provide/update findings.

Activate Sharing 1138—Share the workbook with the collaborator

Transmit Invitations 1140—Transmit email or other communications to the collaborator so they have access. May be used to initiate registration workflows, or direct access to shared workbook for pre-registered collaborators.

The computer system 110 can also provide features and interfaces provide collaboration tools to enable exchange of content, ideas, and materials involved in the research process, and these features can enable functions such as:

Access workbook assets 1142—Based on collaborator permissions, allow collaborators to view and interact with data sets, visualizations, annotations and other assets.

Update/Add visualization, Annotations and Findings 1144—Based on collaborator permissions, allow collaborators to add or modify Export data 1146—Based on collaborator permissions, provide the ability to export all or selected portions of the data portion.

Track Collaboration Activities 1148—System audits and monitors collaborator activities The shared data can be used to support a variety of scientific research needs, including to Conduct Independent Studies 1150, Combine with Other Study Data for New Studies 1152, and Identify participant/patient to include in New Studies 1154.

Figure 11B:
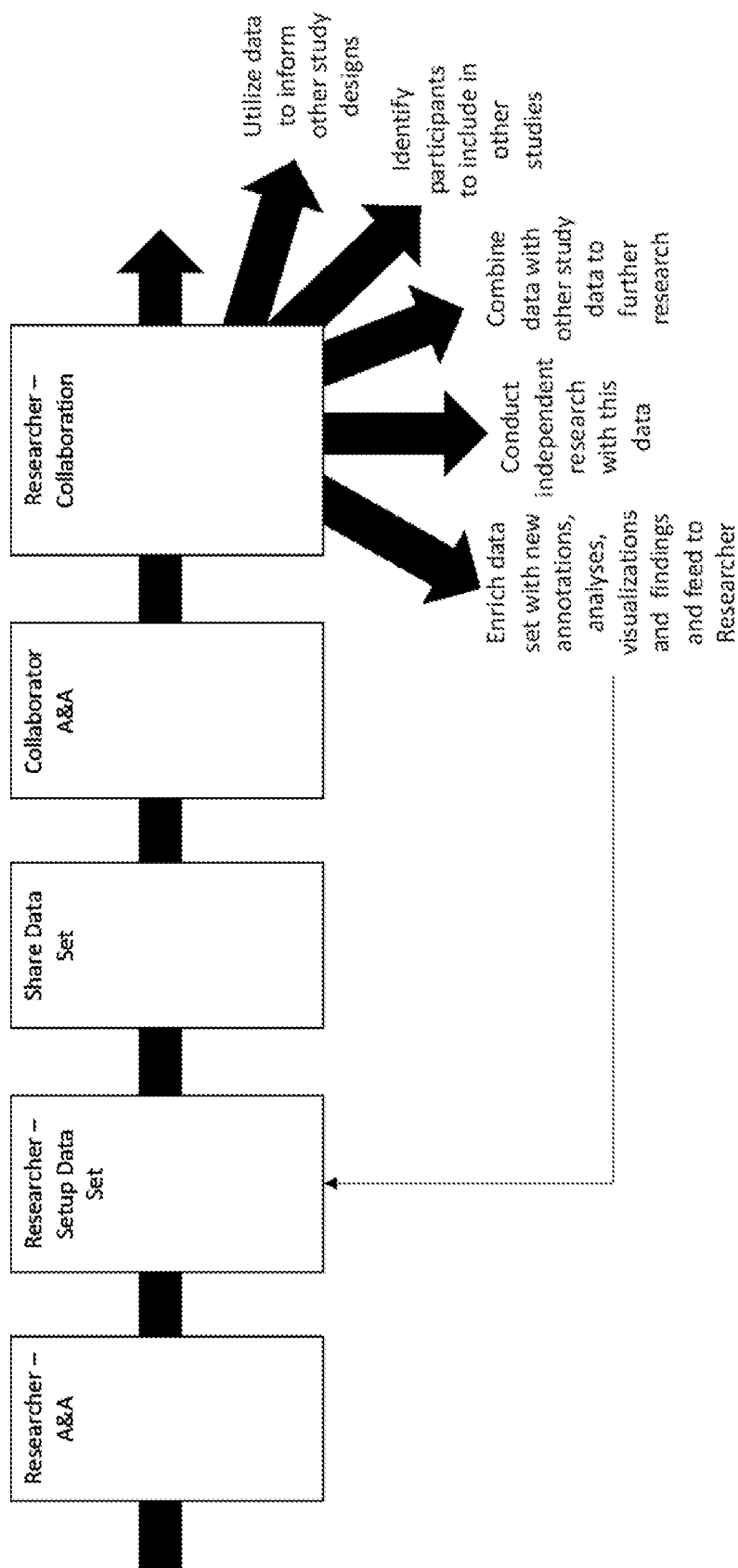

FIG. 11B shows another view of the groups of features from FIG. 11A, representing how the processes enabled by the computer system 110 enable various outcomes from collaboration and data sharing, including providing enriched data back to the researcher(s) that shared data with the recipient or collaborator.

Figure 11C:
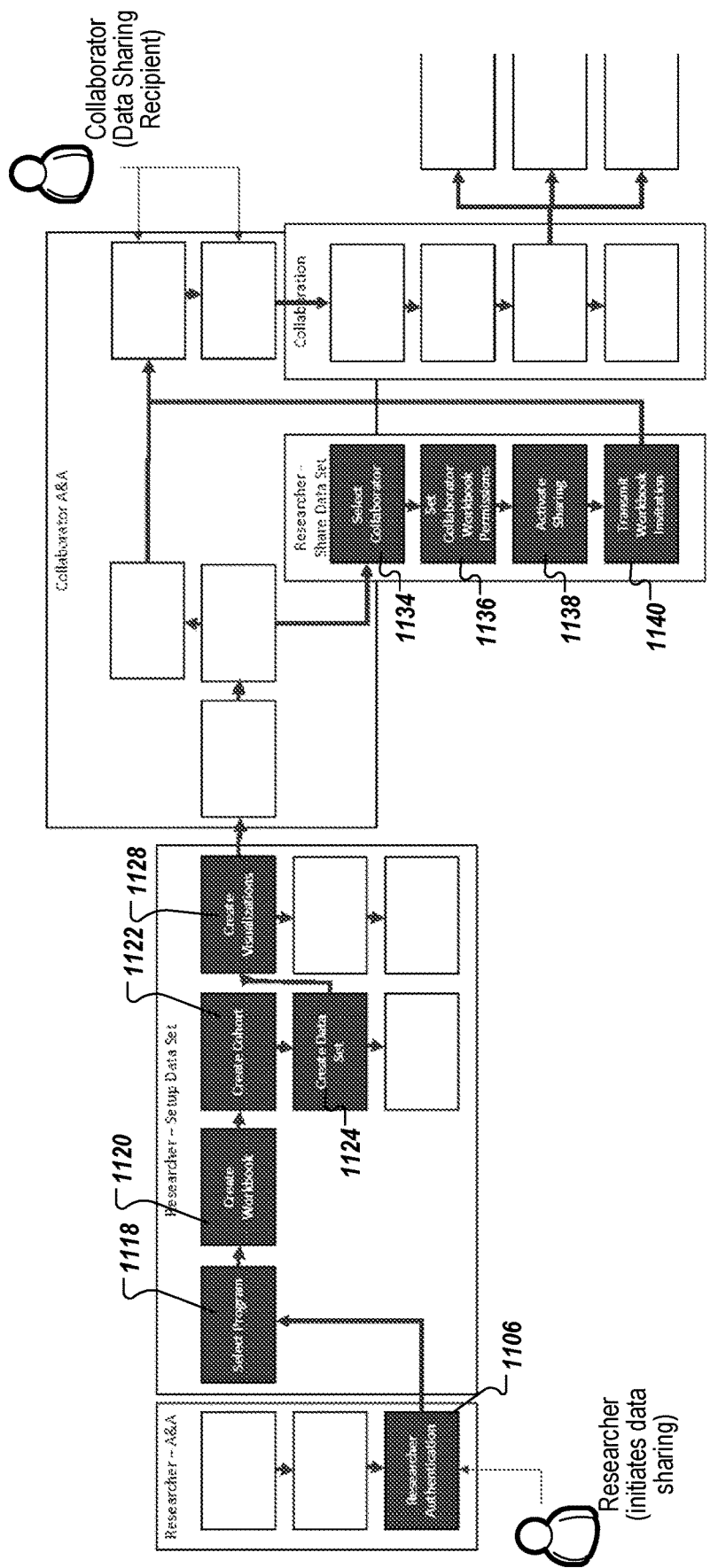

FIG. 11C shows a subset of the functions from FIG. 11a that are used when a user prepares a data set and initiates sharing. For example, researcher authentication 1106 is performed, and the researcher selects program(s) 1118 (e.g., research studies) from which data will be shared. The researcher then creates a workbook 1120 to define the set of data that is being shared. As a result, the system creates a data set 1124, as subset of the collected monitoring data for the research study. The computer system 110, as directed by the researcher, can also create visualizations 1128 to be shared. The researcher then selects collaborator(s) 1134 as data sharing recipients, sets collaboration workbook permissions 1136 (e.g., to set how the shared data can be used and what functions are available in the custom portal. The computer system 110 then activates sharing 1138 and transmits invitations 1140 to the sharing recipients selected.

Figure 11D:
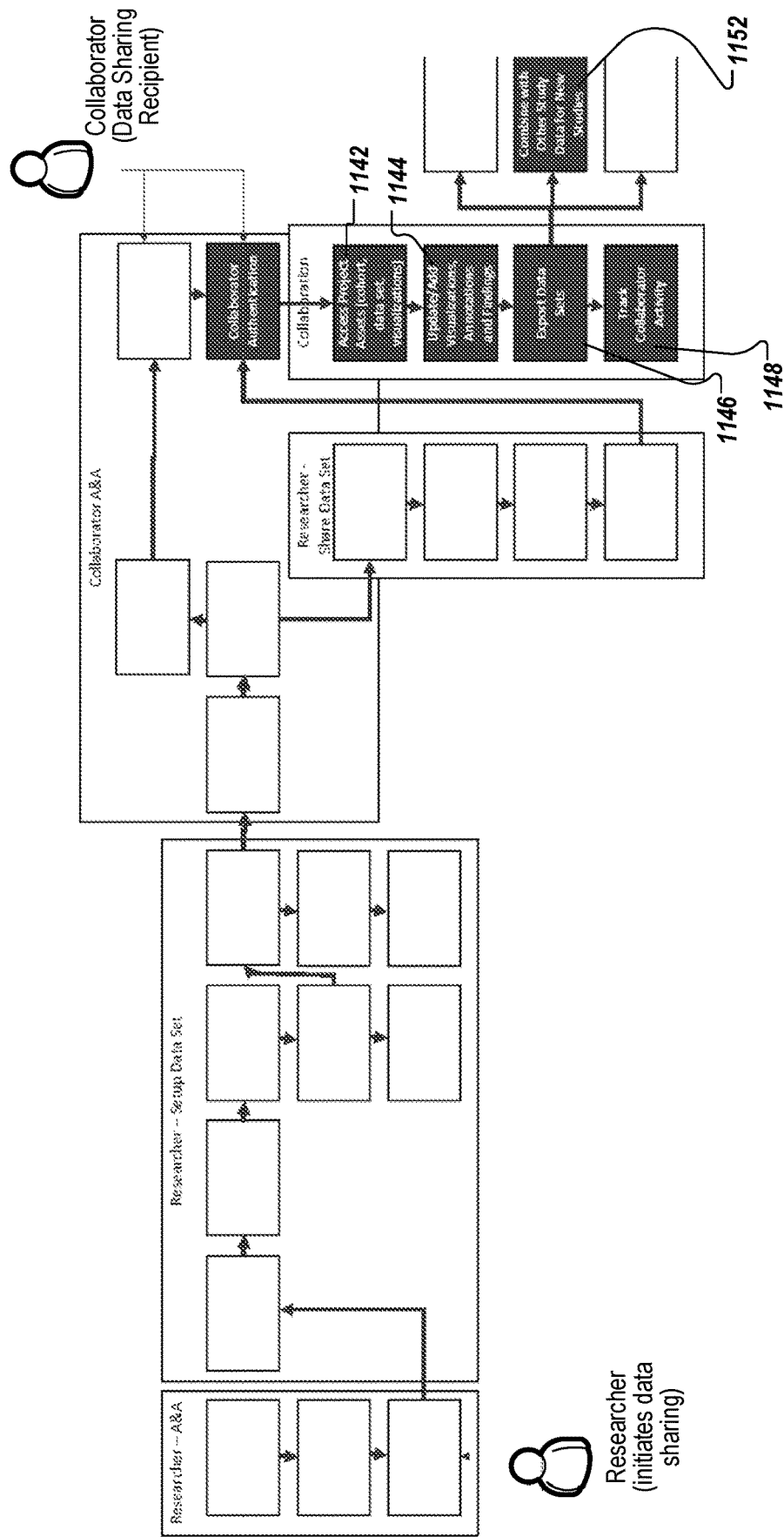

FIG. 11D shows an example of features from FIG. 11A used in the process of a data sharing recipient accessing shared data. For example, collaborator authentication 1116 is performed, and the data sharing recipient or collaborator is provided access workbook assets 1142, such as through the customized portal described above. The collaborator can then update/add visualizations, annotations and findings 1144. The collaborator, when authorized, creates new visualizations and adds to the project, add annotations to the data set and existing or new visualizations. When authorized, the collaborator can cause the computer system 110 to export data 1146 subject to the limitations in the data sharing record, such as to export data sets for use in external analytics systems. The computer system 110 tracks collaboration activities 1148 to share results back to the original research study and user that provided the shared data. The collaborator can also use the platform to combine shared data with other study data for new studies 1152, for further analysis and in further studies.

Figure 12:
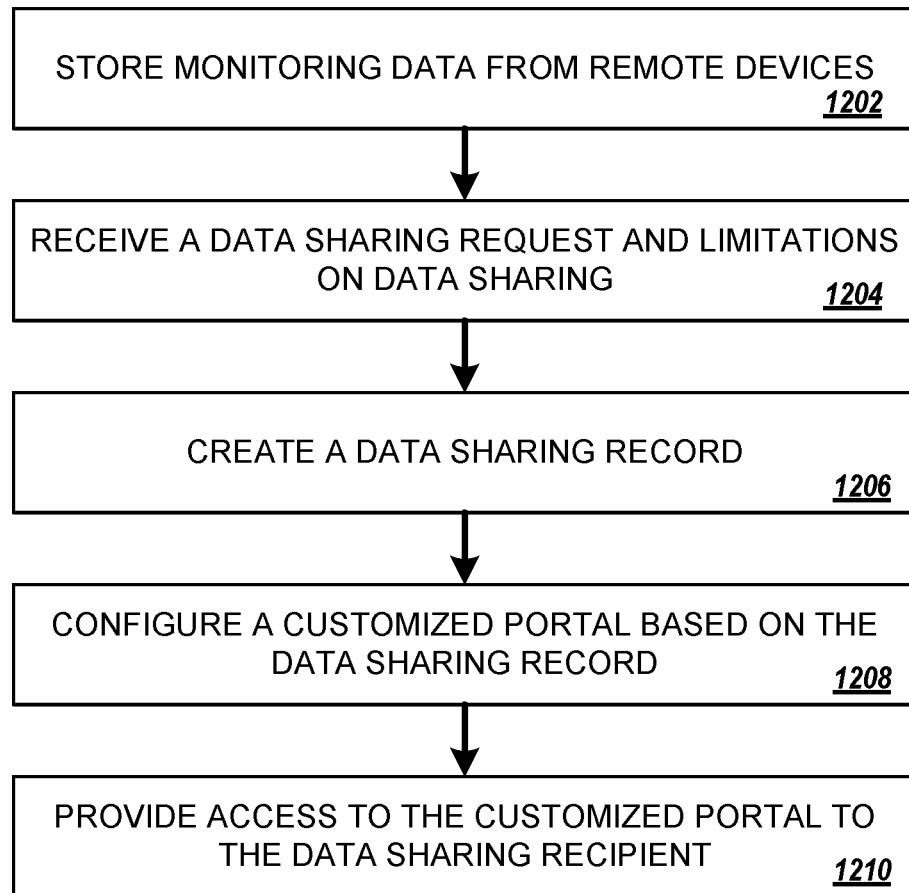
FIG. 12 is a flow diagram illustrating an example of a process for sharing data.

FIG. 12 describes a process 1200 for facilitating data sharing. The process 1200 can be performed by one or more computers, such as one or more computers of a server system such as the computer system 110. Using the process 1200, the computer system 110 can provide versatile data sharing that each user can customize for each recipient. For example, when a user that shares data with another user (or a group of users or an organization), the computer system 110 can enforce various user-specified bound on which portions of a data set are shared, potentially using in any of multiple types of criteria (e.g., by date of data collection, by source of data, by type of data, by record classification, for records having certain keywords, for records having specific values or values in a range, etc.). The form in which the data is shared can be limited also, such as to provide access to data about individual, de-identified or anonymized data about individuals, or summary data that aggregates information across a group.

In addition to limiting which portions of data the recipient can access, the computer system 110 can customize an interface provided to the recipient, to limit the available functions and operations that are available for the recipient to perform. The shared data can be restricted to be accessed and processed by the cloud-computing-based platform, with the recipient having access to initiate data processing and access only through a web-based portal. While results and visualizations can be presented through the portal, the underlying data can be protected and limited from access or copying according to the settings set by the user that initiated sharing. In this way, the computer system 110 can enable the data recipient to perform certain operations, e.g., statistical analysis, machine learning training, generating reports, and generating visualizations, while blocking or disallowing other operations that the platform is capable of providing and does provide in portals provided to appropriately authorized users.

To provide customized portals with limited functionality tailored according to applicable data sharing settings, the computer system 110 can customize the user interface of the portal provided to each data sharing recipient. For example, the computer system 110 can generate user interface data (e.g., data of a web page, web application, etc.) that enables only a selected subset of the data access and data processing features of portals in the system. The user interface can be set to omit or disable the elements (e.g., menu items, content areas, interaction types, buttons, text entry fields, etc.) that the user sharing the data did not authorize. In some implementations, the computer system 110 structures the user interface of the customized portal so that features not available to be used on the data set are not even indicated to the user. As a result, the user interface is focused on displaying only the limited set of data or views into the data that are permitted, and also providing only the interactive user interface elements for the limited set of actions the recipient is permitted to apply.

The computer system 110 can create a separate data sharing record and customized portal for each instance of sharing. As discussed above, these sharing instances are often from one user to another, but may additionally or alternatively be made between organizations, divisions of organizations, groups of individuals, etc. The system can be coordinated so the sharing recipient does not need to be an existing registered user of the platform, as discussed above.

The process 1200 includes storing a data set comprising monitoring data collected from remote devices over a communication network (step 1202). As noted above, the monitoring data can be data from a clinical trial, health research study, or other monitoring program. The monitoring data can include user input, survey responses, and other records of user interactions with devices used in the monitoring program. In addition, the monitoring data can include measurement results from sensors, connected devices, and other sources.

The process 1200 includes receiving a data sharing request associated with a user (step 1204). An authorized user having permission to share data collected in a monitoring program can initiate data sharing in any of a variety of ways, such as by interacting with a user interface control to initiate sharing (e.g., a button, a menu item, etc.) or by sending a request through an API. The data sharing request can include or be associated with information that specifies the parameters that govern the data sharing being initiated. The parameters can be specified by the user, such as through user input to a user interface (e.g., a web-based access portal) presented based on data provided by the computer system 110. The parameters can include limitations or constraints on, for example, the portions of data shared and the ways the shared data can be used.

For example, the user can specify a data sharing recipient and data sharing characteristics including (i) one or more portions of the data set to be shared with the data sharing recipient and (ii) a limited set of operations that the data sharing recipient is authorized to perform using the one or more portions of the data set. The set of operations can be a proper subset of operations that the computer system 110 is configured to enable through data access portals.

The user can be an authorized user having permission to share data collected from a monitoring program. The data set can be a set of monitoring data collected for a monitoring program (e.g., clinical trial, health research study, etc.) that involves repeated data collection from a distributed group of users. To facilitate setting the parameters for sharing, the computer system 110 can provide user interface data to a device associated with the authorized user. The user interface data can specify a user interface having controls that enable the authorized user to (i) define a subset of the monitoring data for the monitoring program to be shared, and (ii) specify, from among the operations that the computer system 110 is configured to enable through data access portals, the limited set of operations permitted for the data sharing recipient to perform. In some cases, the controls enable the authorized user to define the subset of the monitoring data according to each of multiple different criteria. The multiple different criteria can include one or more of: a time that data was collected; a source of the collected data; a type of data collected; a selection of one or more records; data corresponding to selected individuals or groups of individuals; data for one or more topics or keywords; or one or more classifications of the data.

The process 1200 includes generating a data sharing record based on the data sharing request (step 1206). The data sharing record can indicate the parameters set for sharing data with the recipient, such as the identity of the recipient, the portion of the data set to be shared with the recipient, and the limited set of operations that are authorized for the recipient to perform using the shared portion of the data set.

The process 1200 includes configuring a customized portal for the data sharing recipient based on the data sharing record (step 1208). The customized portal is configured to provide (i) limited access to the data set by providing access to the one or more portions of the data set while disallowing access to content of the data set outside the one or more portions, and (ii) limited functionality to perform the limited set of operations while disallowing operations not in the limited set of operations.

The computer system 110 can perform a variety of steps to prepare to provide the customized portal. For example, the computer system 110 can create or update a user account or user profile for the recipient, to specify the new access to shared data. The computer system 110 can identify whether the specified user has an existing account in the data access platform, and if not, the computer system 110 can create a new account for the recipient. The computer system 110 can configure authentication requirements and authentication data for the recipient, such as by assigning a URL for the custom portal, or assigning a code, access token, account identifier, or other data for the recipient and/or the specific instance of data sharing.

The computer system 110 can also allocate data storage for the recipient in association with the data sharing instance. This can include a separate data area to store settings, preferences of the recipient, and state information for the custom portal. The data area can also be configured to store information generated through use of the custom portal, for example, to store visualizations, reports, query results, and other data processing results generated using the custom portal.

The computer system 110 can also send a notification to the recipient, to notify the recipient of the newly available data and to provide the URL, account identifier, or other information that enable the recipient to access the custom portal.

In some implementations, the computer system 110 configures the customized portal by selecting, from a set of user interface elements that the computer system 110 provides for the data access portals, a proper subset of the user interface elements to be provided in the customized portal. The proper subset of user interface elements is selected to provide the limited set of operations specified in the data access record, and to omit or block functionality for operations outside the limited set of operations authorized.

The process 1200 includes providing access to the customized portal to a device associated with the data sharing recipient (step 1210). The customized portal provides the limited access to the data set and the customized subset of functionality. The customized portal can be provided as a web page or web application served by the computer system.

In some implementations, the customized portal is a customized view presented by a software application installed on the device associated with the data sharing recipient. The customized view restricts interactive user interface functionality of the software application based on the data sharing record. Only a proper subset of the interactive user interface functionality, selected to provide the limited set of operations, is accessible when interacting with the shared one or more portions of the data set using the software application.

For example, the computer system 110 can receive a message provided over the communication network, from a device associated with the data sharing recipient. The message can request access to the customized portal, such as a request to load the web page or web application for the custom portal. In response to receiving the message, the computer system 110 can identify the data sharing record corresponding to the data sharing recipient. For example, the message can specify an identifier, the computer system 110 can find, from among the various data sharing records, the record that corresponds to the provided identifier (e.g., a custom portal identifier, a data share identifier, an account number, user identifier, or other identifier). The computer system 110 generates user interface data for the customized portal that corresponds to the data sharing record. This can include content of a web page, web application, or content for presentation in another application. The computer system 110 then provides the generated user interface data to the device over the communication network.

To generate the user interface data, the computer system 110 can start with a template or default interface and make adjustments based on the authorizations and restrictions in the data sharing record for the recipient. For example, the computer system 110 can access a template specifying an arrangement of interactive user interface elements configured to initiate different operations on shared data. The computer system 110 can then generate the user interface data based on the template, which can include altering the arrangement indicated by the template to omit or disable interactive user interface elements for operations not included in the limited set of operations specified by the data sharing record.

In some implementations, the computer system 110 generates the user interface data by starting with a first interface and then removes interactive elements that the data sharing record indicates are not authorized. For example, the computer system 110 can access a template specifying an arrangement of interactive user interface elements configured to initiate different operations on shared data. The computer system 110 can then generate the user interface data based on the template, by altering the arrangement indicated by the template to omit or disable interactive user interface elements for operations not included in the limited set of operations specified by the data sharing record.

In some implementations, the computer system 110 generates the user interface data by starting with a first interface and then adds interactive user interface elements that are authorized. For example, the computer system 110 can access a template specifying a baseline set of interactive user interface elements to include in data access portals. This can be a basic set of features available to all portals, such as a basic layout and structure of the web page. The computer system 110 can then generate the user interface data based on the template, by adding interactive user interface elements that are respectively configured to initiate the operations in the limited set of operations specified by the data sharing record.

Various operations can be performed to manage multiple instances of sharing. The computer system 110 is configured to enable the user to share different portions of the data set with different recipients and to apply different sets of restrictions on data manipulation operations made available to the different recipients. The computer system 110 is configured to store separate data sharing records for each of the different recipients and to provide separate customized portals to the respective recipients. Each of the customized portals (i) provides access to the corresponding portion of the data set specified by the user for the corresponding recipient and (ii) applies the restrictions specified by the user for the recipient so that only the set of data manipulation operations authorized by the user are available through the customized portal.

If a user initiates multiple shares to the same recipient, these can be provided through separate portals. For example, for a subsequent share to the same recipient that shares a different set of data with its own function restrictions, the computer system 110 can provide a second portal for separate access the second portion of data, subject to the restrictions of the second share.

For example, after generating a data sharing record based on a first data sharing request, the computer system 110, can receive, from the user, a second data sharing request to share data with the data sharing recipient. The second data sharing request includes or is associated with information specifying (i) a second portion of the data set to be shared with the data sharing recipient and (ii) a second set of operations authorized for the data sharing recipient to perform using the second portion of the data set. In response to receiving the second data sharing request, the computer system 110 configures a second customized portal for the data sharing recipient. The second customized portal is configured to provide, separate from the first customized portal providing access to the one or more portions, (i) access to the second portion of the data set while disallowing access to content of the data set outside the second portion, and (ii) limited functionality to perform the second set of operations while disallowing operations not in the second set of operations.

As another option for handling multiple shares, multiple shares to a recipient may be combined for access through a single portal while maintaining the separate function restrictions for using each type of data shared. In other words, if a user shares more of a data set at a later time, the computer system 110 updates the data sharing record and portal characteristics to use both shared portions, subject to the respective restrictions on each shared portion.

As an example, after generating a data sharing record based on the first data sharing request, the computer system 110 can receive, from the user, a second data sharing request to share data with the data sharing recipient. The second data sharing request includes or is associated with information specifying (i) a second portion of the data set to be shared with the data sharing recipient and (ii) a second set of operations authorized for the data sharing recipient to perform using the second portion of the data set. In response to receiving the second data sharing request, the computer system 110 updates the data sharing record to indicate added access to the second portion of the data set and to indicate the second set of operations authorized to be performed using the second portion of the data set. The customized portal for the data sharing recipient is updated to provide access to both (i) the one or more portions of the data set shared based on the first data sharing request and (ii) the second portion of the data set shared based on the second data sharing request. The computer system 110 configures the customized portal to limit the operations available to be performed. The limited set of operations authorized based on the first data sharing request are available for the one or more portions of the data set first shared, and the second set of operations authorized based on the second data sharing request are available for the second portion of the data set.

The computer system 110 can provide, to the user that enables sharing, an interface showing the status of sharing, so the user can see which sharing relationships are active, and what their properties are (e.g., which subset of data is shared for each, what limitations on use or portal functions are applied, duration or expiration or each, etc.). For example, the computer system 110 can identify multiple data sharing records that each indicate a data sharing relationship that of at least a portion of the data set. The computer system 110 can provide, over the communication network and for display by a device associated with the user, a list of the data sharing relationships provided by the identified data sharing records. The list can indicate, for each of the data sharing relationships, the data sharing recipient for that sharing instance and the portion of the data set shared. In addition, the interface can show tracked usage data, showing how often each sharing instance was used, which portions of shared data were actually used and which operations were applied, and so on. The interface may provide information about data sharing instances that are active, or may also include historical data sharing instances, to include data sharing that has been terminated or has expired. The interface can be configurable by the user to filter which set of sharing instances to show, and which information about those shares to show.

After sharing is initiated, subject to the conditions the user applies, the computer system 110 can track use of the custom portal and the shared data and provide the results to the user. For example, the computer system 110 can track access events in which the shared one or more portions of the data set are accessed through the customized portal or other customized portals provided for the data set. The computer system 110 can provide, to a device associated with the user, user interface data indicating the tracked access events. The user interface can show information for a data set as a whole, or show events and interactions for each sharing relationship separately. For example, the user interface can show a list of all events. These events can be ordered by time, or can be grouped or sorted according to the recipient or data sharing relationship used to facilitate the access event. Additional information about access characteristics can be included in the tracking data, so user can interact with one of the listed events to see more (e.g., time, duration, amount of data accessed, functions applied, etc.). As an example, tracking data can include: a log of events; time and duration of access for each event; which portions of shared data were accessed (e.g., particular records, fields, data values, etc.); the set of functions or tools applied (e.g., search, filter, join, etc.); parameter values used in the operations performed (e.g., text of search queries submitted, filter criteria applied, etc.). The tracking can be sufficiently detailed to enable the user to recreate at least some of the operations performed or views generated by the sharing recipient. For example, while not every scroll position or window size of the recipient is tracked, the computer system 110 can still re-run the search query entered by a sharing recipient, and also apply the filtering or ranking the recipient applied to the query results. The computer system 110 can provide a link in the log data so that the data owner can click to recreate the operations and see a view that is the same or similar to what the sharing recipient saw.

Sharing can be implemented in various ways. For example, part of configuring the customized portal for the data sharing recipient can be populating a data area or data collection for the recipient to access. For example, the computer system 110 can store a copy of the one or more portions of the data set in a data storage area for the customized portal that is separate from the data set. The computer system 110 is configured to maintain persistent storage of the data in the data storage area across multiple sessions of use of the customized portal. The computer system 110 configures the customized portal to provide access to the copied data in the data storage area and not provide access to the data set.

In other cases, the computer system creates temporary copies of data for each session of use of the customized portal. For example, the computer system 110 can be configured to create, for each session of use of the customized portal, a new temporary copy of the one or more portions of the data set to be used during the session, and then discard the temporary copy for the session after the session ends.

As discussed for FIG. 9, the computer system 110 enables a researcher can share a dynamic data set, such as sharing the results to a query or a set of filter settings. The set of records available may vary from time to time as the set of matching records changes. The dynamic sharing can be implemented in various ways. For example, a persistent data area can be set for the data sharing, and the system 110 can transfer updates and additions from the original source data set to the data area for the sharing relationship, as well as remove or redact information that no longer meets the applicable criteria. As another example the set of data to be determined can be performed using a data area that is populated just-in-time each time the user logs in to include the data that meets the criteria of the dynamic data set at that time. As another example, rather than allocating a particular storage area to use, the computer system 110 can perform on-the-fly database operations, working with an in-memory or cached portion of the data set, where the contents are checked upon use each time with respect to the scope and restrictions in the data sharing record.

As an example of dynamic data sharing, the one or more portions of the data set to be shared can be defined based on a set of criteria specified by the user such that the subset of the data set that meets the criteria can vary over time. The criteria are stored in the data sharing record. The computer system 110 is configured to vary the content of the data set accessible through the customized portal based on a determination by the computer system 110, for each session of use of the customized portal, of which portions of the data set currently satisfy the criteria at the time the customized portal is used. The criteria include search criteria or filter criteria, such that, for each session of use of the customized portal, the customized portal shares the portion of the data set that the computer system 110 determines to currently meet the search criteria or filter criteria.

Data sets can change over time, as new data is added or as records are corrected or removed. The system determines for each session of use of the customized portal which data meets the criteria for sharing specified by the sharing user, based on the current state of the data set. For example, records 1 and 2 may be made available in a first session. Later, new data may be added to the data set, or existing data altered or removed from the data set. In a second session, the customized portal may provide access to records 2 and 3, and not record 1. This may be because the changes to the data set caused record 1 to no longer qualify for sharing (e.g., recent measurements for the person described in record 1 caused the record to no longer meet the criteria for sharing). In addition, new measurements for the person described in record 3 cause record 3 to now satisfy the criteria for sharing. In this manner, for each use of the sharing relationship, or for each session of using the customized portal, the computer system 110 dynamically extracts the subset of data that qualifies at the time of access, given the current state of the data set.

Various types of criteria can be used for setting dynamic data sharing, including criteria such as the presence of a keyword, indication or absence of particular medical status (e.g., whether a particular disease diagnosed, whether a particular symptom is present, etc.), whether a measurement is in a range, whether the information relates to an active member of the cohort, whether records have a minimum level of completeness or data quality or compliance with the protocol, and so on. The criteria for dynamic data sharing can include the presence of keywords, or values in certain ranges, or a particular status or classification of participant or data record. The dynamic data set may specify a rolling window of time for data (e.g., always show the last month of data, but not allow access to previous data). The dynamic data set may vary which portions of data are shared, from among data previously collected before the sharing was initiated. In other words, rather than simply add new data as it is collected, the dynamic data sharing may selectively share existing data based on other criteria. The dynamic sharing can add and remove data based on the criteria. As noted above, the criteria to determine what to share can be different from the content of data that is actually shared. For example, a user may share resting heart rate and blood pressure, but criteria for determining which records to share is based on the residence of the person, the age of the person, symptoms of the person, or other information that are not shared.

As an example, the computer system 110 can receive, in association with the data sharing request, input specifying for results generated by the recipient using shared data to be provided to the user. The computer system 110 includes, in the data sharing record, an indication that results generated by the recipient using shared data are to be provided to the user. The computer system 110 generates, as a result of interaction through the customized portal by the data sharing recipient, content derived from the shared one or more portions of the data set. Based on the indication in the data sharing record, the computer system 110 automatically saves the generated content and automatically making the generated content available to the user.

The data collected by the computer system 110 in monitoring programs and shared with recipients, as used in any of the examples and implementations discussed above, can include a variety of information from a variety of sources. Data can be collected for categories representing a variety of individual, community, or public health conditions and behaviors. This data can include attributes that are biological, physical or physiological, mental, emotional, environmental, or social. The collected data can include biological attributes, such as genetic makeup, genomics, family history, sensory abilities (e.g., ability to see, perception of light and dark, perception of color, extent of ability to smell, ability to touch and sensitivity, ability to hear and sensitivity, etc.). These may reflect biological factors that a person cannot control. The collected data can include physical or physiological attributes, e.g., weight, muscle mass, heart rate, sleep, nutrition, exercise, lung capacity, brain activity, etc. Some physical attributes may result from the impact of lifestyle choices or things that a person can control. The collected data can include mental attributes, such as interpretation of brain related signals, indications of chemical imbalances, education levels, results of mental tests, etc. The collected data can include emotional attributes, such as interpretation of self-reported data, or classified audio or video related data that suggests individual responses to stimuli. The collected data can include environmental data, such as location data, air quality, audible noise, visual noise, temperature, humidity, movement (and potentially effects of movement such as motion sickness, etc. The collected data can include social attributes, such as whether a subject is socially engaged, exhibits social avoidance, experiences the impact of acceptance or responsiveness emotionally, and so on.

The data collected and used by the computer system 110 (e.g., for monitoring, to be shared with recipients, etc.) can include various other types of data including:

- Lab and diagnostic data (e.g., assay data, blood test results, tissue sample results, endocrine panel results);
- Omics data (e.g., data relating to genomics, proteomics, pharmacogenomics, epigenomics, metabolomics, biointeractomics, interactomics, lifeomics, calciomics, chemogenomics, foodomics, lipidomics, metabolomics, bionomics, econogenomics, connectomics, culturomics, cytogenomics, fermentanomics, fluxomics, metagenomics, metabonomics, metallomics, O-glcNAcomics, glycomics, glycoproteomics, glycosaminoglycanomics, immunoproteomics, ionomics, materiomics, metalloproteomics, metaproteogenomics, metaproteomics, metatranscriptomics, metronomics, microbiomics, microeconomics, microgenomics, microproteomics, miRomics, mitogenomics, mitoproteomics, mobilomics, morphomics, nanoproteomics, neuroeconomics, neurogenomics, neuromics, neuropeptidomics, neuroproteomics, nitroproteomics, nutrigenomics, nutrimetabonomics, oncogenomics, orthoproteomics, pangenomics, peptidomics, pharmacoeconomics, pharmacometabolomics, pharmacoproteomics, pharmaeconomics, phenomics, phospholipidomics, phosphoproteomics, phylogenomics, phylotranscriptomics, phytomics, postgenomics, proteogenomics, proteomics, radiogenomics, rehabilomics, retrophylogenomics, secretomics, surfaceomics, surfomics, toxicogenomics, toxicometabolomics, toxicoproteomics, transcriptomics, vaccinomics, variomics, venomics, antivenomics, agrigenomics, aquaphotomics);
- Biologically sampled data (e.g., data describing blood, urine, saliva, breath sample, skin scrape, hormone levels, ketones, glucose levels, breathalyzer, DNA, perspiration, and other biological samples and derived data);
- Cardiac-related biodata (e.g., data from ECG/EKG monitors, heart rate monitors, blood pressure monitors);
- Respiratory-related biodata (e.g. data from spirometers, pulse oximeters);
- Neurological-related biodata (e.g. data from EEG monitors);
- Behavior data (e.g. movement patterns, gait, social avoidance);
- Drug data (e.g., prescription information, pharmacological data);
- Substance use data (e.g., alcohol, medication, insulin, recreational drugs, tobacco);
- Sleep data (e.g., motion data, heart rate data, body temperature, perspiration, breathing data, ambient light, ambient sound, ambient temperature);
- Exercise data (e.g. performance data, distance covered, activity, VO2 Max),
- Physical activity data (e.g., step counts, heart rate, flights climbed, altitude, other data from fitness trackers);
- Mood data (e.g., happiness, depression, PHQ9, BMIS data and other scales/reporting mechanism);
- Positioning and location data (e.g., GPS data, gyroscope, altimeter, accelerometer, linear acceleration, received signal strength indicator from nearby emitters such as WiFi access points, Bluetooth sensors and sensor networks and Cellular towers);
- Environmental data (e.g., air quality data, ozone data, weather data, water-quality data, audible decibel levels, interpreting measured audio data, measuring luminance lux, interpreting measured light wavelengths, measuring temperature and gases or particles—such as formaldehyde (Molecular Formula: $H_2CO$ or $CH_2O$); alcohol vapor (Molecular Formula: hydroxyl group-OH, e.g., Isopropyl$C_3H_8O$ or $C_3H_7OH$, as well as Ethanol: $C_2H_6O$ or $C_2H_5OH$); benzene ($C_6H_6$); Hexane ($C_6H_{14}$); Liquefied Petroleum Gas (LPG) which could include a mixture of butane (Molecular Formula: $CH_3CH_2CH_2CH_3$ or $C_4H_{10}$) and isobutene (Molecular Formula: $(CH_3)_2CHCH_3$ or $C_4H_{10}$ or $(CHC_4H_{10})_2CHCH_3$); propane (Molecular Formula: $CH_3CH_2CH_3$ or $C_3H_8$); natural coal or town gas which could include of methane or natural gas (Molecular Formula: $CH_4$); carbon dioxide (Molecular Formula: $CO_2$); hydrogen (Molecular Formula: $H_2$); carbon monoxide or possibly smoke (Molecular Formula: CO); and oxygen (Molecular Formula: $O_2$) in the environment surrounding an individual inside and outside the contextual location of the potential subjects such as home, office, and including vehicle data—such as speed, location, amount of time driving, mood while driving, environmental data in the car).

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

The invention claimed is:

1. A method performed by one or more computers of a server system, the method comprising:
    storing, by the server system, a data set comprising monitoring data collected from remote devices over a communication network;
    receiving, by the server system, a data sharing request associated with a user, wherein server system is configured to provide data access portals that include interactive interface elements to perform operations on shared data, and wherein the data sharing request includes or is associated with information specified by the user including:
        a data sharing recipient; and
        data sharing characteristics including (i) one or more portions of the data set to be shared with the data sharing recipient and (ii) a limited set of operations that the data sharing recipient is authorized to perform using the one or more portions of the data set, wherein the limited set of operations is a proper subset of the operations that the server system is configured to enable through interactive interface elements of the data access portals;
    in response to verifying authorization of the user, generating, by the server system, a data sharing record that specifies (i) the one or more portions of the data set to be shared with the data sharing recipient and (ii) the limited set of operations that the data sharing recipient is authorized to perform using the one or more portions of the data set;
    configuring, by the server system, a customized portal for the data sharing recipient based on the data sharing record, wherein the customized portal is configured to provide (i) limited access to the data set by providing access to the one or more portions of the data set while disallowing access to content of the data set outside the one or more portions, and (ii) limited functionality to perform the limited set of operations while disallowing one or more operations not in the limited set of operations; and
    providing, by the server system and to a device associated with the data sharing recipient, access to the customized portal that provides the limited access to the data set and the limited functionality, wherein providing access to the customized portal comprises generating user interface data for the customized portal that corresponds to the data sharing record, and wherein the user interface data is generated based on the data sharing record such that the customized portal does not include or does not enable interactive interface elements for the one or more operations not in the limited set of operations.

2. The method of claim 1, comprising receiving, from a device associated with the data sharing recipient, a message provided over the communication network, wherein the message requests access to the customized portal; and
    in response to receiving the message:
        identifying the data sharing record corresponding to the data sharing recipient;
        generating the user interface data for the customized portal that corresponds to the data sharing record; and
        providing the generated user interface data to the device over the communication network.

3. The method of claim 1, wherein generating the user interface data comprises:
    accessing a template specifying an arrangement of interactive user interface elements configured to initiate different operations on shared data; and
    generating the user interface data based on the template, including altering the arrangement indicated by the template to omit or disable interactive user interface elements for operations not included in the limited set of operations specified by the data sharing record.

4. The method of claim 1, wherein generating the user interface data comprises:
    accessing a template specifying an arrangement of interactive user interface elements configured to initiate different operations on shared data; and
    generating the user interface data based on the template, including altering the arrangement indicated by the template to omit or disable interactive user interface elements for operations not included in the limited set of operations specified by the data sharing record.

5. The method of claim 1, wherein generating the user interface data comprises:
    accessing a template specifying a baseline set of interactive user interface elements to include in data access portals; and
    generating the user interface data based on the template, including adding interactive user interface elements that are respectively configured to initiate the operations in the limited set of operations specified by the data sharing record.

6. The method of claim 1, wherein the customized portal is provided as a web page or web application served by the server system.

7. The method of claim 1, wherein the customized portal is a customized view presented by a software application installed on the device associated with the data sharing recipient, wherein the customized portal restricts interactive user interface functionality of the software application based on the data sharing record so that only a proper subset of the interactive user interface functionality, selected to provide the limited set of operations, is accessible when interacting with the shared one or more portions of the data set using the software application.

8. The method of claim 1, wherein the user is an authorized user having permission to share data collected from a monitoring program; and
    wherein the data set is a set of monitoring data collected for a monitoring program that involves repeated data collection from a distributed group of users;
    wherein the method includes providing, by the server system, user interface data to a device associated with the authorized user, wherein the user interface data specifies a user interface having controls that enable the authorized user to (i) define a subset of the monitoring data for the monitoring program to be shared, and (ii) specify, from among the operations that the server system is configured to enable through data access portals, the limited set of operations permitted for the data sharing recipient to perform.

9. The method of claim 8, wherein the controls enable the authorized user to define the subset of the monitoring data according to each of multiple different criteria, wherein the multiple different criteria include at least two of: a time that data was collected; a source of the collected data; a type of data collected; a selection of one or more records; data corresponding to selected individuals or groups of individuals; data for one or more topics or keywords; or one or more classifications of the data.

10. The method of claim 1, wherein the server system is configured to enable the user to share different portions of the data set with different recipients and to apply different sets of restrictions on data manipulation operations made available to the different recipients; and wherein the server system is configured to store separate data sharing records for each of the different recipients and to provide separate customized portals to the respective recipients, wherein each of the customized portals (i) provides access to the corresponding portion of the data set specified by the user for the corresponding recipient and (ii) applies the restrictions specified by the user for the recipient so that only the set of data manipulation operations authorized by the user are available through the customized portal.

11. The method of claim 1, wherein the data sharing request is a first data sharing request, and wherein the method further comprises, after generating the data sharing record based on the first data sharing request:

receiving, from the user, a second data sharing request to share data with the data sharing recipient, wherein the second data sharing request includes or is associated with information specifying (i) a second portion of the data set to be shared with the data sharing recipient and (ii) a second set of operations authorized for the data sharing recipient to perform using the second portion of the data set; and in response to receiving the second data sharing request, updating the data sharing record to indicate added access to the second portion of the data set and to indicate the second set of operations authorized to be performed using the second portion of the data set, wherein the customized portal for the data sharing recipient is updated to provide access to both (i) the one or more portions of the data set shared based on the first data sharing request and (ii) the second portion of the data set shared based on the second data sharing request, and wherein the server system configures the customized portal to limit the operations available to be performed, wherein (i) the limited set of operations authorized based on the first data sharing request are available for the one or more portions of the data set, and (ii) the second set of operations authorized based on the second data sharing request are available for the second portion of the data set.

12. The method of claim 1, wherein the data sharing request is a first data sharing request and the customized portal is a first customized portal, and wherein the method further comprises, after generating the data sharing record based on the first data sharing request:

receiving, from the user, a second data sharing request to share data with the data sharing recipient, wherein the second data sharing request includes or is associated with information specifying (i) a second portion of the data set to be shared with the data sharing recipient and (ii) a second set of operations authorized for the data sharing recipient to perform using the second portion of the data set; and in response to receiving the second data sharing request, configuring a second customized portal for the data sharing recipient, wherein the second customized portal is configured to provide, separate from the first customized portal providing access to the one or more portions, (i) access to the second portion of the data set while disallowing access to content of the data set outside the second portion, and (ii) limited functionality to perform the second set of operations while disallowing operations not in the second set of operations.

13. The method of claim 1, further comprising:

identifying multiple data sharing records that each indicate a data sharing relationship that of at least a portion of the data set; and providing, over the communication network and for display by a device associated with the user, a list of the data sharing relationships provided by the identified data sharing records, the list indicating, for each of the data sharing relationships, the data sharing recipient and the portion of the data set that is shared.

14. The method of claim 1, wherein configuring the customized portal for the data sharing recipient comprises:

storing a copy of the one or more portions of the data set in a data storage area for the customized portal that is separate from the data set, wherein the server system is configured to maintain persistent storage of the data in the data storage area across multiple sessions of use of the customized portal; and configuring the customized portal to provide access to the copy in the data storage area and not provide access to the data set.

15. The method of claim 1, wherein the server system is configured to: create, for each session of use of the customized portal, a new temporary copy of the one or more portions of the data set to be used during the session; and discard the temporary copy for the session after the session ends.

16. The method of claim 1, wherein the one or more portions of the data set are defined based on a set of criteria specified by the user such that the subset of the data set that meets the criteria can vary over time, wherein the criteria are stored in the data sharing record; and wherein the server system is configured to vary the content of the data set accessible through the customized portal based on a determination by the server system, for each session of use of the customized portal, of which portions of the data set currently satisfy the criteria at the time the customized portal is used.

17. The method of claim 16, wherein the criteria include search criteria or filter criteria, such that, for each session of use of the customized portal, the customized portal shares the portion of the data set that the server system determines to currently meet the search criteria or filter criteria.

18. The method of claim 1, further comprising:

receiving, in association with the data sharing request, input specifying for results generated by the recipient using shared data to be provided to the user;

including, in the data sharing record, an indication that results generated by the recipient using shared data are to be provided to the user;

generating content that is derived from the shared one or more portions of the data set as a result of interaction through the customized portal by the data sharing recipient; and based on the indication in the data sharing record, automatically saving the generated content and automatically making the generated content available to the user.

19. A system comprising:

one or more computers of a server system; and one or more non-transitory computer-readable media storing instructions that are operable, when executed by the one or more computers, to cause the server system to perform operations comprising:

storing, by the server system, a data set comprising monitoring data collected from remote devices over a communication network;

receiving, by the server system, a data sharing request associated with a user, wherein server system is configured to provide data access portals that include interactive interface elements to perform operations on shared data, and wherein the data sharing request includes or is associated with information specified by the user including:
- a data sharing recipient; and
- data sharing characteristics including (i) one or more portions of the data set to be shared with the data sharing recipient and (ii) a limited set of operations that the data sharing recipient is authorized to perform using the one or more portions of the data set, wherein the limited set of operations is a proper subset of the operations that the server system is configured to enable through interactive interface elements of the data access portals;

in response to verifying authorization of the user, generating, by the server system, a data sharing record that specifies (i) the one or more portions of the data set to be shared with the data sharing recipient and (ii) the limited set of operations that the data sharing recipient is authorized to perform using the one or more portions of the data set;

configuring, by the server system, a customized portal for the data sharing recipient based on the data sharing record, wherein the customized portal is configured to provide (i) limited access to the data set by providing access to the one or more portions of the data set while disallowing access to content of the data set outside the one or more portions, and (ii) limited functionality to perform the limited set of operations while disallowing one or more operations not in the limited set of operations; and providing, by the server system and to a device associated with the data sharing recipient, access to the customized portal that provides the limited access to the data set and the limited functionality, wherein providing access to the customized portal comprises generating user interface data for the customized portal that corresponds to the data sharing record, and wherein the user interface data is generated based on the data sharing record such that the customized portal does not include or does not enable interactive interface elements for the one or more operations not in the limited set of operations.

20. One or more non-transitory computer-readable media storing instructions that are operable, when executed by one or more computers of a server system, to cause the server system to perform operations comprising:
storing, by the server system, a data set comprising monitoring data collected from remote devices over a communication network;

receiving, by the server system, a data sharing request associated with a user, wherein server system is configured to provide data access portals that include interactive interface elements to perform operations on shared data, and wherein the data sharing request includes or is associated with information specified by the user including:
- a data sharing recipient; and
- data sharing characteristics including (i) one or more portions of the data set to be shared with the data sharing recipient and (ii) a limited set of operations that the data sharing recipient is authorized to perform using the one or more portions of the data set, wherein the limited set of operations is a proper subset of the operations that the server system is configured to enable through interactive interface elements of the data access portals;

in response to verifying authorization of the user, generating, by the server system, a data sharing record that specifies (i) the one or more portions of the data set to be shared with the data sharing recipient and (ii) the limited set of operations that the data sharing recipient is authorized to perform using the one or more portions of the data set;

configuring, by the server system, a customized portal for the data sharing recipient based on the data sharing record, wherein the customized portal is configured to provide (i) limited access to the data set by providing access to the one or more portions of the data set while disallowing access to content of the data set outside the one or more portions, and (ii) limited functionality to perform the limited set of operations while disallowing one or more operations not in the limited set of operations; and providing, by the server system and to a device associated with the data sharing recipient, access to the customized portal that provides the limited access to the data set and the limited functionality, wherein providing access to the customized portal comprises generating user interface data for the customized portal that corresponds to the data sharing record, and wherein the user interface data is generated based on the data sharing record such that the customized portal does not include or does not enable interactive interface elements for the one or more operations not in the limited set of operations.

* * * * *